United States Patent
Zhu

(10) Patent No.: US 11,645,612 B2
(45) Date of Patent: May 9, 2023

(54) LOCKER-BASED LOGISTICS MANAGEMENT SYSTEM WITH DYNAMIC AND REAL-TIME ADDRESSING

(71) Applicant: ZipcodeXpress Inc., Austin, TX (US)

(72) Inventor: Yonghui Richard Zhu, Austin, TX (US)

( * ) Notice: Subject to any disclaimer, the term of this patent is extended or adjusted under 35 U.S.C. 154(b) by 542 days.

(21) Appl. No.: 16/691,322

(22) Filed: Nov. 21, 2019

(65) Prior Publication Data
US 2020/0250614 A1    Aug. 6, 2020

Related U.S. Application Data

(60) Provisional application No. 62/800,115, filed on Feb. 1, 2019.

(51) Int. Cl.
*G06Q 10/0836* (2023.01)
*G06Q 10/0833* (2023.01)
(Continued)

(52) U.S. Cl.
CPC ..... *G06Q 10/0836* (2013.01); *G06Q 10/0833* (2013.01); *G06Q 10/08355* (2013.01); *G07C 9/00912* (2013.01); *H04W 4/029* (2018.02)

(58) Field of Classification Search
CPC ........... G06Q 10/0836; G06Q 10/0833; G06Q 10/08355; H04W 4/029; G07C 9/00912
(Continued)

(56) References Cited

U.S. PATENT DOCUMENTS 9,000,937 B1 * 4/2015 Lee .................. G08B 21/18
                                                         342/450
9,387,928 B1 * 7/2016 Gentry ................ B60L 53/00
(Continued)

FOREIGN PATENT DOCUMENTS

WO    WO-2021081114 A1 *  4/2021 ............ G06Q 10/02

OTHER PUBLICATIONS

Iwan, Stanislaw; "Analysis of Parcel Lockers' Efficiency as the Last Mile Delivery Solution—The Results of the Research in Poland"; Transportation Research Procedia, vol. 12, https://www.sciencedirect.com/science/article/pii/S2352146516000193 (Year: 2016).*

*Primary Examiner* — Shannon S Campbell
*Assistant Examiner* — Lisa Ma
(74) *Attorney, Agent, or Firm* — Mason A. Gross; The Law Office of Mason A. Gross, PLLC

(57) ABSTRACT

Technologies are described related to the delivery of items utilizing electronic locker arrangements. Systems described herein coordinate and manage the delivery of items by large numbers of couriers using a network of electronic locker arrangements. Implementations are described corresponding to delivering items to an individual via different electronic locker arrangements as the location of the individual changes. The systems can track the location of individuals and as requests to deliver items are received by the systems, the current location of the individuals can be used to determine an electronic locker arrangement to store items for the individuals until the items are picked up. The systems can generate identifiers that uniquely correspond to individuals and their various locations. In these situations, the identifiers can be used by the individuals or by others to have items delivered to the individuals via electronic locker arrangements.

10 Claims, 21 Drawing Sheets

(51) Int. Cl.
*H04W 4/029* (2018.01)
*G06Q 10/0835* (2023.01)
*G07C 9/00* (2020.01)

(58) Field of Classification Search
USPC .......................................................... 705/339
See application file for complete search history.

(56) References Cited

U.S. PATENT DOCUMENTS

| | | | |
|---|---|---|---|
| 2003/0101143 A1* | 5/2003 | Montgomery ... | G07B 17/00435 705/62 |
| 2007/0192191 A1* | 8/2007 | Neal ................ | G07B 17/00435 705/14.26 |
| 2012/0173448 A1* | 7/2012 | Rademaker .......... | G06Q 10/083 705/338 |
| 2013/0144800 A1* | 6/2013 | Fallows ............. | G06Q 30/0282 705/347 |
| 2013/0214902 A1* | 8/2013 | Pineau ................. | H04L 63/101 340/5.61 |
| 2014/0279658 A1* | 9/2014 | Lievens ................ | G06Q 50/28 705/336 |
| 2015/0106296 A1* | 4/2015 | Robinson ........... | G06Q 10/0838 705/339 |
| 2015/0193731 A1* | 7/2015 | Stevens ................ | G06Q 10/083 705/26.7 |
| 2016/0174185 A1* | 6/2016 | Ramakrishnan .... | H04W 64/006 455/456.1 |
| 2017/0185961 A1* | 6/2017 | Shiryan .............. | G06Q 10/0838 |
| 2017/0236193 A1* | 8/2017 | Zundel ................ | G06Q 10/083 705/16 |
| 2020/0410797 A1* | 12/2020 | Gomez Santamaria ..................... G07C 9/00912 |

* cited by examiner

LOCKER-BASED LOGISTICS MANAGEMENT SYSTEM WITH DYNAMIC AND REAL-TIME ADDRESSING

CROSS-REFERENCE TO RELATED APPLICATION(S)

This application claims the benefit of U.S. Provisional Application No. 62/800,115, filed Feb. 1, 2019, and entitled "LOCKER-BASED LOGISTICS MANAGEMENT SYSTEM WITH REAL-TIME ADDRESSING."

BACKGROUND

Various service providers enable a sender, such as an individual or entity (e.g., business, educational institution, government institution, etc.), to have one or more items delivered to a recipient that includes another individual or entity. Typically, the service providers utilize a fleet of vehicles to deliver an item directly to an individual or entity. The service providers operate distribution hubs that aggregate items for a particular region and vehicles of the service provider obtain items from the distribution hubs and deliver them to a specific location of the recipient (e.g., business address, residential address).

DETAILED DESCRIPTION

Figure 1:
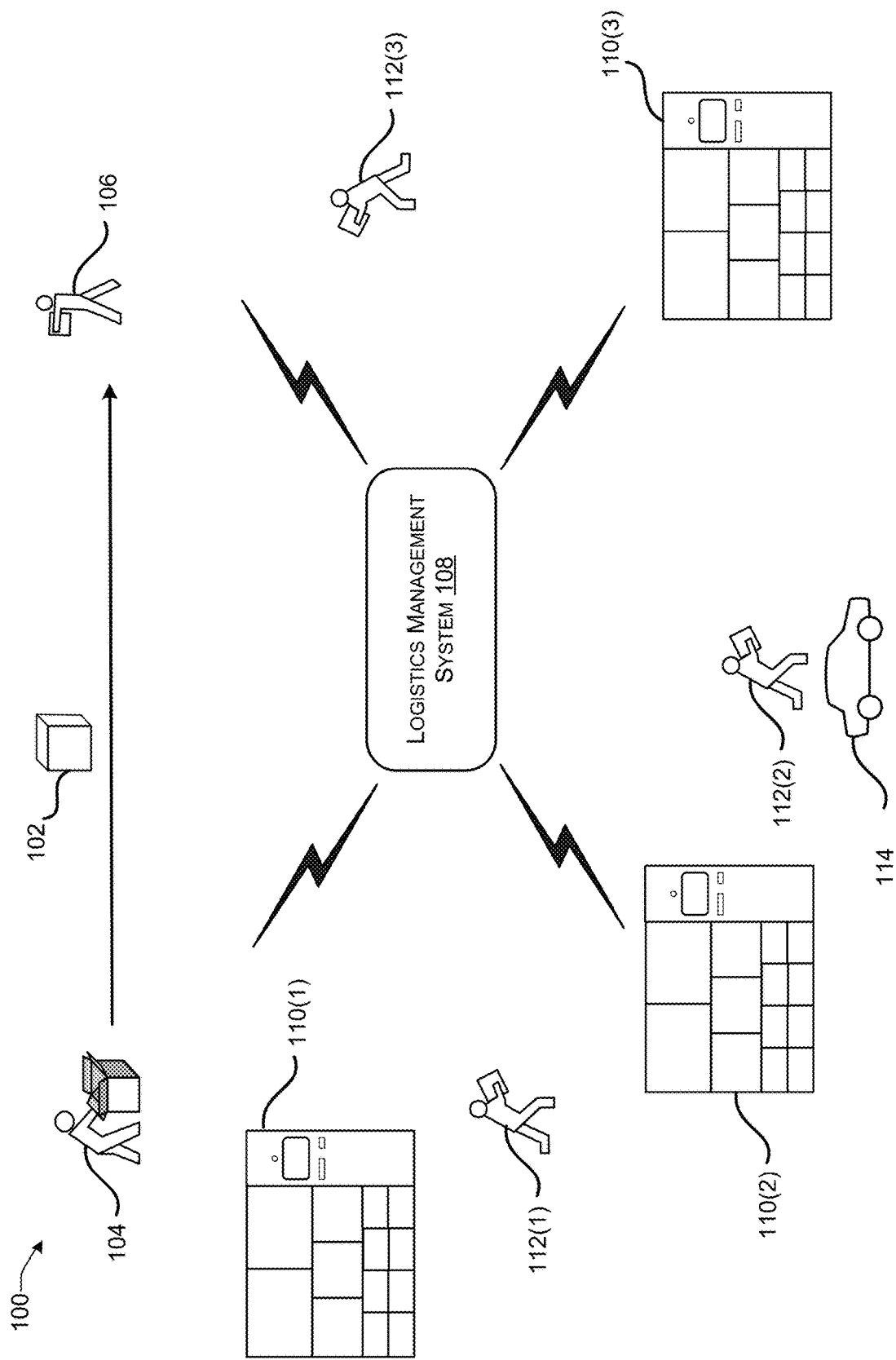
FIG. 1 is a diagram of an architecture to facilitate the delivery of an item from a sender to a recipient by a logistics management system using an electronic locker arrangement according to some implementations.

This application claims the benefit of U.S. Provisional Application No. 62/800,115, filed Feb. 1, 2019, entitled "LOCKER-BASED LOGISTICS MANAGEMENT SYSTEM WITH REAL-TIME ADDRESSING," which is incorporated by reference herein in its entirety.

The following detailed description is directed to technologies for implementing a logistics management system to provide secure delivery of an item to a recipient from a sender. In some cases, the delivery of the item may take place via a courier. The logistics management system can communicate with the sender, the recipient, and the courier via an application executing on computing devices of the sender, recipient, and the courier. An electronic locker arrangement that includes one or more lockers can be used to store the item during the delivery process.

Conventional item delivery systems and processes are inefficient and can lack a level of security that can be desired by senders and recipients of items. In particular, typical logistics companies maintain a fleet of vehicles that deliver items directly to individuals. The items are often dropped off with individuals whose identity is not verified, except by a general question regarding the last name of the individuals. In some cases when an individual is not present to receive an item, the item is dropped off at a location and left outside of a residence or business or left with a neighboring residence or business. In these scenarios, the items being delivered can easily be obtained by someone who is not the intended recipient without a credible means of identifying the individual that actually received the item. In other situations when an individual is not present to receive an item, delivery of the item can be delayed until another time when the delivery person is scheduled to be in the vicinity of the location of the recipient or until a recipient can drive to a physical location where the item is being held. In these instances, it can be inconvenient for an individual to actually obtain the item being sent to them.

Implementations described herein are different from systems utilized by conventional logistics service providers. In particular, implementing the systems and processes described herein eliminates the need for a service provider to maintain a dedicated fleet of vehicles. For example, utilizing a locker-to-locker delivery arrangement with a number of independent couriers eliminates the intermediate distribution hub that is utilized by conventional logistics service providers to deliver items. Additionally, the use of electronic locker arrangements to store items that are to be picked up and dropped off eliminates the delivery of items to an address dedicated to the recipient. The implementations described herein also provide secure drop off and delivery of items to recipients via electronic locker arrangements. The differences between the systems and processes described herein and conventional logistics and delivery systems results in technical differences with the conventional systems. In particular, the implementations described in this application are able to obtain requests to deliver items and process them relatively quickly with respect to conventional systems that deliver items via a set of routes on a daily basis because the items do not need to traverse the physical infrastructure of conventional systems, such as a distribution hub and a fleet of delivery vehicles, in order to be delivered to a recipient. Thus, the implementations described herein utilize a mobile app and/or website to obtain requests to deliver items and also to notify couriers of items that have been requested for delivery in real-time or near real-time.

Further, eliminating a distribution hub and implementing locker-to-locker deliveries causes the systems and methods described herein to differ from conventional systems in the processes and algorithms utilized due to the differences in the architectures. In particular, implementations described herein utilize authentication and identity verification processes that are different from other logistics service providers and are different from other locker-based delivery systems. These different authentication and identity verification processes provide improved security over conventional systems. Additionally, the processes described in implementations differ from conventional logistics systems and locker-based delivery systems by controlling the assignment and access to lockers by couriers, senders, and recipients that conventional systems do not need to implement and/or are unable to implement. These processes represent improvements over the conventional industry practice by enabling the assignment of lockers and couriers to deliver items within minutes or seconds and enables faster delivery times from the time that a request was received that are not possible with conventional hub-based logistics systems that utilize a fleet of vehicles that have assigned routes and traditional locker-based systems, which are simpler and less complex that the implementations described herein.

The implementations of the logistics management system described herein are also different from conventional systems because the logistics management systems described herein track the lockers that are available and unavailable for storing items to be delivered. Thus, the logistics management systems are configured to track the use of lockers for the delivery of items and identify lockers that are available to store items related to new requests for delivery in real-time to provide efficient use of the lockers. The logistics management systems described herein also utilize authentication techniques that restrict access to the lockers by individuals, track the individuals accessing the lockers, and monitor the location of the items based on information provided by the electronic locker arrangements to the logistics management system. Thus, in contrast to conventional systems, items can be accurately tracked and securely stored until individuals arrive to pick up their items. delivered to individuals and of lockers.

Further, the techniques described herein represent additional improvements with respect to conventional systems. In particular, the systems and methods described herein include the implementation of complex algorithms that manage and coordinate the delivery of hundreds, up to thousands of items at a given time by hundreds, up to thousands of couriers. The systems and methods described herein also control access to electronic locker arrangements that enables the secure delivery of items to large numbers of couriers, recipients, and senders of items. The techniques described herein can manage and coordinate the many different facets of the logistic management system and control the dynamic manner in which a large number of items are being delivered at a given time in an efficient and secure manner that is not able to be obtained by conventional systems because conventional systems are more simplified in nature and are not associated with managing, controlling, and coordinating the delivery of such a large number of items via such a large number of couriers for a given geographic location.

In particular implementations, a first individual, the sender, can request to send an item to an additional individual, the recipient, utilizing a website, a mobile app, or both. The individual sending the item can provide information about the item being sent via the web site and/or mobile app. In some cases, the information about the item can include a text description of the item, one or more images of the item, video of the item, dimensions of the item, weight of the item, combinations thereof, and the like. Additionally, the individual sending the item can provide payment for the delivery of the item to the recipient via the web site and/or the mobile app.

A logistics management system can receive the information about the item to be delivered to the recipient and determine one or more electronic locker arrangements that can be utilized to deliver the item to the recipient. In some cases, a single electronic locker management arrangement can be used to deliver the item to the recipient. In other situations, multiple electronic locker arrangements can be utilized to deliver the item to the recipient. In cases where a single electronic locker arrangement is used to deliver the item to the recipient, the logistics management system can identify the electronic locker arrangement for both the sender to drop off the item and for the recipient to pick up the item. Additionally, in instances where multiple electronic locker arrangements are used to deliver the item, the logistics management system can identify a first locker for the sender to drop off the item and a second locker for the recipient to pick up the item.

In various implementations, the electronic locker arrangement(s) utilized to provide the item to the recipient can be identified by the logistics management system based at least partly on a location of the sender of the item and a location of the recipient of the item. For example, the logistics management system can identify one or more electronic locker arrangements for the delivery of the item to the recipient that are proximate to the sender and the recipient. In some cases, the logistics management system can identify one or more locker arrangements for the delivery of the item to the recipient that are within a threshold distance of the sender and/or the recipient. In particular implementations, zip codes or other geographic designations can be utilized to identify one or more electronic locker arrangements for delivery of the item to the recipient. In an illustrative example, the logistics management system can identify a first electronic locker arrangement located in a zip code of the sender for the item to be dropped off and a second electronic locker arrangement in a zip code of the recipient for the item to be picked up. In scenarios where the sender and the receiver are in the same zip code, in certain implementations, the same electronic locker arrangement can be utilized for dropping off the item by the sender and picking up the item by the recipient.

In implementations that utilize multiple electronic locker arrangements to deliver the item to the recipient, one or more couriers can transport the item between the electronic locker arrangements. The logistics management system can determine that an item is to be delivered to a recipient and identify a number of candidate couriers to deliver the item to the recipient. In some cases, the logistics management system can identify candidate couriers based on locations of couriers relative to the location of the sender, the location of the recipient, or both. Additionally, the logistics management system can identify candidate couriers based on a number of items that that the couriers are already committed to delivering to other recipients. In additional situations, the logistics management system can identify candidates to deliver the item based on metrics of the couriers, such as on-time delivery percentage, number of items previously delivered, damage to items delivered, combinations thereof, and so forth. Further, the logistics management system can identify candidate couriers to deliver the item based on couriers that have provided status information to the logistics management system indicating that the couriers are available to pick up and drop off items in the location of the sender and the location of the recipient. After identifying a number of candidate couriers to deliver the item, the logistics management system can broadcast a message to the candidate couriers that the item is available for delivery. The message can include locations for pickup and delivery of the item. The logistics management system can then obtain notifications of acceptance from one or more of the candidate couriers and determine a particular candidate courier to deliver the item to the recipient.

Access to electronic locker arrangements can be implemented according to authentication processes to verify the identities of individuals requesting access to the electronic locker arrangements. In some implementations, an identifier that uniquely identifies the individual can be generated and provided to the individual. The identifier can then be utilized by the individual to gain access to an item stored by an electronic locker arrangement. In various implementations, the identifier can be encoded by a Quick Response (QR) code. In particular implementations, the QR codes can be utilized by couriers to pick up items for delivery and by recipients to pick up items that have been sent to them. In additional implementations, bar codes identifying items to be delivered can be used to obtain access to the electronic locker arrangements. For example, bar codes can be utilized by senders to access the electronic locker arrangements to store an item in a locker for delivery to a recipient. In other examples, bar codes can be utilized by couriers to drop off items in a locker that are to be picked up later by the recipients.

In additional implementations, systems and techniques described herein can coordinate the delivery of items to recipients in situations where the recipients can have a changing location. That is, the logistics management system can dynamically determine locations for the delivery of items to individuals. In certain implementations, the logistics management system can coordinate the delivery of items to individuals without receiving any input from the sender corresponding to the location of the recipient. In conventional systems, the location of a recipient of an item being delivered is specified by the sender during a process where the sender is arranging for the delivery of an item to a recipient via a delivery service provider. In contrast, the techniques and systems described herein can dynamically locate the individual and arrange for the delivery of items to electronic locker arrangements that can be picked up by the recipients. In this way, senders and recipients can arrange for the delivery of items to recipients even when their location changes and the delivery of items to recipients is not bound to a fixed address associated with particular locations associated with the recipients, such as a residence or place of work. In various implementations, the sender of an item does not need to know the location of the recipient to have the item delivered to the recipient.

Furthermore, the logistics management system can generate a system identifier that uniquely identifies the recipient and a shipping identifier that is unique to the delivery of a particular item. The shipping identifier can be used to access an electronic locker arrangement that is to store the item. The use of the shipping identifier in the delivery of items via electronic locker arrangements adds a layer of security to the delivery of items because a shipping identifier is generated for each request to deliver an item to an electronic locker arrangement and the shipping identifier can be tracked to the sender. In this way, the logistics management system can determine the sender of the item, the recipient of the item, and one or more couriers delivering the item. In this way, items cannot be delivered anonymously.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. In particular, the configurations described herein can be practiced in distributed computing environments where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a diagram of an architecture 100 to facilitate the delivery of an item 102 from a sender 104 to a recipient 106 by a logistics management system 108 using an electronic locker arrangement 110 according to some implementations. In some cases, the item 102 can be included in a container or other type of packaging. The item 102 can include goods obtained from a retailer or manufacturer. The item 102 can also include food or other perishable articles. Further, the item 102 can include non-perishable articles. Additionally, the item 102 can have a number of different weights and sizes.

The sender 104 can include an individual that wants to have the item 102 sent to the recipient 106. In some cases, the sender 104 can be a representative of an entity, such as an employee of a company, that sends the item 102 to the recipient 106 on behalf of the entity. In other cases, the sender 104 can be acting in an individual capacity to send the item 102 to the recipient 106. The recipient 106 can also be a representative of an entity that receives the item 102 on behalf of the entity. In addition, the recipient 106 can receive the item 102 in their individual capacity.

The logistics management system 108 can control the flow of information within the architecture 100 to enable the delivery of the item 102 from the sender 104 to the recipient 106. That is, the logistics management system 108 can obtain a request from the sender 104 to deliver the item 102 to the recipient 106 and identify electronic locker arrangements 110 that can be utilized to store the item 102 during the delivery process. The logistics management system 108 can also identify one or more couriers, such as couriers 112(1), 112(2), 112(3), that can transport the item 102 between the sender 104 and the recipient 106. The logistics management system 108 can communicate with the sender 104, the recipient 106, and the courier 112 to coordinate the pickup and drop off of the item 102 by the sender 104, the recipient 106, and optionally by one or more couriers 112, to one or more of the electronic locker arrangements 110 such that the item 102 can be delivered to the recipient. 106.

The electronic locker arrangements 110 can include a number of lockers that can store items to be delivered from senders to recipients. The lockers can have varying dimensions such that some lockers can hold items that are larger than other items stored by smaller lockers. In some cases, the lockers can be refrigerated to store food or other items (e.g., electronics) that can be damaged by heat. The electronic locker arrangements 110 can also include a number of input/output devices to provide information and/or communications to users of the electronic locker arrangements 110. For example, the electronic locker arrangements 110 can include one or more display devices, one or more microphones, one or more speakers, or combinations thereof. The electronic locker arrangements 110 can also include computing resources, such as one or more processors, one or more memory devices, communication interfaces, and so forth to send, receive, and process electronic information. In particular, the electronic locker arrangements 110 can provide a number of user interfaces to enable individuals to access the lockers of the electronic locker arrangements 110 to drop off or pickup items stored in the lockers of the electronic locker arrangements 110. The electronic locker arrangements 110 can also include additional systems to open and/or close the lockers, sensors to determine that items have been stored in or removed from the lockers, cameras to obtain images and/or video, biometric devices to identify individuals accessing the lockers, and the like.

In particular implementations, the electronic locker arrangements 110 can be in electronic communication with the logistics management system 108. In some implementations, the electronic locker arrangements 110 can be in communication with each other. In still other implementations, the electronic locker arrangements 110 can be in communication with applications executing on mobile devices of senders, recipients, and couriers that are involved in the delivery of items. Although the architecture 100 of FIG. 1 shows three representative electronic locker arrangements 110(1), 110(2), and 110(3), the architecture 100 can include fewer than three electronic locker arrangements or more than three electronic locker arrangements.

In some cases, the electronic locker arrangements 110 can be associated with a particular region and can store items to be delivered within that particular region. In an illustrative example, individual locker arrangements 110 can be associated with a corresponding zip code. In this way, items being delivered to recipients located in a particular zip code can obtain the items from a particular locker arrangement 110. Additionally, senders associated with a particular zip code can drop off items for delivery at an electronic locker arrangement associated with the zip code of the senders. In situations where senders and recipients of items are in different zip codes, couriers 112 can transport the item from an electronic locker arrangement 110 located in the zip codes of the senders to different electronic locker arrangements 110 located in the zip codes of the recipients.

In an illustrative implementation, the logistics management system 108 can receive a request from the sender 104 to deliver the item 102 to the recipient 106. The logistics management system 108 can receive the request via a mobile app executed by an electronic device of the sender 104. The logistics management system 108 can also receive the request via a website administered by or on behalf of the logistics management system 108. Additionally, the logistics management system 108 can receive the request to deliver the item 102 from an electronic locker arrangement 110. The request can indicate information related to the recipient 106. In some cases, the request can indicate a location of the recipient 106. In particular implementations, the request can indicate a region in which the recipient 106 is located, such as a zip code, without specifying an address of the recipient 106. Further, the request can indicate an identifier of the individual, such as a phone number, an email address, a name, an identification number, combinations thereof, and the like.

A request to deliver the item 102 to the recipient 106 can also indicate information related to the item 102. To illustrate, the request can indicate dimensions of the item 102, such as a length of the item 102, a width of the item 102, a height of the item 102, a diameter of the item 102, a volume of the item 102, or combinations thereof. The request can also indicate a weight of the item 102. Further, the request can indicate a description of the item 102. That is, the request can indicate a category associated with the item 102, such as electronic device, food, consumer good, toys, furniture, etc. In addition, the request can indicate whether an item is fragile, perishable, and so forth.

After receiving the request from the sender 104 to deliver the item 102 to the recipient 106, the logistics management system 108 can identify one or more electronic locker arrangements 110 that can be utilized to provide the item 102 to the recipient 106. In some implementations, a single electronic locker arrangement 110 can be utilized to provide the item 102 to the recipient 106. In these situations, the sender 104 can drop off the item 102 in a locker of an electronic locker arrangement 110, such as the electronic locker arrangement 110(1), and the recipient 106 can pick up the item 102 from the same locker. In other cases, multiple locker arrangements 110 can be utilized to provide the item 102 to the recipient 106. For example, the item 102 can be dropped off by the sender 104 at the electronic locker arrangement 110(1) and the item 102 can be picked up by the recipient 106 at the electronic locker arrangement 110(2).

In situations where an item is to be transported between electronic locker arrangements 110, the logistics management system 108 can determine one or more couriers 112 to transport the item from one electronic locker arrangement 110 to an additional electronic locker arrangement 110. In particular, the logistics management system 108 can determine a number of candidate couriers from among a larger pool of couriers based on one or more criteria. In some cases, the logistics management system 108 can identify candidate couriers to transport items between electronic locker arrangements 110 based at least partly on proximity of the couriers to a pickup location or a drop off location. The logistics management system 108 can also determine candidate couriers to transport items between electronic locker arrangements 110 based at least partly on an experience level of the couriers, such as a number of deliveries previously completed, and/or on performance metrics of the couriers (e.g., on time percentage, number of packages lost or damaged, current delivery load, etc.). Couriers 112 can indicate an availability to deliver items in certain regions and the logistics management system 108 can identify candidate couriers to deliver the item 102 based at least partly on couriers 112 that have indicated an availability to deliver items in locations corresponding to the location of the sender 104 and the location of the recipient 106. In various implementations, the couriers 112 can utilize a number of modes of transportation to deliver the item 102 from the sender 104 to the recipient 106. In the illustrative example of FIG. 1, the courier 112(2) can transport an item utilizing a vehicle 114.

After the logistics management system 108 has identified one or more candidate couriers to transport an item between electronic locker arrangements, the logistics management system 108 can send communications to the candidate couriers indicating the item to be delivered and the electronic locker arrangements to be utilized to drop off and pick up the item. In the illustrative example of FIG. 1, the logistics management system 108 can identify the couriers 112(1) and 112(2) as candidates to transport the item 102 from the first electronic locker arrangement 110(1) to the second electronic locker arrangement 110(2). Candidate couriers can send an indication to the logistics management system 108 to accept the job of transporting an item between electronic locker arrangements and the logistics management system 108 can assign a particular courier to transport the item.

Access to the electronic locker arrangements 110 can be controlled to provide secure delivery of the item 102 to the recipient 106. In some implementations, one or more authentication techniques can be utilized to control access to lockers of the electronic locker arrangements 110 by the recipient 106 and/or courier 112. For example, a QR code can be provided to the recipient 106 before picking up the item 102 at an electronic locker arrangement 110. The QR code can uniquely identify the recipient 106 with respect to the item 102. In particular implementations, the logistics management system 108 can generate the QR code in response to a request from the recipient 106 to access the item stored by the electronic locker arrangement 110. The electronic locker arrangement 110 can provide the QR code to a computing device of the recipient 106 and the computing device of the recipient 106 can extract certain information from the QR code. The extracted information can be sent back to the logistics management system 108 along with an identifier of the recipient 106. The logistics management system 108 can then utilize the identifier of the recipient 106 and the information extracted from the QR code to authorize access to the electronic locker arrangement 110 by the recipient 106. In response to verification of the identity of the recipient 106, in various implementations, the logistics management system 108 can cause the electronic locker arrangement 110 to open the particular locker storing the item 102 by sending a signal to the electronic locker arrangement 110 to open the particular locker. Consequently, the recipient 106 can pick up the item 102 from the electronic locker arrangement 110.

In additional implementations, an additional QR code can be provided to a courier 112 that is assigned to deliver the item 102 to the recipient from the sender 104 via an electronic locker arrangement 110. The additional QR code can uniquely identify the courier 112 with respect to the item 102. That is, the additional QR code provided to the courier 112 with respect to the item can be different from the QR code provided to the recipient 106 with respect to the item. Also, the QR codes provided to the recipient 106 and the courier 112 with respect to the item 102 can be different from QR codes provided to an additional recipient and an additional courier with respect to a different item that is to be delivered via the logistics management system 108. Thus, the QR codes generated by the logistics management system 108 are dynamic and not static and the same QR code is not re-used to gain access to the electronic locker arrangements 110. The dynamic generation of QR codes by the logistics management system 108 provides an authentication technique to access the electronic locker arrangements 110 that is more secure than the techniques utilized to authenticate identities in conventional item delivery arrangements.

In particular implementations, the logistics management system 108 can generate the additional QR code in response to a request from the courier 112 to access the item stored by the electronic locker arrangement 110. The electronic locker arrangement 110 can provide the additional QR code to a computing device of the courier 112 and the computing device of the courier 112 can extract certain information from the additional QR code. The extracted information can be sent back to the logistics management system 108 along with an identifier of the courier 112. The logistics management system 108 can then utilize the identifier of the courier 112 and the information extracted from the additional QR code to authorize access to the electronic locker arrangement 110 by the courier 112. In response to verification of the identity of the courier 112 by the logistics management system 108, the courier 112 can be granted access to a particular locker of the electronic locker arrangement 110 that is storing the item 102. For example, the logistics management system 108 can send a signal to the electronic locker arrangement 108 to open the locker storing the item 102. The courier 112 can then obtain the item 102 from the locker and transport the item 102 to another locker in a different electronic locker arrangement 110 that is proximate to a location of the recipient 106.

Other techniques can also be utilized to control access to the electronic locker arrangements 110. In some implementations, access to the electronic locker arrangements 110 can be controlled by providing an identifier of the item 102. For example, the logistics management system 108 can generate a bar code for the item 102 in response to a request from the sender 104 to deliver the item 102 to the recipient 106. The sender 104 can activate a scanner on an electronic locker arrangement 110 to scan the bar code of the item 102 and the electronic locker arrangement 110 can communicate with the logistics management system 108 to obtain access to a locker of the electronic locker arrangement 110 to store the item 102. In this way, the sender 104 can store the item 102 in an electronic locker arrangement 110 until the item 102 is picked up by a courier 112 for delivery to the recipient 106 or until the item 102 is picked up by the recipient 106. In particular implementations, a courier 112 can also utilize a bar code of the item 102 to obtain access to an additional electronic locker arrangement 110 to drop off the item 102 until the recipient 106 picks up the item 102.

Figure 2:
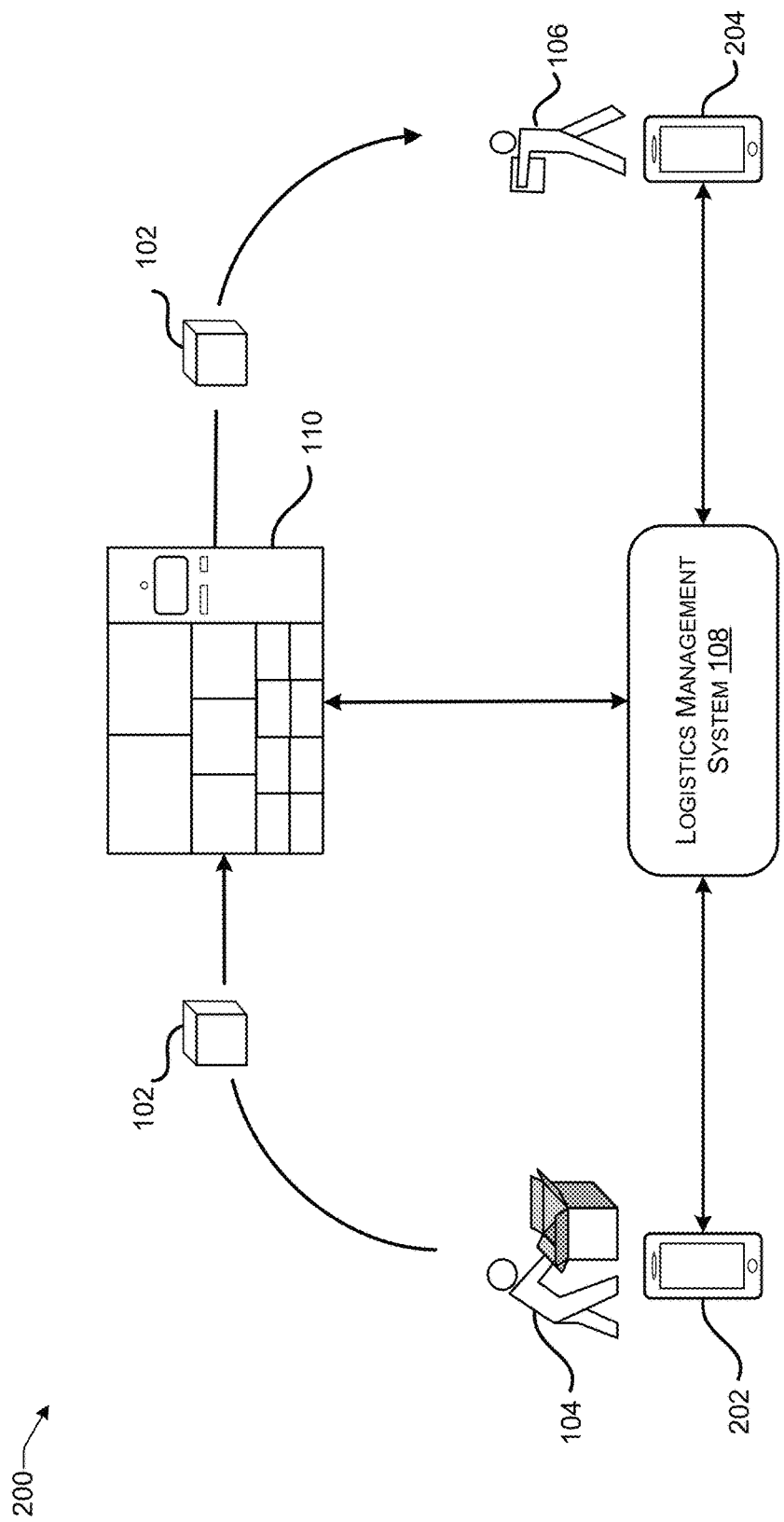
FIG. 2 is a diagram of an architecture to facilitate the delivery of an item from a sender to a recipient by a logistics management system using a single electronic locker arrangement according to some implementations.

FIG. 2 is a diagram of an architecture 200 to facilitate the delivery of an item 102 from a sender 104 to a recipient 106 by a logistics management system 108 using a single electronic locker 110 arrangement according to some implementations. The architecture 200 also includes a first computing device 202 that is operated by the sender 104 and a second computing device 204 that is operated by the recipient 106. The computing devices 202, 204 can include one or more of a smart phone, laptop computing device, tablet computing device, electronic reader device, portable gaming device, desktop computing device, or gaming console.

In some implementations, the sender 104 can utilize the first computing device 202 to send a request to the logistics management system 108 to deliver the item 102 to the recipient 106. In particular implementations, the first computing device 202 can execute a logistics application to send the request to deliver the item 102 to the recipient 106. In various examples, the logistics application can be a mobile app executing on a portable computing device and the logistics application can be provided by a service provider associated with the logistics management system 108. The logistics application executed by the first computing device 202 can provide one or more user interfaces that include user interface elements to enter information related to a request to deliver the item 102 to the recipient 106. For example, the logistics application can capture information entered by the sender 104 corresponding to the item 102 (e.g., dimensions of the item 102, weight of the item 102, images of the item 102, description of the item 102, etc.), information related to the recipient 106 (e.g., location of the recipient 106, identifier(s) of the recipient 106, etc.), and/or information related to the sender 104 (e.g. location of the sender 104, payment information of the sender, identifier(s) of the sender 104, etc.).

In response to receiving the request from the sender 104 to deliver the item 102 to the recipient 106, the logistics management system 108 can determine that the item 102 is to be delivered to the recipient 106 via the electronic locker arrangement 110. In particular implementations, the logistics management system 108 can determine that the electronic locker arrangement 110 corresponds to the location of both the sender 104 and the recipient 106. In this way, the logistics management system 108 can determine that the sender 104 can drop off the item 102 at the electronic locker arrangement 110 and the recipient 106 can pick up the item 102 from the electronic locker arrangement 110. In illustrative implementations, the sender 104 and the recipient 106 can be located in a same zip code.

In some implementations, the logistics management system 108 can utilize information obtained from the sender 104 about the item 102 to determine a particular locker within the electronic locker arrangement 110 to store the item 102. For example, the logistics management system 108 can identify a locker of the electronic locker arrangement 110 to store the item 102 based at least partly on dimensions of the item 102 and/or weight of the item 102. That is, the lockers of the electronic locker arrangement 110 can have different dimensions and weight capacities. In these situations, the logistics management system 108 can determine one or more lockers of the electronic locker arrangement 110 that have dimensions and/or weight capacities that correspond to the dimensions and/or weight capacities of the item 102. The logistics management system 108 can also determine a locker to store the item 102 based on a number of lockers that are not already occupied or are not already scheduled to be occupied during the time in which the item 102 is requested to be stored in the electronic locker arrangement 110.

The logistics management system 108 can generate an identifier of the item 102 and provide the identifier to the sender 104 via the application executing on the first computing device 202. In some cases, the identifier of the item 202 can include a bar code. The identifier of the item 102 can be utilized to provide access to the locker of the electronic locker arrangement 110 that is dedicated to store the item 102. In some implementations, the sender 104 can utilize the logistics application executing on the first computing device 202 to provide the identifier of the item 102 to the electronic locker arrangement 110. For example, the logistics application executing on the first computing device 202 can generate a user interface displaying the identifier of the item 102 and the electronic locker arrangement 110 can include an input device to capture the identifier. In an illustrative example, the electronic locker arrangement 110 can include a barcode scanner and the first computing device 202 can display a barcode identifying the item. The barcode scanner of the electronic locker arrangement 110 can scan the barcode being displayed on the first computing device 202. In other implementations, the sender 104 can print the bar code and provide a physical copy of the bar code to be scanned by the electronic locker arrangement 110.

In some implementations, the electronic locker arrangement 110 can send the identifier of the item 102 to the logistics management system 108. The logistics management system 108 can then verify that the electronic locker arrangement 110 corresponds to the particular electronic locker arrangement assigned to the item 102 by the logistics management system 108 based on the identifier of the item 102. In particular implementations, the logistics management system 108 can include and/or be in communication with a database storing information that indicates identifiers of items and the lockers of the electronic locker arrangements that are assigned to store the respective items. In response to receiving the identifier of the item 102 from the electronic locker arrangement 110, the logistics management system 108 can parse the database to determine that the item 102 is assigned to be stored by a locker of the electronic locker arrangement 110. Based on verifying that the item 102 is to be stored by the electronic locker arrangement 110, the logistics management system 108 can send information to the electronic locker arrangement 110 indicating that the sender 104 is authorized to store the item 102. In some situations, the information can include a signal to open a particular locker of the electronic locker arrangement 110 that is assigned to store the item 102.

In additional implementations, the electronic locker arrangement 110 can make the determination that the item 102 is to be stored in the electronic locker arrangement 110 without communicating with the logistics management system 108. In these implementations, the electronic locker arrangement 110 can store information that can be utilized to verify that the item 102 is to be stored by the electronic locker arrangement 110. In response to obtaining an identifier of the item 102, the electronic locker arrangement 110 can access data stored in memory of the electronic locker arrangement 110 to determine that the identifier of the item 102 is included in a list of items that are assigned to be stored by the electronic locker arrangement 110. Based on determining that the item 102 is to be stored by the electronic locker arrangement 110, the electronic locker arrangement 110 can cause a particular locker assigned to store the item 102 to open.

The electronic locker arrangement 110 can determine that the sender 104 has placed the item 102 into a locker for storage. In some implementations, the electronic locker arrangement 110 can determine that the item 102 has been stored in the electronic storage arrangement 110 based on input from one or more sensors of the electronic locker arrangement 110. For example, the electronic locker arrangement 110 can determine that a locker assigned to store the item 102 has been closed. In another example, the electronic locker arrangement 110 can obtain video input to determine that the item 102 has been stored inside a locker of the electronic locker arrangement 110. In additional examples, the electronic locker arrangement 110 can utilize data from weight sensors to determine that the item 102 has been placed in a locker of the electronic locker arrangement 110. The electronic locker arrangement 110 can also obtain input, such as via a user interface displayed by the electronic locker arrangement 110 or via a logistics application executed by the first computing device 202, indicating that the item 102 has been stored in a locker of the electronic locker arrangement 110. In additional implementations, the electronic locker arrangement 110 can send sensor data to the logistics management system 108 and the logistics management system 108 can determine that the item 102 has been stored in the electronic locker arrangement 110.

Based on determining that the item 102 is stored in the electronic locker arrangement 110, the logistics management system 108 can send a notification to the second computing device 202 of the recipient 106 indicating that the item 102 is available to be picked up by the recipient 106. In some cases, the notification can indicate a location of the electronic locker arrangement 110. The notification can also include information indicating the sender 104. In various implementations, the notification can be received and processed by a logistics application executed by the second computing device 204. The logistics application can be provided by a service provider associated with the logistics management system 108, in some cases. In some implementations, the logistics application executed by the second computing device 204 can be another instance of the logistics application being executed by the first computing device 202.

The recipient 106 can request to access the locker of the electronic locker arrangement 110 that is storing the item 102. Based on receiving the request to access the locker storing the item 102, the electronic locker arrangement 110 can send a request to the logistics management system 108 for identity verification information. In some implementations, the identity verification information can include a QR code. In particular implementations, based on receiving the request from the electronic locker arrangement 110 for identity verification information, the logistics management system 108 can generate the identity verification information and provide the identity verification information to the electronic locker arrangement 110. In illustrative examples, the logistics management system 108 can generate a QR code that uniquely identifies the recipient 106 in relation to the item 102 and send the QR code to the electronic locker arrangement 110. The electronic locker arrangement 110 can then provide the QR code to the recipient 106. For example, the electronic locker arrangement 110 can display the QR code and the recipient 106 can utilize the second computing device 202 to scan the QR code. The second computing device 202 can then extract an identifier encoded by the QR code and send the identifier to the logistics management system 108. In some cases, the identifier can be an identifier of the electronic locker arrangement 110. The logistics application executing on the second computing device 204 can also provide additional information to the logistics management system 108, such as an identifier of the recipient 106 that is stored on the second computing device 204 in association with the logistics application. In this way, the logistics management system 108 can verify the identity of the recipient 106 based on the first identifier extracted from the QR code that was obtained by the second computing device 204 from the electronic locker arrangement 110 and the second identifier of the recipient 106.

In response to verifying the identity of the recipient 106, the logistics management system 108 can cause the electronic locker arrangement 110 to provide access to a locker storing the item 102 by the recipient 106. In some implementations, the logistics management system 108 can send a signal to the electronic locker arrangement 110 to open the locker storing the item 102. The electronic locker arrangement 110 can determine that the item 102 has been removed from the locker based at least partly on sensor data obtained by the electronic locker arrangement 110. In some cases, the sensor data can include video, images, weight sensors, magnetic sensors, combinations thereof, and the like. In various implementations, the electronic locker arrangement 110 can send the sensor data to the logistics management system 108 and the logistics management system 108 can determine that the item 102 has been removed from the locker of the electronic locker arrangement 110. In other implementations, the electronic locker arrangement 110 can send information to the logistics management system 108 indicating that the locker of the electronic locker arrangement 110 has been closed.

After determining that the locker previously storing the item 102 has been closed, the logistics management system 108 can determine that the item 102 has been delivered to the recipient 106. In particular implementations, the logistics management system 108 can also determine that the item 102 has been delivered to the recipient 106 based at least partly on information received via the logistics application executed by the second computing device 204. For example, the logistics application can provide one or more user interfaces that can capture input from the recipient 106 indicating that the item 102 has been delivered to the recipient 106. The logistics management system 108 can then update a database associated with the logistics management system 108 to indicate that the item 102 has been delivered to the recipient 106. The electronic locker arrangement 110 can also determine that the item has been obtained by the recipient 106 based on input obtained by the electronic locker arrangement 110 from the recipient 106. In particular, the electronic locker arrangement 110 can display one or more user interfaces that obtain input indicating that the item 102 has been picked up by the recipient 106. In other cases, a logistics application executed by the second computing device 204 can provide one or more user interfaces to obtain input indicating that the item 102 has been picked up by the recipient 106.

Figure 3:
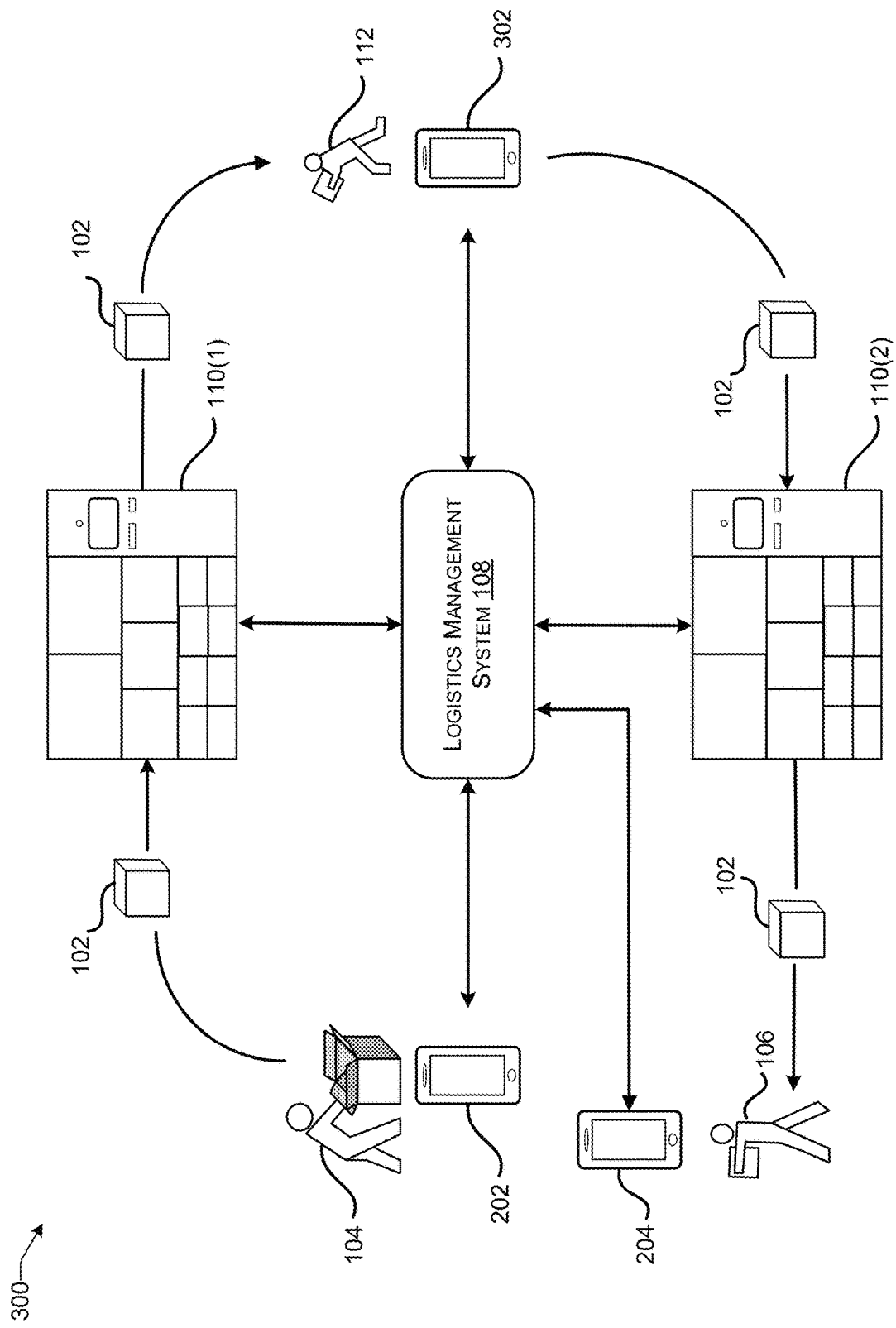
FIG. 3 is a diagram of an architecture to facilitate delivery of an item from a sender to a recipient by a logistics management system using multiple electronic locker arrangements according to some implementations.

FIG. 3 is a diagram of an architecture 300 to facilitate delivery of an item 102 from a sender 104 to a recipient 106 by a logistics management system 108 using multiple electronic locker arrangements according to some implementations. In the illustrative example of FIG. 3, the architecture 300 includes a first electronic locker arrangement 110(1) and a second electronic locker arrangement 110(2). The item 102 can be transported from the first electronic locker arrangement 110(1) to the second electronic locker arrangement 110(2) by a courier 112. The courier 112 can have a third computing device 302 that is executing an instance of a logistics application. The first computing device 202 of the sender 104 and the second computing device 204 of the recipient 106 can also be executing respective instances of the logistics application.

In an illustrative example, the sender 104 can utilize the first computing device 202 to send a request to the logistics management system 108 to deliver the item 102 to the recipient 106. In particular implementations, the logistics application executed by the first computing device 202 can provide one or more user interfaces that include user interface elements to enter information related to a request to deliver the item 102 to the recipient 106. For example, the logistics application can capture information entered by the sender 104 corresponding to the item 102 (e.g., dimensions of the item 102, weight of the item 102, images of the item 102, description of the item 102, etc.), information related to the recipient 106 (e.g., location of the recipient 106, identifier(s) of the recipient 106, etc.), and/or information related to the sender 104 (e.g. location of the sender 104, payment information of the sender, identifier(s) of the sender 104, etc.).

In response to receiving the request from the sender 104 to deliver the item 102 to the recipient 106, the logistics management system 108 can determine that the item 102 is to be delivered to the recipient 106 via multiple electronic locker arrangements. In some implementations, the logistics management system 108 can identify the electronic locker arrangements 110 to be utilized to deliver the item 102 to the recipient 106 based at least partly on a location of the sender 104 and the recipient 106. In an illustrative example, the logistics management system 108 can determine that the sender 104 is located in a first location and the that recipient is located in a second location. In particular implementations, the first location can be a first zip code and the second location can be a second zip code. In these situations, the logistics management system 108 can identify electronic locker arrangements 110 that are located in the first location and the second location. In an illustrative example, the logistics management system 108 can determine that the first electronic locker arrangement 110(1) is located in the first location of the sender 104 and that the second electronic locker arrangement 110(2) is located in the second location of the recipient 106. In this way, the logistics management system 108 can determine that the sender 104 can drop off the item 102 at the first electronic locker arrangement 110(1) and the recipient 106 can pick up the item 102 from the second electronic locker arrangement 110(2).

The logistics management system 108 can also determine a courier 112 to transport the item 102 from the first electronic locker arrangement 110(1) to the second electronic locker arrangement 110(2). The logistics management system 108 can identify the courier 112 from among a number of candidate couriers. The candidate couriers can be determined by the logistics management system 108 based at least partly on a location of the candidate couriers. In some cases, the logistics management system 108 can determine one or more candidate couriers to transport the item 102 from the first electronic locker arrangement 110(1) to the second electronic locker arrangement 110(2) based on a proximity of the candidate couriers to the location of the first electronic locker arrangement 110(1) and the location of the second electronic locker arrangement 110(2). In particular implementations, the logistics management system 108 can determine couriers within a specified distance of the location of the first electronic locker arrangement 110(1) and/or the location of the second electronic locker arrangement 110(2) and identify those couriers as candidate couriers to transport the item 102 from the first electronic locker arrangement 110(1) and the second electronic locker arrangement 110(2). In illustrative implementations, the logistics management system 108 can identify couriers within a same zip code as the first electronic locker arrangement 110(1) as candidate couriers to transport the item 102 from the first electronic locker arrangement 110(1) and the second electronic locker arrangement 110(2). In additional implementations, the logistics management system 108 can identify candidate couriers based on information provided by couriers indicating that the couriers are available to deliver items to be picked up in the location of the first electronic locker arrangement 110(1) and dropped off in the location of the second electronic locker arrangement 110(2).

The logistics management system 108 can send a notification to the candidate couriers that the item 102 is available to be transported from the first electronic locker arrangement 110(1) to the second electronic locker arrangement 110(2). In some cases, the notification can be provided via a logistics application executed by computing devices of the candidate couriers. The logistics management system 108 can obtain responses to the notification and identify the courier 112 to transport the item 102 from the first electronic locker arrangement 110(1) to the second electronic locker arrangement 110(2).

In some implementations, the logistics management system 108 can utilize information obtained from the sender 104 about the item 102 to determine particular lockers within the first electronic locker arrangement 110(1) and the second electronic locker arrangement 110(2) that can be utilized to store the item 102. For example, the logistics management system 108 can identify lockers of the first electronic locker arrangement 110(1) and the second electronic locker arrangement 110(2) to store the item 102 based at least partly on dimensions of the item 102 and/or weight of the item 102. That is, the lockers of the electronic locker arrangements 110(1), 110(2) can have different dimensions and weight capacities. In these situations, the logistics management system 108 can determine one or more lockers of the electronic locker arrangements 110(1), 110(2) that have dimensions and/or weight capacities that correspond to the dimensions and/or weight capacities of the item 102. The logistics management system 108 can also determine a locker to store the item 102 based on a number of lockers of the electronic locker arrangements 110(1), 110(2) that are not already occupied or are not already scheduled to be occupied during the time in which the item 102 is requested to be stored in the first electronic locker arrangement 110(1) and the second electronic locker arrangement 110(2).

The logistics management system 108 can generate an identifier of the item 102 and provide the identifier to the sender 104 via the application executing on the first computing device 202. In some cases, the identifier of the item 202 can include a bar code. The identifier of the item 102 can be utilized to provide access to the locker of the first electronic locker arrangement 110(1) that is dedicated to store the item 102. In some implementations, the sender 104 can utilize the logistics application executing on the first computing device 202 to provide the identifier of the item 102 to the first electronic locker arrangement 110(1). For example, the logistics application executing on the first computing device 202 can generate a user interface displaying the identifier of the item 102 and the first electronic locker arrangement 110(1) can include an input device to capture the identifier. In an illustrative example, the first electronic locker arrangement 110(1) can include a barcode scanner and the first computing device 202 can display a barcode identifying the item. The barcode scanner of the first electronic locker arrangement 110(1) can scan the barcode being displayed on the first computing device 202.

In some implementations, the first electronic locker arrangement 110(1) can send the identifier of the item 102 to the logistics management system 108. The logistics management system 108 can then verify that the first electronic locker arrangement 110(1) corresponds to the particular electronic locker arrangement assigned to store the item 102 by the logistics management system 108 based on the identifier of the item 102. In particular implementations, the logistics management system 108 can include and/or be in communication with a database storing information that indicates identifiers of items and the electronic locker arrangements that are assigned to store the respective items. In response to receiving the identifier of the item 102 from the first electronic locker arrangement 110(1), the logistics management system 108 can parse the database to determine that the item 102 is assigned to be stored by the first electronic locker arrangement 110(1). Based on verifying that the item 102 is to be stored by the first electronic locker arrangement 110(1), the logistics management system 108 can send information to the first electronic locker arrangement 110(1) indicating that the item 102 can be stored by the first electronic locker arrangement 110(1). In some situations, the information can include a signal to open a particular locker of the first electronic locker arrangement 110(1) that is assigned to store the item 102.

In additional implementations, the first electronic locker arrangement 110(1) can make the determination that the item 102 is to be stored in the first electronic locker arrangement 110(1) without communicating with the logistics management system 108. In these implementations, the first electronic locker arrangement 110(1) can store information that can be utilized to verify that the item 102 is to be stored by the first electronic locker arrangement 110(1). In response to obtaining an identifier of the item 102 (e.g., bar code), the first electronic locker arrangement 110(1) can access data stored in memory of the first electronic locker arrangement 110(1) to determine that the identifier of the item 102 is included in a list of items that are assigned to be stored by the first electronic locker arrangement 110(1). Based on determining that the item 102 is to be stored by the first electronic locker arrangement 110(1), the first electronic locker arrangement 110(1) can cause a particular locker to open.

The first electronic locker arrangement 110(1) can determine that the sender 104 has placed the item 102 into a locker for storage. In some implementations, the first electronic locker arrangement 110(1) can determine that the item 102 has been stored in the first electronic storage arrangement 110(1) based on input from one or more sensors of the first electronic locker arrangement 110(1). For example, the first electronic locker arrangement 110(1) can determine that a locker assigned to store the item 102 has been closed. In another example, the first electronic locker arrangement 110(1) can obtain video input to determine that the item 102 has been stored inside a locker of the first electronic locker arrangement 110(1). In additional examples, the first electronic locker arrangement 110(1) can utilize data from weight sensors to determine that the item 102 has been placed in a locker of the first electronic locker arrangement 110(1). In additional implementations, the first electronic locker arrangement 110(1) can send sensor data to the logistics management system 108 and the logistics management system 108 can determine that the item 102 has been stored in the first electronic locker arrangement 110(1). In various implementations, the first electronic locker arrangement 110(1) or a logistics application executed by the first computing device 202 can display one or more user interfaces to obtain input from the sender 104 indicating that the item 102 has been stored in a locker of the first electronic locker arrangement 110(1).

Based on determining that the item 102 is stored in the first electronic locker arrangement 110(1), the logistics management system 108 can send a notification to the courier 112 indicating that the item 102 is available to be picked up by the courier 112. In some cases, the notification can indicate a location of the first electronic locker arrangement 110(1). The notification can also include information indicating the sender 104 and/or the recipient 106. The notification can be sent to the third computing device 302. In various implementations, the notification can be received and processed by a logistics application executed by the third computing device 302.

The courier 112 can request to access the locker of the first electronic locker arrangement 110(1) that is storing the item 102. Based on receiving the request to access the locker storing the item 102, the first electronic locker arrangement 110(1) can send a request to the logistics management system 108 for identity verification information. In some implementations, the identity verification information can include a QR code. In particular implementations, based on receiving the request from the first electronic locker arrangement 110(1) for identity verification information, the logistics management system 108 can generate the identity verification information and provide the identity verification information to the first electronic locker arrangement 110(1). In illustrative examples, the logistics management system 108 can generate a QR code that uniquely identifies the courier 112 in relation to the item 102 and send the QR code to the first electronic locker arrangement 110(1). The first electronic locker arrangement 110(1) can then provide the QR code to the courier 112. For example, the first electronic locker arrangement 110(1) can display the QR code and the courier 112 can utilize the third computing device 302 to scan the QR code. The third computing device 302 can then extract an identifier encoded by the QR code and send the identifier to the logistics management system 108. In some cases, the identifier extracted from the QR code can include an identifier of the first electronic locker arrangement 110 (1). The logistics application executing on the third computing device 302 can also provide additional information to the logistics management system 108, such as an identifier of the courier 112 that is stored on the third computing device 302 in association with the logistics application. In this way, the logistics management system 108 can verify the identity of the courier 112 based on the first identifier extracted from the QR code that was obtained by the third computing device 302 from the first electronic locker arrangement 110(1) and the second identifier of the courier 112.

In response to verifying the identity of the courier 112, the logistics management system 108 can cause the first electronic locker arrangement 110(1) to provide access to a locker storing the item 102 by the courier 112. In some implementations, the logistics management system 108 can send a signal to the first electronic locker arrangement 110(1) to open the locker storing the item 102. The first electronic locker arrangement 110(1) can determine that the item 102 has been removed from the locker based at least partly on sensor data obtained by the first electronic locker arrangement 110(1). In some cases, the sensor data can include video, images, weight sensors, magnetic sensors, combinations thereof, and the like. In various implementations, the first electronic locker arrangement 110(1) can send the sensor data to the logistics management system 108 and the logistics management system 108 can determine that the item 102 has been removed from the locker of the first electronic locker arrangement 110(1). In other implementations, the first electronic locker arrangement 110(1) can send information to the logistics management system 108 indicating that the locker of the first electronic locker arrangement 110(1) has been closed. In various implementations, the first electronic locker arrangement 110(1) or a logistics application executed by the third computing device 302 can display one or more user interfaces to obtain input from the courier 112 indicating that the item 102 has been removed from a locker of the first electronic locker arrangement 110(1).

After determining that the locker previously storing the item 102 has been closed, the logistics management system 108 can determine that the item 102 is in the possession of the courier 112. The logistics management system 108 can update a status of the item 102 to indicate that the item 102 is in transport from the first electronic locker arrangement 110(1) to the second electronic locker arrangement 110(2). The courier 112 can move to the location of the second electronic locker arrangement 110(2) to drop off the item 102 for pick up by the recipient 106. The courier 112 can provide an identifier of the item 102, an identifier of the courier 112, or both to obtain access to a locker of the second electronic locker arrangement 110(2). In particular implementations, the courier 112 can operate the third computing device 302 to display an identifier of the item 102 via the logistics application executed by the third computing device 302. In illustrative implementations, the third computing device 302 can display the bar code of the item 102. A bar code scanner of the second electronic locker arrangement 110(2) can scan the bar code.

The second electronic locker arrangement 110(2) or the logistics management system 108 can determine that the identifier (e.g., bar code) obtained via the third computing device 302 corresponds to the item and also identify the locker of the second electronic locker arrangement 110(2) that is assigned to store the item 102 for pickup by the recipient 106. In various implementations, the second electronic locker arrangement 110(2) can obtain an identifier from the third computing device 302 and send the identifier to the logistics management system 108. The logistics management system 108 can access data stored in a database to verify that the item 102 is to be stored by the second electronic locker arrangement 110(2) and to identify a locker of the second electronic locker arrangement 110(2) that is to store the item 102. In these scenarios, the logistics management system 108 can send information to the second electronic locker arrangement 110(2) to open the locker to store the item 102.

The second electronic locker arrangement 110(2) can obtain sensor data related to the placement of the item 102 in a locker of the second electronic locker arrangement 110(2). The second electronic locker arrangement 110(2) or the logistics management system 108 can determine, based at least partly on the sensor data, that the item 102 has been stored in the second electronic locker arrangement 110(2). The second electronic locker arrangement 110(2) or the logistics management system 108 can also determine that the item 102 has been stored in the second electronic locker arrangement 110(2) based at least partly on input provided by the courier 112 at the second electronic locker arrangement 112(2) or via a logistics application executed by the third computing device 302 indicating that the item has been stores in the second electronic locker arrangement 110(2). After determining that the item 102 has been stored in the second electronic locker arrangement 110(2), the logistics management system 108 can send a notification to the recipient 106 that the item 102 is available for pickup. In some cases, the notification can indicate a location of the electronic locker arrangement 110. The notification can also include information indicating the sender 104. The notification can be sent to the second computing device 204. In various implementations, the notification can be received and processed by a logistics application executed by the second computing device 204. The logistics application can be provided by a service provider associated with the logistics management system 108, in some cases. In some implementations, the logistics application executed by the second computing device 204 can be another instance of the logistics application being executed by the first computing device 202.

The recipient 106 can request to access the locker of the second electronic locker arrangement 110(2) that is storing the item 102. Based on receiving the request to access the locker storing the item 102, the second electronic locker arrangement 110(2) can send a request to the logistics management system 108 for identity verification information. In some implementations, the identity verification information can include a QR code. In particular implementations, based on receiving the request from the second electronic locker arrangement 110(2) for identity verification information, the logistics management system 108 can generate the identity verification information and provide the identity verification information to the second electronic locker arrangement 110(2). In illustrative examples, the logistics management system 108 can generate a QR code that uniquely identifies the recipient 106 in relation to the item 102 and send the QR code to the second electronic locker arrangement 110(2). The QR code provided to the recipient 106 via the second electronic locker arrangement 110(2) is different from the QR code provided to the courier 112 via the first electronic locker arrangement 110(1). The second electronic locker arrangement 110(2) can then provide the QR code to the recipient 106. For example, the second electronic locker arrangement 110(2) can display the QR code and the recipient 106 can utilize the second computing device 202 to scan the QR code. The second computing device 202 can then extract an identifier encoded by the QR code and send the identifier to the logistics management system 108. In some cases, the identifier extracted from the QR code can include an identifier of the second electronic locker arrangement 110(2). The logistics application executing on the second computing device 204 can also provide additional information to the logistics management system 108, such as an identifier of the recipient 106 that is stored on the second computing device 204 in association with the logistics application. In this way, the logistics management system 108 can verify the identity of the recipient 106 based on the first identifier extracted from the QR code that was obtained by the second computing device 204 from the second electronic locker arrangement 110(2) and the second identifier of the recipient 106.

In response to verifying the identity of the recipient 106, the logistics management system 108 can cause the second electronic locker arrangement 110(2) to provide access to a locker storing the item 102 by the recipient 106. In some implementations, the logistics management system 108 can send a signal to the second electronic locker arrangement 110(2) to open the locker storing the item 102. The second electronic locker arrangement 110(2) can determine that the item 102 has been removed from the locker based at least partly on sensor data obtained by the second electronic locker arrangement 110(2). In some cases, the sensor data can include video, images, weight sensors, magnetic sensors, combinations thereof, and the like. In various implementations, the second electronic locker arrangement 110(2) can send the sensor data to the logistics management system 108 and the logistics management system 108 can determine that the item 102 has been removed from the locker of the second electronic locker arrangement 110(2). In other implementations, the second electronic locker arrangement 110(2) can send information to the logistics management system 108 indicating that the locker of the second electronic locker arrangement 110(2) has been closed.

After determining that the locker previously storing the item 102 has been closed, the logistics management system 108 can determine that the item 102 has been delivered to the recipient 106. In particular implementations, the logistics management system 108 can also determine that the item 102 has been delivered to the recipient 106 based at least partly on information received via the logistics application executed by the second computing device 204. For example, the logistics application can provide one or more user interfaces that can capture input from the recipient 106 indicating that the item 102 has been delivered to the recipient 106. In other examples, the second electronic locker arrangement 110(2) or a logistics application executed by the second computing device 204 can display one or more user interfaces to obtain input from the recipient 106 indicating that the item 102 has been removed from a locker of the second electronic locker arrangement 110(2). The logistics management system 108 can then update a database associated with the logistics management system 108 to indicate that the item 102 has been delivered to the recipient 106.

Figure 4:
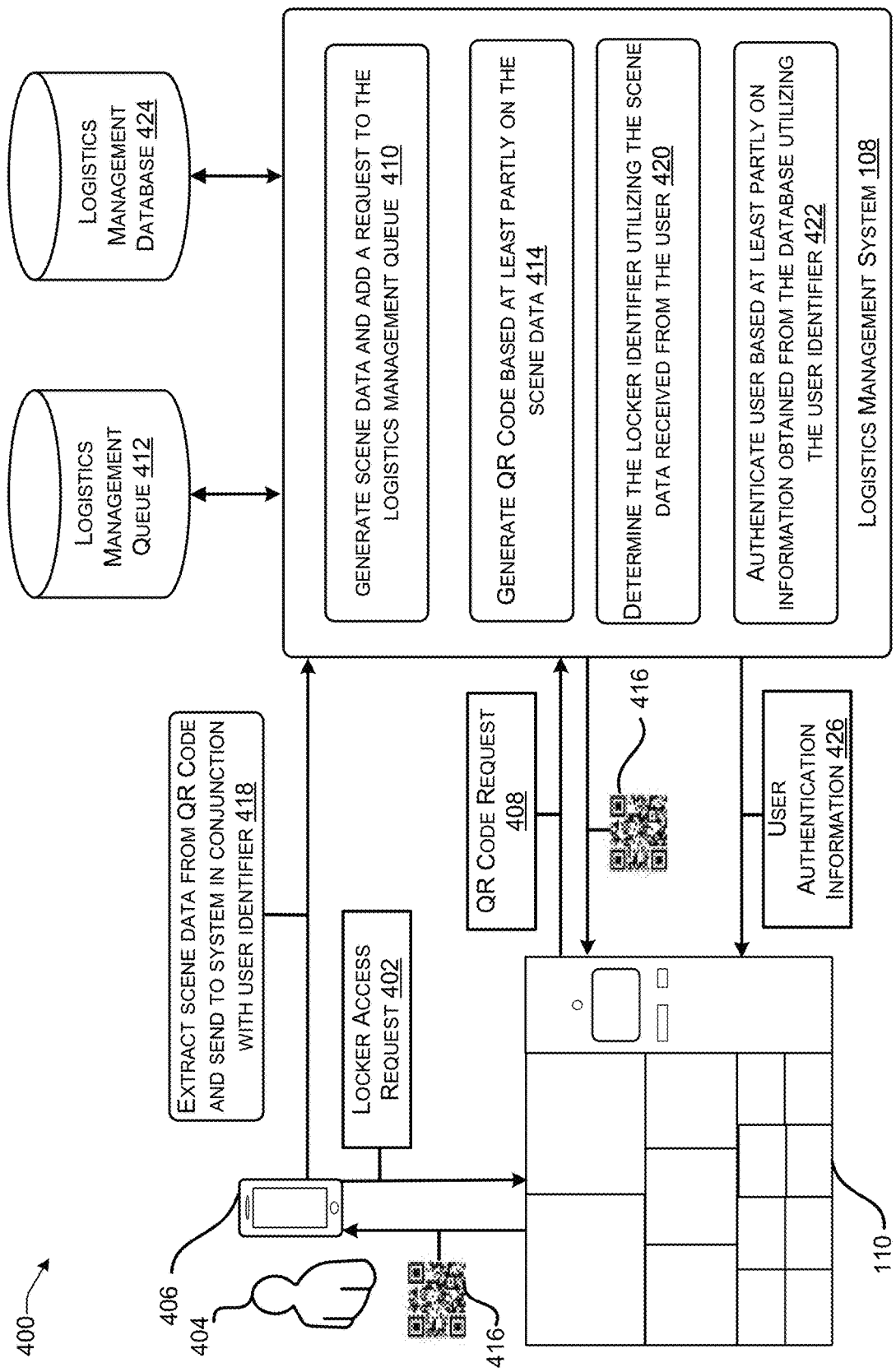
FIG. 4 is a diagram of an architecture to provide secure access to an electronic locker arrangement for the delivery of an item from a sender to a recipient according to some implementations.

FIG. 4 is a diagram of an architecture 400 to provide secure access to an electronic locker arrangement 110 for the delivery of an item from a sender to a recipient according to some implementations. In particular, the electronic locker arrangement 110 can receive a locker access request 402 from a user 404 via a computing device 406 of the user 404. In other implementations, the locker access request 402 can be obtained via one or more user interfaces displayed by the electronic locker arrangement 110. The user 404 can be any individual attempting to gain access to a locker of the electronic locker arrangement 110 to obtain an item being stored by the electronic locker arrangement 110. In some illustrative examples, the user 404 can include a courier requesting access to obtain an item that is to be delivered from the electronic locker arrangement 110 to an additional electronic locker arrangement. In other illustrative examples, the user 404 can include a recipient that is requesting to pick up an item that is being delivered to the recipient from a sender of the item. In various implementations, the locker access request 402 can include an identifier of the item that the user 404 is attempting to obtain from the electronic locker arrangement 110. In certain implementations, the locker access request 402 can include an identifier of the user 404.

Based at least partly on receiving the locker access request 402, the electronic locker arrangement 110 can send a QR code request 408 to the logistics management system 108. At 410, the logistics management system 108 can generate scene data in response to receiving the QR code request 408 and add a request to the logistics management queue 412. In particular implementations, the logistics management queue 412 can include requests for QR codes that have been provided by one or more electronic locker arrangements that are communicatively coupled to the logistics management system 108. Additionally, the scene data can include at least one of a time stamp corresponding to a time that the locker access request 402 was received or an identifier of the electronic locker arrangement 110. In particular implementations, the scene data can include a location of the electronic locker arrangement 110. The scene data can also include an identifier of a locker storing the item. At 414, the logistics management system 108 can generate a QR code 416 based at least partly on the scene data. By utilizing the scene data to generate the QR code 416, the logistics management system 108 can generate a QR code 416 that uniquely identifies the user 404 with respect to an item that the user 404 is attempting to obtain from the electronic locker arrangement 110. The QR code 416 can, in certain implementations, encode information included in the scene data.

The logistics management system 108 can send the QR code 416 to the electronic locker arrangement 110. The electronic locker arrangement 110 can display the QR code 416 via a display device of the electronic locker arrangement 110. The user 404 can utilize the computing device 406 to scan the QR code 416. In some cases, the QR code 416 can be scanned using a logistics application executed by the computing device 406. The computing device 406 can extract at least a portion of the scene data that is encoded by the QR code 416. In certain examples, the computing device 406 can extract an identifier of the locker storing the item from the QR code 416. Additionally, the computing device 406 can determine a user identifier corresponding to the user 404. In some cases, the logistics application executed by the computing device 406 can determine the user identifier based on information provided by the user 404 during registration of the logistics application. In various implementations, the user identifier can be associated with an account of the user 404 with the logistics management system 108. The computing device 406 can provide the information extracted from the scene data and the user identifier to the logistics management system 108.

At 420, the logistics management system 108 can utilize the portion of the scene data extracted from the QR code 416, such as an identifier of the locker storing the item and provided by the computing device 406 to verify an identity of the user 404. The logistics management system 108 can, at 422, utilize the user identifier and the identifier of the electronic locker arrangement 110 to parse information stored in a logistics management database 424. In particular implementations, the logistics management system 108 can access information stored by the logistics management database 424 to determine that the user 404 is authorized to obtain access to an item stored by the electronic locker arrangement 110. In some examples, the logistics management system 108 can access the logistics management database 424 to determine that the user 404 is a courier that has been selected to deliver the item to a recipient and that the courier has been authorized to pick up the item from the electronic locker arrangement 110. In other examples, the logistics management system 108 can access the logistics management database to determine that the user 404 is a recipient that is authorized to access the electronic locker arrangement 110 to obtain an item that has been sent to the recipient. In response to determining that the user 404 is authorized to access an item stored by the electronic locker arrangement 110, the logistics management system 108 can send user authentication information 426 to the electronic locker arrangement 110. The user authentication information 426 can indicate that the electronic locker arrangement 110 can open a locker storing an item that corresponds to the user 404.

Figure 5:
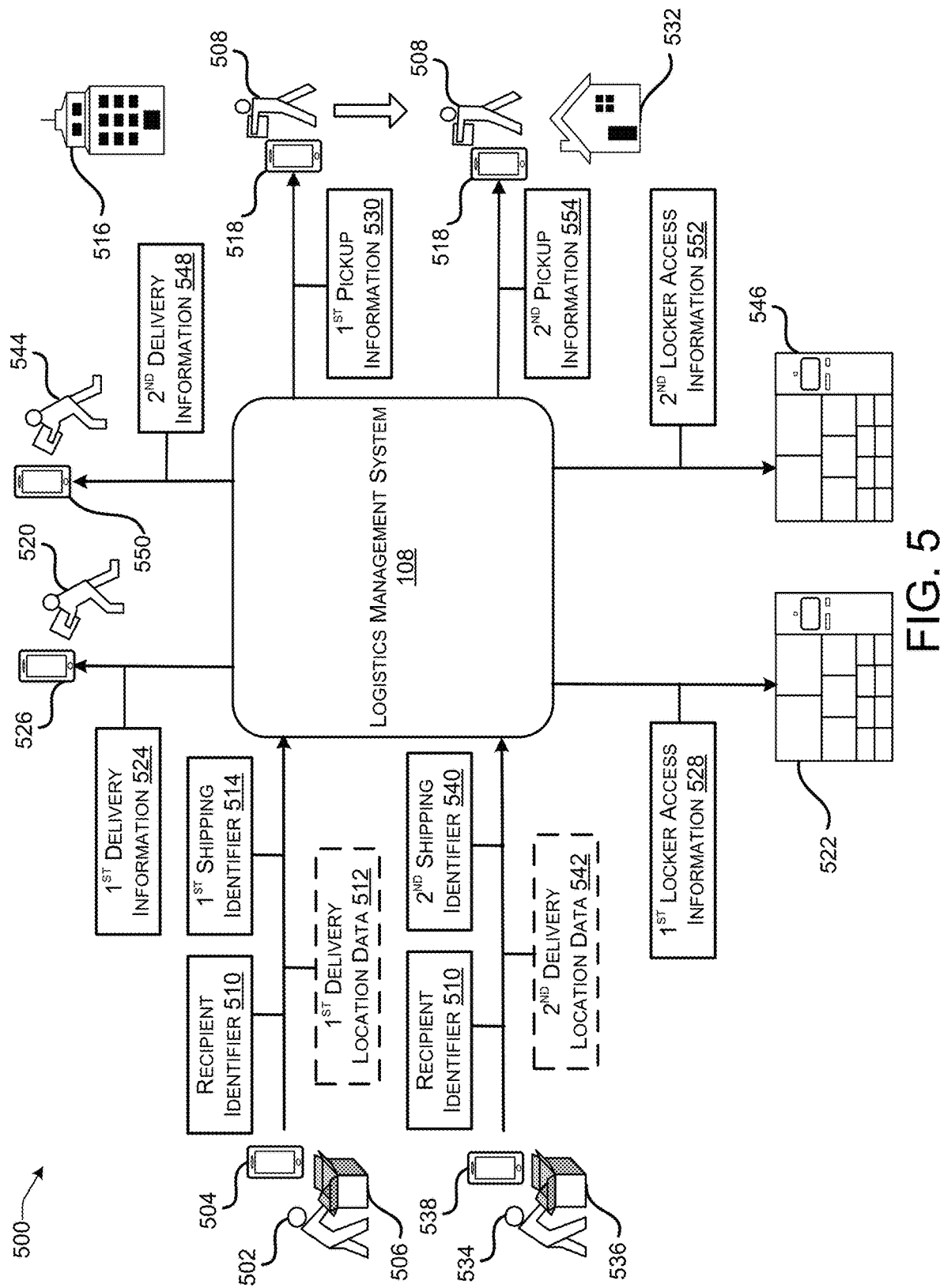
FIG. 5 is a diagram of an architecture to coordinate delivery of items to recipients when the locations of the recipients may change.

FIG. 5 is a diagram of an architecture 500 to coordinate delivery of items to recipients when the locations of the recipients may change. The architecture 500 can include a first sender 502 and a first computing device 504 associated with the first sender 502. The first computing device 504 can include a mobile computing device, a tablet computing device, a laptop computing device, a desktop computing device, or combinations thereof. The first sender 502 can operate the first computing device 504 to deliver a first item 506 to a recipient 508. In particular implementations, the first sender 502 can operate the first computing device 504 to access one or more user interfaces provided by the logistics management system 108. The one or more user interfaces can include one or more user interface elements to capture information related to the delivery of the first item 506 to the recipient 508. For example, the first computing device 504 can display a user interface with user interface elements to capture a recipient identifier 510 corresponding to the recipient 508. The recipient identifier 510 can include a string of characters that correspond to at least one of one or more names of the recipient 508 or a numerical identifier of the recipient 508. The recipient identifier 510 can also include a system identifier that includes an alphanumeric string that uniquely identifies the recipient 508 within the logistics management system 108. In various examples, the first computing device 504 can also display a user interface with one or more user interface elements to capture identifiers of the first sender 502, such as one or more names of the first sender and/or a system identifier of the first sender 502 that uniquely identifies the first sender 502 within the logistics management system 108.

Optionally, the first computing device 504 can display a user interface with user interface elements to capture first delivery location data 512 that corresponds to a location to deliver the first item 506. The first delivery location data 512 can include at least one of a city, a state, or a zip code that corresponds to the destination of the first item 506. The first computing device 504 can also display a user interface that includes a user interface element to capture additional information. To illustrate, the first computing device 504 can display a user interface with a user interface element that includes a user interface element to capture an indication that the first item 506 is to be delivered to the first recipient 608 via an electronic locker arrangement. In particular implementations, the logistics management system 108 can determine that the first item 506 is to be delivered via an electronic locker arrangement based at least partly on the first delivery location data 512, a system identifier of the recipient 508, and/or a recipient identifier of the first sender 502.

In various implementations, the logistics management system 108 can obtain information related to the delivery of the first item 506 to the recipient 508, such as at least one of the recipient identifier 510 or the first delivery location data 512. The logistics management system 108 can generate a first shipping identifier 514 corresponding to the delivery of the first item 506 to the recipient 508. The first shipping identifier 514 can include a random or pseudo-random string of characters generated by the logistics management system 108 that uniquely corresponds to the delivery of the first item 506 to the recipient 508. In this way, the delivery of the first item 506 to the recipient 508 can be tracked by the logistics management system 108 using the first shipping identifier 514. In some examples, the first shipping identifier 514 can include an indicator of a name of the recipient 508, such as a first name initial and a last name initial of the recipient 508. In additional examples, the first shipping identifier 514 can include location related data of the recipient 508, such as a zip code where the first item 506 is to be delivered.

The logistics management system 108 can then determine a first location 516 of the recipient 508. In certain implementations, the first location 516 of the recipient 508 can be obtained from the first delivery location data 512. In additional implementations, the first location 516 of the recipient 508 can be determined based at least partly on location data of the recipient 508 obtained by the logistics management system 108. For example, a second computing device 518 can be associated with the recipient 508 and location data, such as GPS data, can be obtained by the logistics management system 108 from the second computing device 518.

After determining the first location 516 of the recipient 508, the logistics management system 108 can determine an electronic locker arrangement that corresponds to the first location 516. For example, the logistics management system 108 can identify an electronic locker arrangement that is located in a same zip code as the first location 516 of the recipient 508. Additionally, the logistics management system 108 can determine an electronic locker arrangement that is within a threshold distance of the first location 516 of the recipient 508. In various implementations, the logistics management system 108 can determine an electronic locker arrangement to deliver the first item 506 based on an availability of lockers in a plurality of electronic locker arrangements. Further, the logistics management system 108 can determine an electronic locker arrangement to deliver the item based on a time of delivery for the first item 506. The logistics management system 108 can also determine an electronic locker arrangement to deliver the first item 506 based on a size of the first item 506 and the sizes of available lockers in a plurality of electronic locker arrangements. In certain implementations, the logistics management system 108 can determine a number of electronic locker arrangements that can be used to store the first item 506 during the delivery of the first item 506 to the recipient 508. To illustrate, in order to deliver the first item 506 to the recipient 508, the first item 506 can be stored in one or more intermediate electronic locker arrangements before being stored in its final electronic locker arrangement from which the recipient 508 can pick up the first item 506. The intermediate electronic locker arrangements can be in locations that are different from the first location 516 of the recipient 508.

The logistics management system 108 can determine one or more couriers to deliver the first item 506 to the recipient 508. The logistics management system 108 can obtain location data corresponding to a number of couriers and determine at least one courier to deliver the first item 506 to the recipient 508 based on the location(s) of the at least one courier. In addition, the logistics management system 108 can determine one or more candidate couriers to deliver the first item 506 to the recipient 508 based on a proximity of couriers to a pickup location for the first item 506 and one or more drop off locations for the first item 506 in relation to the delivery of the first item 506 to the recipient 508. For example, the logistics management system 108 can determine one or more candidate couriers to deliver the first item 506 to the recipient 508 based on the locations of the one or more couriers being within a threshold distance of the at least one of the pickup location for the first item 506 or a drop off location for the first item 506, such as the first location 516. In particular implementations, the logistics management system 108 can determine one or more candidate couriers to deliver the first item 506 to the recipient 508 based on a number of items that the couriers have already committed to delivering and/or the status of those deliveries. To illustrate, the logistics management system 108 can identify one or more candidate couriers to deliver the first item 506 to the recipient 508 based at least partly on the one or more candidate couriers having less than a threshold number of items to be delivered, such as in a delivery queue of the couriers. After identifying one or more candidate couriers to deliver the first item 506 to the recipient 508, the logistics management system 108 can select at least one of the candidate couriers to make the delivery of the first item 506 to the recipient 508. The number of couriers selected by the logistics management system 108 to deliver the first item 506 to the recipient 508 can be based at least partly on a number of pickup locations, a number of drop off locations, a number of electronic locker arrangements being used to store the first item 506, or combinations thereof.

In an illustrative example, the logistics management system 108 can determine that the first courier 520 is assigned to deliver the first item 506 to the recipient 508 at the first electronic locker arrangement 522. In this situation, the logistics management system 108 can send first delivery information 524 to a first courier computing device 526 of the first courier 520. The first delivery information 524 can indicate a pickup location of the first item 506 and a location of the first electronic locker arrangement 522. In certain implementations, the first delivery information 524 can include additional information. For example, the first delivery information 524 can also include an identifier of the recipient 508, such as at least a portion of the recipient identifier 510, and/or at least a portion of the first shipping identifier 514. Additionally, the first delivery information 524 can include instructions about the care, handling, and delivery of the first item 506 and/or information about characteristics of the first item 506. To illustrate, the first delivery information 524 can indicate that the first item 506 is fragile, is to be handled with care, requires refrigeration, and so forth.

In various implementations, at least a portion of the first delivery information 524 can be included on a shipping label for the first item 506. To illustrate, a shipping label can include at least the recipient identifier 510 and/or the first shipping identifier 514. Additionally, the shipping label can indicate that the first item 506 is to be delivered to an electronic locker arrangement located in a particular zip code, such as a zip code of the first location 516. In certain implementations, the shipping label can indicate that the first item 506 is to be delivered to the first electronic locker arrangement 522 and/or indicate a location of the first electronic locker arrangement 522.

Further, the logistics management system 108 can send first locker access information 528 to the first electronic locker arrangement 522. The first locker access information 528 can include one or more codes to access a locker of the first electronic locker arrangement 522 in relation to delivery of the first item 506 to the recipient 508. The one or more codes can also be sent to at least one of the first courier computing device 526 and the recipient computing device 516. The one or more codes can be entered via one or more input devices of the first electronic locker arrangement 522 by the first courier 518 to access a locker of the first electronic locker arrangement 522 to store the first item 506 and/or by the recipient 508 to access a locker of the first electronic locker arrangement 522 to retrieve the first item 506. The one or more codes can include alphanumeric character strings, in some implementations. In additional implementations, the one or more codes can include a QR code. In illustrative examples, the first locker access information 528 can include at least a portion of the shipping identifier.

In various implementations, at least a portion of the first locker access information 528 can be sent to the recipient computing device 518 as first pickup information 530. The first pickup information 530 can include one or more codes to access a locker of the first electronic locker arrangement 522 storing the first item 506. In illustrative examples, at least a portion of the first shipping identifier 514 can be used to access the locker of the first electronic locker arrangement 522. Additionally, a QR code can be used to access the locker of the first electronic locker arrangement 522 that is to store the item. In certain implementations, the QR code can be generated based at least partly on the first shipping identifier 514. The first pickup information 526 can also include a location of the first electronic locker arrangement 522. Additionally, the first pickup information 526 can include a time or period of time for picking up the first item 506 from the first electronic locker arrangement 522. Further, the first pickup information 526 can include instructions for the care and/or handling of the first item 506.

Additionally, the first electronic locker arrangement 522 can be accessed by the first courier 520 by providing the first shipping identifier 514 to the first electronic locker arrangement 522 from a shipping label. For example, the first courier 520 can enter the first shipping identifier 514 into the first electronic locker arrangement 522 using one or more input devices of the first electronic locker arrangement 522, such as a keypad or touch screen device. In additional implementations, the first courier 520 can also scan the first shipping identifier 514 from the shipping label using a scanning device of the first electronic locker arrangement 522.

After receiving the first shipping identifier 514, the logistics management system 108 can verify that the first shipping identifier 514 is associated with a delivery to the first electronic locker arrangement 522 by parsing one or more data records of the logistics management system 108. The logistics management system 108 can send a signal to the first electronic locker arrangement 522 to open a locker in response to verifying that the first item 506 is to be delivered to the first electronic locker arrangement 522. In certain implementations, the recipient 508 can also access the first electronic locker arrangement 522 using a system identifier of the recipient 508.

In illustrative implementations, the location of the recipient 508 can change. For example, the location of the recipient 508 can change from the first location 516 to a second location 532. In some situations, the location of the recipient 508 can change to the second location 532 during the time that the first item 506 is being delivered to the recipient 508. In these instances, the logistics management system 108 can obtain location data indicating the change in location of the recipient 508 from the first location 516 to the second location 532. In various implementations, the location data can include GPS data or other location data obtained by the logistics management system 108 from the recipient computing device 518. In response to receiving the location data indicating the change in location of the recipient 508, the logistics management system 108 can determine a status of the delivery of the first item 506. In some examples, the status of the first item 506 can indicate that the first item 506 has not been picked up by the first courier 520 for delivery. In additional examples, the status of the first item 506 can indicate that the first item 506 is in transit to the first electronic locker arrangement 522. In particular examples, the status of the first item 506 can indicate a location of the first courier 520 during the delivery of the first item 506. In further examples, the status of the first item 506 can indicate that the first item 506 has been delivered to the first electronic locker arrangement 522.

In scenarios where the first item 506 has not been delivered to the first electronic locker arrangement 522, the logistics management system 108 can determine whether the delivery of the first item 506 can be re-routed to another electronic locker arrangement corresponding to the second location 532. Determining whether the delivery of the first item 506 can be re-routed to an alternate electronic locker arrangement that corresponds to the second location 532 can be based on a distance of the first courier 520 from the first electronic locker arrangement 522 and/or based on whether or not the first item 506 has been picked up by the first courier 520. In situations where the first courier 520 has not picked up the first item 506 for delivery to the recipient 508 or the location of the first courier 520 is greater than a threshold distance away from the first electronic locker arrangement 522, the logistics management system 108 can send additional information to the first courier computing device 526 informing the first courier 520 of the change to the delivery location. In particular implementations, the logistics management system 108 can determine an additional courier to deliver the first item 506 to an additional electronic locker arrangement corresponding to the second location 532.

In other scenarios, the location of the recipient 508 can change to the second location 532 before a time that a second sender 534 is arranging for the delivery of a second item 536 to the recipient 508. In these scenarios, the second sender 534 can operate a second sender computing device 538 to send information to the logistics management system 108 in relation to the delivery of the second item 536 to the recipient 508 at the second location 532. In various implementations, the second sender computing device 538 can obtain data from the logistics management system 108 corresponding to user interfaces that include user interface elements that can capture information associated with the delivery of the second item 536 to the recipient 508 at the second location 532. For example, the second sender computing device 538 can display a user interface that captures the recipient identifier 510. Additionally, in some examples, logistics management system 108 can generate a second shipping identifier 540. The second shipping identifier 540 can be different from the first shipping identifier 514. In certain implementations, the second shipping identifier 540 can be generated by the logistics management system 108 and sent to the recipient computing device 518. The recipient 508 can then send the second shipping identifier 540 to the second sender computing device 538 to be used to arrange for the delivery of the second item 536 to the recipient 508 at the second location 532.

Optionally, the second sender computing device 538 can display a user interface to capture second delivery location data 542. The second delivery location data 542 can include information that corresponds to the second location 532. To illustrate, the second delivery location data 542 can include a zip code corresponding to the second location 532. The logistics management system 108 can coordinate the delivery of the second item 536 without the second delivery location data 542 in implementations where the logistics management system 108 is obtaining location data related to the second recipient, such as GPS data or triangulation data, from the recipient computing device 518.

In response to receiving a request from the second sender computing device 538 to have the second item 536 delivered to the recipient 508 at the second location 532, the logistics management system 108 can then proceed to determine an electronic locker arrangement to which the second item 536 is to be delivered and also determine a courier to deliver the second item 536. In the illustrative example of FIG. 5, the logistics management system 108 can determine that the second item is to be delivered by the second courier 544 to the second electronic locker arrangement 546. The logistics management system 108 can send second delivery information 548 to a second courier computing device 550 that can include a location of the second electronic locker arrangement 546. The second delivery information 548 can also include information to access a locker of the second electronic locker arrangement 546 in which to deliver the second item 536. In certain implementations, the second delivery information 548 can include at least a portion of the second shipping identifier 540. In various implementations, at least a portion of the second delivery information 548 can be included on a shipping label for the second item 536. To illustrate, a shipping label can include at least the recipient identifier 510 and/or the second shipping identifier 540. Additionally, the shipping label can indicate that the second item 536 is to be delivered to an electronic locker arrangement located in a particular zip code, such as a zip code of the second location 532. In certain implementations, the shipping label can indicate that the second item 536 is to be delivered to the second electronic locker arrangement 546 and/or indicate a location of the second electronic locker arrangement 546.

Additionally, the logistics management system 108 can send second locker access information 552 to the second electronic locker arrangement 546. The second locker access information 552 can be used to access a locker of the second electronic locker arrangement 546 that is to store the second item 536 until the second item 536 is picked up by the recipient 508. In various implementations, the second locker access information 552 can include one or more codes and/or identifiers to access a locker of the second electronic locker arrangement 546 that is to store the second item 536. In certain implementations, at least a portion of the second locker access information 552 can be provided to the second courier computing device 550 as part of the second delivery information 548. Further, the logistics management system 108 can include at least a portion of the second locker access information 552 in second pickup information 554 that is sent to the recipient computing device 518. The second pickup information 554 can include information related to a location of the second electronic locker arrangement 546, a locker storing the second item 536 in the second electronic locker arrangement 546, care and handling instructions of the second item 536, a time or time period of delivery of the second item 536 to the second electronic locker arrangement 546, and/or a time to pick up the second item 536 from the second electronic locker arrangement 546. The second locker access information 552 and the second pickup information 554 can include at least a portion of the second shipping identifier 540. The second shipping identifier 540 can also, in some implementations, be used to generate a QR code that can be used to access the second electronic locker arrangement 546 to drop off and/or pick up the item 536.

In particular implementations, the second electronic locker arrangement 546 can be accessed by the second courier 544 by providing the second shipping identifier 540 to the second electronic locker arrangement 546 from a shipping label. For example, the second courier 544 can enter the second shipping identifier 540 into the second electronic locker arrangement 546 using one or more input devices of the second electronic locker arrangement 546, such as a keypad or touch screen device. In additional implementations, the second courier 544 can also scan the second shipping identifier 540 from the shipping label using a scanning device of the second electronic locker arrangement 546.

After receiving the second shipping identifier 540, the logistics management system 108 can verify that the second shipping identifier 540 is associated with a delivery to the second electronic locker arrangement 546 by parsing one or more data records of the logistics management system 108. The logistics management system 108 can send a signal to the second electronic locker arrangement 546 to open a locker in response to verifying that the second item 536 is to be delivered to the second electronic locker arrangement 546. In certain implementations, the recipient 508 can also access the second electronic locker arrangement 546 using a system identifier of the recipient 508.

Figure 6:
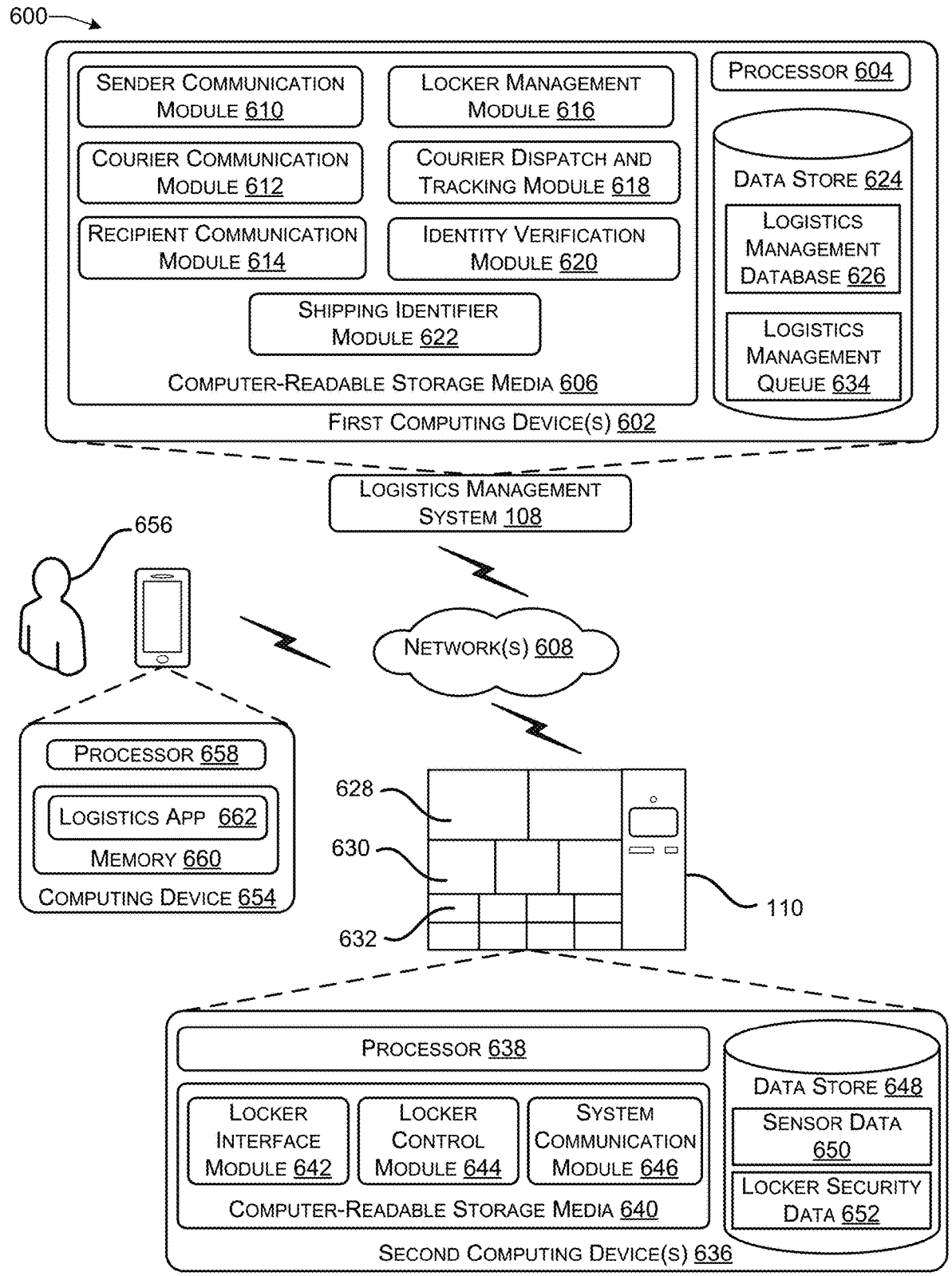
FIG. 6 is a diagram of a system including an electronic locker arrangement, a logistics management system, and a logistics mobile application to facilitate the delivery of an item from a sender to a recipient according to some implementations.

FIG. 6 is a diagram of a system 600 including an electronic locker arrangement 110, a logistics management system 108, and a logistics mobile application to facilitate the delivery of an item from a sender to a recipient according to some implementations. The system 600 may include one or more first computing devices 602. The one or more first computing devices 602 can be associated with the logistics management system 108. In some implementations, the one or more first computing devices 602 can be included in a cloud computing architecture that operates the one or more first computing devices 602 on behalf of a service provider implementing the logistics management system 108. In these scenarios, the cloud computing architecture can implement one or more virtual machine instances on behalf of the service provider associated with the logistics management system 108 on the one or more first computing devices 602. The cloud computing architecture can be located remote from a service provider associated with the logistics management system 108. In additional implementations, the one or more first computing devices 602 can be under the direct control of the service provider associated with the logistics management system 108. For example, the service provider associated with the logistics management system 108 can maintain the one or more first computing devices 602 to perform operations related to coordinating and managing the delivery of items from senders to recipients. In various implementations, the one or more first computing devices 602 can include one or more server computers.

The one or more first computing devices 602 can include one or more processors, such as processor 604. The one or more processors 604 can include at least one hardware processor, such as a microprocessor. In some cases, the one or more processors 604 can include a central processing unit (CPU), a graphics processing unit (GPU), or both a CPU and GPU, or other processing units. Additionally, the one or more processors 604 can include a local memory that may store program modules, program data, and/or one or more operating systems.

In addition, the one or more first computing devices 602 can include one or more computer-readable storage media, such as computer-readable storage media 606. The computer-readable storage media 606 can include volatile and nonvolatile memory and/or removable and non-removable media implemented in any type of technology for storage of information, such as computer-readable instructions, data structures, program modules, or other data. Such computer-readable storage media 606 can include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the one or more first computing devices 602, the computer-readable storage media 606 can be a type of tangible computer-readable storage media and can be a non-transitory storage media.

The one or more first computing devices 602 can include one or network interfaces (not shown) to communicate with other computing devices via one or more networks 608. The one or more networks 608 can include one or more of the Internet, a cable network, a satellite network, a wide area wireless communication network, a wired local area network, a wireless local area network, or a public switched telephone network (PSTN).

The computer-readable storage media 606 can be used to store any number of functional components that are executable by the one or more processors 604. In many implementations, these functional components comprise instructions or programs that are executable by the one or more processors 604 and that, when executed, implement operational logic for performing the operations attributed to the one or more first computing devices 602. Functional components of the one or more first computing devices 602 that can be executed on the one or more processors 604 for implementing the various functions and features related to coordinating and managing the delivery of items utilizing electronic locker arrangements, as described herein, include a sender communication module 610, a courier communication module 612, a recipient communication module 614, a locker management module 616, a courier dispatch and tracking module 618, an identity verification module 620, and a shipping identifier module 622.

Additionally, the one or more first computing devices 602 can include one or more input/output devices (not shown). The one or more input/output devices can include a display device, keyboard, a remote controller, a mouse, a printer, audio input/output devices, a speaker, a microphone, a camera, and so forth The one or more first computing devices 602 can also include, or be coupled to, a data store 622 that can include, but is not limited to, RAM, ROM, EEPROM, flash memory, one or more hard disks, solid state drives, optical memory (e.g. CD, DVD), or other non-transient memory technologies. The data store 622 can maintain information that is utilized by the one or more first computing devices 602 to perform operations related to coordinating and managing the delivery of items utilizing electronic locker arrangements. For example, the data store 622 can store a logistics management database 626.

The logistics management database 626 can include information indicating transactions related to the delivery of items from senders to recipients. For each request by a sender to have an item delivered to a recipient using the logistics management system 108, the logistics management database 626 can generate a set of data stored in a data structure, such as a database table, one or more rows of a database table, and/or a record, dedicated to storing information associated with coordinating and managing the delivery of the item from the sender to the recipient. For example, the logistics management database 626 can store information about the sender and the recipient. To illustrate, the logistics management database 626 can store names of the sender and recipient, locations of the sender and recipient, payment information for the sender and/or the recipient, delivery preferences of the sender and/or recipient, combinations thereof, and the like. The locations of the sender and recipient can include an address, a zip code, an Internet Protocol (IP) address, a real-time location, or combinations thereof. A real-time location of the sender and the recipient can include Geographic Positioning System (GPS) information, location information obtained from a mobile communications service provider (e.g., triangulation data), or both. In situations where the sender and/or the recipient have an account with the logistics management system 108, the logistics management database 626 can include respective login identifiers, passwords, and the like to enable the sender and/or recipient to access their account with the logistics management system 108.

The logistics management database 626 can also store information about items being delivered from recipients to senders. For example, the logistics management database 626 can store information indicating the weight of an item to be delivered, dimensions of an item to be delivered, a category or type of the item to be delivered (e.g., electronic device, baby products, household goods, etc.), images of the item to be delivered, a description of the item to be delivered, notes regarding the item to be delivered (e.g., fragile, irregular shape, perishable, etc.), combinations thereof, and so forth. Additionally, the logistics management database 626 can store information indicating timing related to the delivery of the item, such as a time that the item was dropped off by a sender at an electronic locker arrangement, a time that the item was picked up by a courier at an electronic locker arrangement, a time that the item was dropped off by a courier at an electronic locker arrangement, a time that a recipient picked up the item from an electronic locker arrangement, or combinations thereof. The logistics management database 626 can also store information indicating a time that the item is to be made available for pickup by a recipient and/or a time that the item is to be made available for pickup by a courier. In some cases, the logistics management database 626 can indicate a window of time that the item is to be available for pickup by a recipient or a courier. In other instances, the logistics management database 626 can indicate a threshold time (e.g., deadline) that the item is to be delivered to an electronic locker arrangement and available for pickup by a recipient or courier. In various implementations, the logistics management database 626 can store a status of items being delivered. The status of the items can indicate that the items have been dropped off by a sender or a courier, that the items are available for pick up by a courier or a recipient, that the items are in transport from one electronic locker arrangement to another electronic locker arrangement, or combinations thereof.

Further, the logistics management database 626 can include information related to individual couriers that are assigned to transport items between one or more electronic locker arrangements. To illustrate, the logistics management database 626 can include information indicating identifiers of couriers, delivery history of couriers, ratings of couriers, locations associated with couriers, combinations thereof, and the like. The delivery history of couriers can indicate a number of items delivered by individual couriers, types of items delivered by individual couriers, electronic locker arrangements accessed by individual couriers, times that items were delivered by individual couriers, or combinations thereof. The ratings of the couriers can be obtained from senders and/or recipients of items that were delivered by the individual couriers. In some cases, the ratings of the couriers can be obtained by the logistics management system 108 analyzing data related to metrics associated with delivery of items by couriers, such as on-time delivery by the couriers, time to transport items between electronic locker arrangements, errors made in the delivery of items, number of lost or damaged items, combinations thereof, and so forth. Additionally, the location information stored by the logistics management database 626 in conjunction with the delivery of items can indicate a real-time location of the couriers, locations indicated in profiles of the couriers, locations of electronic locker arrangements where the couriers have picked up and dropped off items, or combinations thereof. In certain implementations, the logistics management database 626 can indicate a status of couriers. The status of the couriers can indicate that the couriers are accepting items for delivery. In other situations, the status of the couriers can indicate that the couriers are not accepting items for delivery. In particular implementations, the status of the couriers can also indicate locations where the couriers are accepting items for delivery. The logistics management database 626 can also include a queue of items that are to be delivered by individual couriers.

The logistics management database 626 can also store information about electronic locker arrangements associated with the logistics management system 108. In some situations, the logistics management database 626 can store information indicating lockers of the electronic locker arrangements that are occupied with an item. The logistics management database 626 can also store information indicating lockers of the electronic locker arrangements that are scheduled to store items for drop off or pick up. Additionally, the logistics management database 626 can store information indicating dimensions of the lockers included in the electronic locker arrangements and/or weight capacities of the lockers of the electronic locker arrangements. In the illustrative example of FIG. 6, the representative electronic locker arrangement 110 can include a first locker 628 having first dimensions and/or a first weight capacity, a second locker 630 having second dimensions and/or a second weight capacity, and a third locker 632 having third dimensions and/or a third weight capacity. The first locker 628 can have larger dimensions and/or a higher weight capacity than both the second locker 630 and the third locker 632. The second locker 630 can have larger dimensions and/or a higher weight capacity than the third locker 632. In certain situations, at least one of the lockers 628, 630, 632 can be refrigerated or heated. The logistics management database 626 can also store information indicating that doors of the lockers of the individual electronic locker arrangements are open or closed.

In an illustrative implementation, the logistics management database 626 can include at least one data structure for individual requests to deliver an item from a sender to a recipient. The at least one data structure for an individual request to deliver an item can at least in part include an identifier of a sender, an identifier of a recipient, a location of a sender, a location of a recipient, dimensions of the item, category of the item, description of the item, images of the item, characteristics of the item (e.g., perishable, irregular shape), combinations thereof, and the like. Additionally, the at least one data structure for an individual request to deliver an item can at least in part include an identifier of a courier assigned to deliver the item, an identifier of at least one electronic locker arrangement assigned to store the item, an identifier of at least one particular locker assigned to store the item, or combinations thereof. Further, the at least one data structure for an individual request to deliver an item can include a location of a courier delivering the item, a location of the item, a status of at least one locker assigned to store the item (e.g., occupied, empty, door open, door closed), or combinations thereof. The at least one data structure for an individual request to deliver an item can also include one or more identifiers related to the item, such as one or more bar codes assigned to the item. In other implementations, the at least one data structure for an individual request to deliver an item can include authentication information to obtain access to at least one locker storing the item, such as a QR code provided in association with granting access to the at least one locker storing the item. In certain implementations, the at least one data structure for an individual request to deliver an item can include timing information related to the delivery of an item, such as drop off times, pick up times, delivery deadlines, time that the request to deliver the item was made or received, time that requests for authentication information were made or received, combinations thereof, and so forth.

The logistics management queue 634 can include requests that are awaiting processing by the one or more first computing devices 602. In particular implementations, the logistics management queue 634 can include requests to obtain QR codes that are received from electronic locker arrangements. The logistics management queue 634 can store the requests sequentially as they are received and provide the requests to the corresponding modules 610, 612, 614, 616, 618, 620, 622 based at least partly on the order in which the requests were received. In certain implementations, the logistics management queue 634 can provide the requests for processing by the modules 610, 612, 614, 616, 618, 620, 622 based on a priority associated with the requests.

The sender communications module 610 can include computer-readable instructions that when executed by the processor 604 send, receive, process, and store information corresponding to communications associated with a sender of an item to a recipient. In some implementations, the sender communication module 610 can obtain a request from a sender for an item to be delivered to a recipient. The request can indicate information about the sender, information about the item to be delivered, and information about the recipient. In particular implementations, the sender communication module 610 can provide a website to obtain requests from senders to deliver items to recipients. In additional implementations, the sender communications module 610 can be in communication with a mobile application executed by a computing device of a sender to obtain a request to deliver an item to a recipient. The sender communication module 610 can also provide information related to the delivery of the item to a computing device of the sender. For example, the sender communication module 610 can provide a notification that the item has been picked up by a courier or delivered to an electronic locker arrangement by a courier. The sender communication module 610 can also provide a notification that the recipient has picked up the item. Further, the sender communication module 610 can obtain payment information from the sender of the item.

The courier communication module 612 can include computer-readable instructions that when executed by the processor 604 send, receive, process, and store information corresponding to communications associated with a courier transporting an item between electronic locker arrangements. The courier communication module 612 can provide communications indicating that an item is available for delivery to a recipient. In some cases, the communications can include information about the item, a location of a first electronic locker arrangement storing the item, and a location of a second electronic locker arrangement where the item is to be delivered. The communications can also include an amount of payment for delivery of the item and/or a time by which the item is to be delivered. The courier communication module 612 can also obtain communications from couriers indicating a request to deliver an item and notifications that the couriers have been selected to deliver one or more items that are available to be delivered. In various implementations, the courier communication module 612 can obtain information indicating a status of couriers and/or information indicating locations where the couriers are available to deliver items. In particular implementations, the courier communications module 612 can obtain and provide communications related to couriers via a website. In additional implementations, the courier communication module 612 can be in communication with a mobile app executed by computing devices of couriers to obtain information from couriers and to provide information to couriers.

The recipient communication module 614 can include computer-readable instructions that when executed by the processor 604 send, receive, process, and store information corresponding to communications associated with a recipient of an item delivered via the logistics management system 108. The recipient communication module 614 can provide notifications to recipients that items are available to be picked up by the recipients. The notifications can include locations of locker arrangements that are storing items to be picked up the recipients. The notifications can also include information about the sender of the item. In some cases, the recipient communication module 614 can provide updates indicating a location of an item as it is being transported to an electronic locker arrangement for delivery to a recipient. Additionally, the recipient communication module 614 can obtain information from recipients that the recipients have obtained the items that are intended to be delivered to the recipients. In some implementations, the recipient communication module 614 can obtain and provide communications related to the delivery of items to recipients via a website. In additional implementations, the recipient communication module 614 can be in communication with a mobile app executed by computing devices of recipients to obtain information from recipients and to provide information to recipients.

In particular implementations, the sender communication module 610, the courier communication module 612, and the recipient communication module 614 can utilize a Short Messaging Service (SMS) gateway to communicate with senders, couriers, and recipients regarding items to be delivered to recipient from senders. The sender communication module 610, the courier communication module 612, and the recipient communication module 614 can also utilize an application programming interface (API) to facilitate communications between the one or more first computing devices 602 and computing devices of the senders, recipients, and couriers. In illustrative implementations, the API can include a representational state transfer (RESTful) API to facilitate communications between the one or more first computing devices 602 and computing devices of the senders, recipients, and the couriers. In particular, the API includes a number of calls that enable information to be exchanged between a platform of the one or more first computing devices 602 and various platforms of the computing devices of the senders, recipients, and the couriers that can be different from the platform of the one or more first computing devices 602. In some cases, the different platforms utilized by the one or more first computing devices 602 and the computing devices of the senders, recipients, and the couriers can correspond to different operating systems, different communication protocols, and/or different resource types (e.g., extensible markup language (XML) resources, hypertext markup language (HTML) resources, java script object notation (JSON) resources).

The locker management module 616 can include computer-readable instructions that when executed by the processor 604 coordinate the assignment of lockers at electronic locker arrangements to facilitate the delivery of items via the electronic locker arrangements. The locker management module 616 can be in communication with the sender communication module 610 or the logistics management database 526 to determine that a request has been received to deliver an item from a sender to a recipient. The locker management module 616 can utilize information included in the request to identify one or more electronic locker arrangements to store the item being delivered. The locker management module 616 can also determine specific lockers within an electronic locker arrangement to store the item.

In particular implementations, the locker management module 616 can determine a location of a sender of an item and determine a location of a recipient of the item. The locker management module 616 can also determine one or more electronic locker arrangements that correspond to the location of the sender and the location of the recipient. In an illustrative example, the locker management module 616 can determine a zip code of the sender and a zip code of the recipient. Continuing with this example, the locker management module 616 can determine one or more electronic locker arrangements that correspond to the zip code of the sender and the zip code of the recipient. In situations where the sender and the recipient are located in the same zip code, the locker management module 616 can identify a single electronic locker arrangement to utilize to deliver the item where the single electronic locker arrangement is located in the zip code of the sender and recipient. In scenarios where the sender and the recipient are located in different zip codes, the locker management module 616 can determine a first electronic locker arrangement located in the zip code of the sender to drop off the item and a second electronic locker arrangement in the zip code of the recipient for the recipient to pick up the item. In some implementations, the locker management module 616 can determine one or more intermediate electronic locker arrangements located between a first electronic locker arrangement located in a location of the sender and a second electronic locker arrangement located in a location of the recipient.

In additional implementations, the locker management module 616 can determine one or more electronic locker arrangements that are within a threshold distance of the location of the sender and the location of the recipient. In these situations, there can be multiple electronic locker arrangements disposed in a single zip code or there can be a single electronic locker arrangement that services multiple zip codes. In illustrative implementations, the locker management module 616 can identify one or more electronic locker arrangements that are within a threshold distance of a location of the sender to determine an electronic locker arrangement for the sender to drop off the item. The locker management module 616 can also identify one or more electronic locker arrangements that are within a threshold distance of a location of the recipient to determine an electronic locker arrangement for the recipient to pick up the item. In certain implementations, the threshold distance can include a radius or one or more other dimensions that define an area serviced by each electronic locker arrangement. The locker management module 616 can identify a first electronic locker arrangement to drop off the item based at least partly on determining that the sender of the item is located within an area serviced by the first electronic locker arrangement. The locker management module 616 can also identify a second locker arrangement for the recipient to pick up the item based at least partly on determining that the recipient of the item is located within an area serviced by the second electronic locker arrangement. In situations where a sender and/or recipient are located within service areas of multiple electronic locker arrangements, the locker management module 616 can determine the electronic locker arrangement that is within a shortest distance from the location of the sender and/or recipient to utilize for drop off and/or pick up of the item.

In various implementations, the locker management module 616 can determine one or more locker arrangements to store the item based at least partly on input obtained from the sender. In some cases, the locker management module 616 can obtain first input from the sender indicating a first electronic locker arrangement to store the item and second input from the sender indicating a second electronic locker arrangement to store the item. In particular implementations, the locker management module 616 can obtain the input indicating one or more electronic locker arrangements to store the item via a mobile app executed by a computing device of the sender or via a website of a service provider associated with the logistics management system 108. In certain implementations, the locker management module 616 can obtain information from an electronic locker arrangement indicating one or more electronic locker arrangements to store the item. For example, an electronic locker arrangement can provide one or more user interfaces to capture input indicating one or more electronic locker arrangements to store the item and provide the input to the locker management module 616. In an illustrative example, the locker management module 616 can obtain input from an individual specifying one or more electronic locker arrangements to store an item based at least partly on the sender and/or the recipient being located in a location that does not include an electronic locker arrangement. To illustrate, in situations where a sender and/or recipient is located in a zip code that does not include an electronic locker arrangement, input can be provided by an individual indicating an electronic locker arrangement where an item is to be dropped off or picked up. In some scenarios, the locker management module 616 can provide a suggestion indicating an electronic locker arrangement that is nearest the sender and/or recipient to store an item.

Further, the locker management module 616 can identify specific lockers within the one or more electronic locker arrangements that are to be utilized to deliver an item to a recipient. For example, the locker management module 616 can identify one or more lockers included in the one or more electronic locker arrangements that are available to store the item. The locker management module 616 can determine criteria, such as dimensions and/or a weight, of an item to be stored by an electronic locker arrangement and identify one or more lockers that satisfy the criteria of the item. To illustrate, the locker management module 616 can determine one or more lockers that the item can fit within by comparing dimensions of the item with dimensions of lockers of electronic locker arrangements. Based at least partly on the dimension and/or weight criteria and the availability of lockers, the locker management module 616 can assign at least one locker to store an item. In some cases, the locker management module 616 can assign a first locker to store the item until the item is picked up by a courier and a second locker to store the item until the item is picked up by the recipient. In other situations, the locker management module 616 can assign a single locker to store the item until the item is picked up by the recipient. The locker management module 616 can cause information to be stored in the logistics management database 626 indicating the one or more lockers assigned to store an item.

In particular situations, the locker management module 616 can process requests for delivery of multiple items to the same recipient. In these scenarios, the locker management module 616 can determine that the items can be stored in a single locker at one or more electronic locker arrangements or at multiple lockers of one or more electronic locker arrangements. The number of lockers assigned to store multiple items for a single recipient can be based at least partly on dimensions of the items with respect to dimensions of lockers and/or availability of lockers to store the items. In certain implementations, the items to be delivered to a recipient can be stored in a first number of lockers at a first electronic locker arrangement and a second number of lockers, different from the first number, at a second electronic locker arrangement.

In various implementations, the locker management module 616 can provide information to electronic locker arrangements that can be utilized to control access to the lockers of the electronic locker arrangements. In particular implementations, the locker management module 616 can provide signals to open and/or close particular lockers of an electronic locker arrangement. In some situations, the locker management module 616 can cause the electronic locker arrangements to display user interfaces and to obtain input from the electronic locker arrangements via the user interfaces. For example, the locker management module 616 can cause an electronic locker arrangement to display user interfaces related to obtaining a request by a sender to have an item delivered to a recipient. In other examples, the locker management module 616 can cause an electronic locker arrangement to display user interfaces related to providing and/or obtaining bar codes associated with an item. In additional examples, the locker management module 616 can cause an electronic locker arrangement to display user interfaces related to providing and/or obtaining user identity authentication information, such as QR codes or biometric information, in association with users obtaining access to lockers of the electronic locker arrangement to pick up an item stored by the electronic locker arrangement.

The locker management module 616 can dynamically and in real-time manage and coordinate assignments of items to lockers of electronic locker arrangements. In particular implementations, the locker management module 616 can process hundreds, up to thousands of requests at a time for items to be stored in lockers of electronic locker arrangements that are in communication with the logistics management system. In some implementations, the electronic locker arrangements in communication with the logistics management system 108 can be owned and/or managed by different entities. For example, some electronic locker arrangements in communication with the logistics management system 108 can be owned or operated by a service provider different from the service provider associated with the logistics management system 108, but these electronic locker arrangements can still be utilized by the logistics management system to deliver items.

In order to process large numbers of requests to store items in lockers, the locker management module 616 analyzes data obtained from the electronic locker arrangements (e.g., locker door open/close status, weight sensors, video/image data, dimensions and/or weight capacities of lockers) and information included in requests to deliver items via the electronic locker arrangements (e.g., dimensions of items, weight of items, time constraints on delivery, type of item) to determine lockers that are available to store items. In various implementations, the locker management module 616 can also analyze location information for items while the items are in transit and estimate delivery times to determine the availability of lockers in electronic locker arrangements to store items. In this way, the locker management module 616 can perform a complicated analysis of data, some of which can be changing dynamically (e.g., real-time location data), to determine the availability of lockers to store items and to assign lockers to store items for delivery via electronic locker arrangements.

The courier dispatch and tracking module 618 can include computer-readable instructions that when executed by the processor 504 to identify couriers and assign the couriers to deliver items via electronic locker arrangements. The courier dispatch and tracking module 618 can obtain information from the sender communication module 610 or the logistics management database 626 indicating a request to store an item for delivery to a recipient and determine, based on the information associated with the request, the location of the sender and the recipient. In some implementations, the courier dispatch and tracking module 618 can obtain information from the locker management module 616 indicating a location of one or more electronic locker arrangements that have been assigned to store the item. The courier dispatch and tracking module 618 can also obtain courier location information indicating locations corresponding to couriers. In some situations, the courier location information can be obtained from the logistics management database. In particular implementations, the courier location information can include GPS data indicating a location of the couriers. The GPS data can, in some cases, indicate a real-time or near real-time location of the couriers. In various implementations, the courier location information can be included in profiles of couriers stored in the logistics management database 626. The profiles of the couriers can indicate geographic locations for which the respective couriers can be available to deliver items. In additional implementations, the courier location information can be obtained from mobile computing devices of the couriers. In certain implementations, the courier profiles can be modified by the couriers to indicate availability to deliver items associated with different locations at different time. For example, a courier profile can indicate that the courier is available to deliver items associated with a first location and a second location at a first time and that the courier is available to deliver items associated with a third location and a fourth location at a second time, where at least one of the third location and the fourth location are different from at least one of the first location and the second location.

The courier dispatch and tracking module 618 can compare one or more locations where the item is to be stored with locations associated with a number of couriers. The courier dispatch and tracking module 618 can identify one or more couriers associated with locations that overlap with the one or more locations where the item is to be stored. For example, the courier dispatch and tracking module 618 can determine that an item is to be stored in a particular zip code and the courier dispatch and tracking module 618 can identify one or more couriers that are associated with the same zip code. To illustrate, the courier dispatch and tracking module 618 can determine that the one or more couriers are currently located in the particular zip code based at least partly on GPS data corresponding to the one or more couriers and/or that the one or more couriers have expressed availability to deliver items in their respective profiles to deliver items in the particular zip code. In some implementations, the current location of couriers can be weighed more heavily in identifying couriers to deliver an item than locations included in profiles of the couriers.

In addition to location, the courier dispatch and tracking module 618 can also utilize one or more additional criteria to identify couriers to deliver items. In some examples, the courier dispatch and tracking module 618 can determine a number of items that couriers are already assigned to deliver in order to determine the availability of couriers to deliver items. For example, the more items that a courier is currently assigned to deliver, the less likely the courier dispatch and tracking module 618 is to select the courier for delivery of an additional item. Additionally, courier dispatch and tracking module 618 can determine ratings of couriers to identify one or more couriers to deliver an item. The ratings of the couriers can be based at least partly on performance of the couriers with respect to previous deliveries. Further, the courier dispatch and tracking module 618 can analyze previous experience with delivering certain types of items to identify one or more couriers to deliver an item. To illustrate, for certain items that may be associated with particular restrictions, such as fragile items, irregularly shaped items, perishable items, and the like, the courier dispatch and tracking module 618 can give preference to couriers that have previously delivered similar items in determining one or more couriers to deliver an item of a similar type.

By analyzing a number of criteria with respect to a group of couriers, the courier dispatch and tracking module 618 can identify a subset of the group of couriers that are candidates to deliver the item. In various implementations, the courier dispatch and tracking module 618 can determine a score for couriers included in a group of couriers based on one or more criteria and select a subset of the group of couriers having at least a threshold score. In additional implementations, the courier dispatch and tracking module 618 can identify couriers satisfying one or more criteria to identify couriers that are candidates to deliver an item. In an illustrative example, the courier dispatch and tracking module 618 can identify couriers associated with and/or located in a particular location, such as a particular zip code, to determine candidate couriers to deliver an item. Thus, the courier dispatch and tracking module 618 can filter a group of couriers based on one or more criteria to identify one or more candidate couriers to deliver an item.

After identifying one or more candidate couriers to deliver an item, the courier dispatch and tracking module 618 can invoke the courier communication module 612 to send notifications to the candidate couriers indicating that the item is available for delivery. The courier dispatch and tracking module 618 can receive responses from the candidate couriers where the responses indicate an availability to deliver the item. In some implementations, the responses can be obtained by the courier communication module 612. The courier dispatch and tracking module 618 can then select a courier from among the couriers providing responses to assign to deliver the item. In some implementations, the courier dispatch and tracking module 618 can additionally filter couriers after receiving responses to a notification to deliver an item. In some illustrative examples, the courier dispatch and tracking module 618 can filter the couriers providing responses to the notification based at least partly on times in which the responses were received. In a particular illustrative example, the courier dispatch and tracking module 618 can assign the first courier to provide a response to the notification to deliver the item. In other illustrative examples, the courier dispatch and tracking module 618 can filter the couriers providing responses to the notification based on other criteria, such as location of the couriers with respect to locations of electronic locker arrangements used to store the item, ratings of the couriers responding to the notification, number of items assigned to the respective couriers for delivery, delivery history of the couriers, combinations thereof, and the like. In certain implementations, the courier dispatch and tracking module 618 can identify a number of items to be picked up from or dropped off at a particular electronic locker arrangement. In these situations, the courier dispatch and tracking module 618 can assign a courier to deliver multiple items that are associated with different senders and/or recipients, but are being picked up from and/or dropped off at a particular electronic locker arrangement. In various implementations, the courier dispatch and tracking module 618 can perform a first filtering operation to identify candidate couriers to notify about delivery of an item and a second filtering operation to determine a particular courier to assign to deliver the item.

In response to determining a courier to deliver an item, the courier dispatch and tracking module 618 can invoke the courier communication module 612 to send a notification to the courier indicating that the courier has been assigned to deliver the item. In some implementations, the courier dispatch and tracking module 618 can cause a record or other data structure stored in the logistics management database 626 to indicate that the courier has been assigned to deliver the item. In particular implementations, the courier dispatch and tracking module 618 can track the location of the courier assigned to deliver the item to determine the progress in the delivery of the item. The courier dispatch and tracking module 618 can determine an estimate of the delivery time of the item based at least partly on the location of the courier assigned to deliver the item. Additionally, the courier dispatch and tracking module 618 can operate in conjunction with the sender communication module 610 and/or recipient communication module 614 to provide updates on the delivery of the item based at least partly on the location of the courier assigned to deliver the item.

The identity verification module 620 can include computer-readable instructions that when executed by the processor 504 to verify the identity of individuals attempting to access an item stored by an electronic locker arrangement. In some cases, the identity verification module 620 can verify the identity of a sender of an item. In other situations, the identity verification module 620 can verify the identity of a courier delivering the item. In additional implementations, the identity verification module 620 can verify the identity of a recipient of the item. The identity verification module 620 can verify the identity of individuals based at least partly on identifiers of the individuals. The identity verification module 620 can also verify the identity of individuals based at least partly on video data, image data, or biometric data of the individuals. Additionally, the identity verification module 620 can verify the identity of individuals based at least partly on identifiers generated by the logistics management system 108, such as bar codes and/or QR codes. In some implementations, the identity verification module 620 can utilize different types of data to verify the identity of different individuals. For example, the identity verification module 620 can verify the identity of a first individual based at least partly on a first type of data and the identity verification module 620 can verify the identity of a second individual based at least partly on a second type of data that is different from the first type of data.

In particular implementations, the identity verification module 620 can verify the identity of a sender of an item attempting to access a locker of an electronic locker arrangement to drop off the item for delivery. In these situations, the identity verification module 620 can verify the identity of the sender based at least partly on an identifier of the sender associated with the logistics management system 108. For example, the sender can provide one or more identifiers, such as a user name and password, via an electronic locker arrangement. The identity verification module 620 can then access information stored in the logistics management database 626 to verify that the identification information provided by the sender corresponds to information stored in the logistics management database 626. The identity verification module 620 can also generate a bar code that is associated with the sender and the item being delivered. The identity verification module 620 can obtain bar code information provided by a sender from an electronic locker arrangement and analyze the bar code with respect to bar codes stored in the logistics management database 626. The identity verification module 620 can determine that the bar code information provided by the sender corresponds to a bar code associated with an item that is to be stored in the electronic locker arrangement and delivered on behalf of the sender.

The identity verification module 620 can also verify the identity of a courier delivering an item on behalf of a sender. In some implementations, the identity verification module 620 can verify the identity of the courier at a first electronic locker arrangement where the courier picks up the item and also verify the identity of the courier at a second electronic locker arrangement where the courier drops off the item for the recipient. In certain implementations, the identity verification module 620 can utilize different techniques to verify the identity of the courier at different electronic locker arrangements. For example, the identity verification module 620 can utilize a first identity verification technique to verify the identity of the courier at an electronic locker arrangement where the courier is picking up the item and a second identity verification technique to verify the identity of the courier at an additional electronic locker arrangement where the courier is dropping off the item.

In particular implementations, the identity verification module 620 can generate a QR code that can be utilized by the courier to access a locker storing an item that has been dropped off by a sender of the item. In some cases, the identity verification module 620 can obtain a request indicating that the sender is attempting to access the locker storing the item. In various implementations, the request can be provided by the electronic locker arrangement storing the item. In other scenarios, the request can be provided via an application executed by a computing device of the courier. The identity verification module 620 can generate a QR code that uniquely identifies the courier with respect to the item. For example, the identity verification module 620 can obtain a time related to the item and generate the QR code based at least partly on the time. The time related to the item can include a time that the item was stored in the electronic locker arrangement or a time that the courier requested access to the electronic locker arrangement. In another example, the identity verification module 620 can generate the QR code based on other information, such as at least one of an identifier of the courier, an identifier of the sender, an identifier of the item, an identifier of the locker storing the item, an identifier of the electronic locker arrangement storing the item, a location of the electronic locker arrangement, or a location of the courier.

In various implementations, the identity verification module 620 can provide the QR code to the electronic locker arrangement that the courier is requesting to access. In additional implementations, the identity verification module 620 can operate in conjunction with the courier communication module 612 to provide the QR code to a computing device of the courier. The identity verification module 620 can then obtain the QR code from a different device than the device that the QR code was initially sent to. That is, in cases where the QR code was sent to the computing device of the courier, the identity verification module 620 can obtain information indicating the QR code from the electronic locker arrangement that the courier is requesting to access. In these situations, the courier can display the QR code on a computing device of the courier and scan the displayed QR code at the electronic locker arrangement. The electronic locker arrangement can then send the QR code or information derived from the QR code to the identity verification module 620 to verify the identity of the courier. In instances where the QR code was first sent to the electronic locker arrangement that the courier is requesting to access, the identity verification module 620 can obtain information associated with the QR code from a computing device of the courier. In these scenarios, the electronic locker arrangement can display the QR code obtained from the identity verification module 620 and the courier can scan the displayed QR code using a computing device. The computing device can then send the QR code or information derived from the QR code back to the identity verification module 620 to verify the identity of the courier.

In response to receiving QR code information, the identity verification module 620 can analyze the information with respect to information stored by the logistics management database 626. In particular, the identity verification module 620 can compare QR code information received from the computing device of the courier or from the electronic locker arrangement and verify whether the QR code information is stored in the logistics management database 626 in association with at least the courier, the item, and the electronic locker arrangement. In cases where the identity verification module 620 determines that the QR code information received from the computing device of the courier or from the electronic locker arrangement corresponds to information stored by the logistics management database 626, the identity verification module 620 can determine that the identity of the courier has been verified.

In illustrative implementations, the identity verification module 620 can receive a request to generate a QR code from an electronic locker arrangement. In some cases, the request can be added to the logistics management queue 634. In response to receiving the request, the identity verification module 620 can generate a QR code and send the QR code to the electronic locker arrangement. Additionally, the identity verification module 620 can store the QR code and/or information encoded by the QR code in the logistics management database 526. In various implementations, the information stored by the logistics management database 626 that is related to the QR code can be stored in association with the item that the courier is attempting to pick up and/or stored in association with at least one data structure that has been created for the delivery of the item in the logistics management database 626. Subsequently, the identity verification module 620 can obtain the QR code or information derived from the QR code from a computing device of the courier. In these cases, the computing device of the courier can scan the QR code displayed by the electronic locker arrangement. In certain implementations, the identity verification module 620 can obtain an identifier that has been derived from the QR code from the computing device of the courier. The identifier can include an identifier of the electronic locker arrangement storing the item or an identifier of the particular locker storing the item. The identity verification module 620 can also receive additional information from the computing device of the courier, such as an identifier of the courier. The identity verification module 620 can access data stored by the logistics management database 626 and determine whether the identifier of the electronic locker arrangement or the identifier of the locker, in addition to other identity verification information obtained from the computing device of the courier, corresponds to the item and the courier assigned to deliver the item. The identity verification module 620 can determine that the identity of the courier has been verified based at least partly on determining that the information received from the computing device of the courier corresponds to information stored by the logistics management database 626 in relation to the item.

In some implementations, the identity verification module 620 can verify the identity of the courier utilizing a bar code. For example, in situations where the courier is dropping off an item for storage at an electronic locker arrangement, a bar code of the item can be utilized to provide access to a locker assigned to the item at the electronic locker arrangement. In some cases, the bar code used to verify the identity of the courier and provide access to the electronic locker arrangement can be the same bar code utilized by the sender to gain access to the electronic locker arrangement where the item was initially dropped off by the sender. In other situations, the bar code utilized to gain access to the electronic locker arrangement by the courier to drop off the item can be different from the initial bar code. In these instances, the identity verification module 620 can generate an additional bar code that the courier can utilize to verify the identity of the courier and access the electronic locker arrangement to drop off the item.

The identity verification module 620 can also verify the identity of a recipient that is picking up an item that is stored by an electronic locker arrangement. In particular implementations, the identity verification module 620 can generate a QR code that can be utilized by the recipient to access a locker storing an item that has been dropped off by a courier. The QR code generated by the identity verification module 620 for the recipient to access the electronic locker arrangement is different from the QR code generated by the identity verification module 620 for the courier to access an additional electronic locker arrangement that previously stored the item. In some cases, the identity verification module 620 can obtain a request indicating that the recipient is attempting to access the locker storing the item. In various implementations, the request can be provided by the electronic locker arrangement storing the item. In other scenarios, the request can be provided via an application executed by a computing device of the recipient. The identity verification module 620 can generate a QR code that uniquely identifies the recipient with respect to the item. For example, the identity verification module 620 can obtain a time related to the item and generate the QR code based at least partly on the time. The time related to the item can include a time that the item was stored in the electronic locker arrangement or a time that the recipient requested access to the electronic locker arrangement. In another example, the identity verification module 620 can generate the QR code based on other information, such as at least one of an identifier of the recipient, an identifier of the sender, an identifier of the item, an identifier of the locker storing the item, an identifier of the electronic locker arrangement storing the item, a location of the electronic locker arrangement, or a location of the recipient.

In various implementations, the identity verification module 620 can provide the QR code to the electronic locker arrangement that the recipient is requesting to access. In additional implementations, the identity verification module 620 can operate in conjunction with the recipient communication module 614 to provide the QR code to a computing device of the recipient. The identity verification module 620 can then obtain the QR code from a different device than the device that the QR code was initially sent to. That is, in cases where the QR code was sent to the computing device of the recipient, the identity verification module 620 can obtain information indicating the QR code from the electronic locker arrangement that the recipient is requesting to access. In these situations, the recipient can display the QR code on a computing device of the recipient and scan the displayed QR code at the electronic locker arrangement. The electronic locker arrangement can then send the QR code or information derived from the QR code to the identity verification module 620 to verify the identity of the recipient. In instances where the QR code was first sent to the electronic locker arrangement that the recipient is requesting to access, the identity verification module 620 can obtain information associated with the QR code from a computing device of the recipient. In these scenarios, the electronic locker arrangement can display the QR code obtained from the identity verification module 620 and the recipient can scan the displayed QR code using a computing device. The computing device can then send the QR code or information derived from the QR code back to the identity verification module 620 to verify the identity of the recipient.

In response to receiving QR code information, the identity verification module 620 can analyze the information with respect to information stored by the logistics management database 626. In particular, the identity verification module 620 can compare QR code information received from the computing device of the recipient or from the electronic locker arrangement and verify whether the QR code information is stored in the logistics management database 626 in association with the recipient, the item, and the electronic locker arrangement. In cases where the identity verification module 620 determines that the QR code information received from the computing device of the recipient or from the electronic locker arrangement corresponds to information stored by the logistics management database 626, the identity verification module 620 can determine that the identity of the recipient has been verified.

In illustrative implementations, the identity verification module 620 can receive a request to generate a QR code from an electronic locker arrangement. In some cases, the request can be added to the logistics management queue 634. In response to receiving the request, the identity verification module 620 can generate a QR code and send the QR code to the electronic locker arrangement. Additionally, the identity verification module 620 can store the QR code and/or information encoded by the QR code in the logistics management database 626. In various implementations, the information stored by the logistics management database 626 that is related to the QR code can be stored in association with the item that the recipient is attempting to pick up and/or stored in association with at least one data structure that has been created for the delivery of the item in the logistics management database 626. Subsequently, the identity verification module 620 can obtain the QR code or information derived from the QR code from a computing device of the recipient. In these cases, the computing device of the recipient can scan the QR code displayed by the electronic locker arrangement. In certain implementations, the identity verification module 620 can obtain an identifier that has been derived from the QR code from the computing device of the recipient. The identifier can include an identifier of the electronic locker arrangement storing the item or an identifier of the particular locker storing the item. The identity verification module 620 can also receive additional information from the computing device of the recipient, such as an identifier of the recipient. The identity verification module 620 can access data stored by the logistics management database 626 and determine whether the identifier of the electronic locker arrangement or the identifier of the locker, in addition to other identity verification information obtained from the computing device of the recipient, corresponds to the item and the recipient assigned to deliver the item. The identity verification module 620 can determine that the identity of the recipient has been verified based at least partly on determining that the information received from the computing device of the recipient corresponds to information stored by the logistics management database 626 in relation to the item.

In situations, where the identity verification module 620 verifies the identity of an individual requesting to access a locker of an electronic locker arrangement, the identity verification module 620 can cause the electronic locker arrangement to provide access to the individual. In some cases, the identity verification module 620 can send a signal to the electronic locker arrangement to open a locker storing the item. In scenarios where the identity verification module 620 is unable to verify the identity of an individual requesting to access a locker of an electronic locker arrangement, the identity verification module 620 can deny access to the electronic locker arrangement by the individual. To illustrate, the identity verification module 620 can send information to the electronic locker arrangement indicating that the identity of the individual requesting access to the electronic locker arrangement has been denied and to keep the door to the locker storing the item closed/locked.

The shipping identifier module 622 can be executable by the processor 604 to generate shipping identifiers that can be used to track the delivery of items. The shipping identifiers can also be used to access electronic locker arrangements. The shipping identifier module 622 can generate a shipping identifier in response to receiving a request from a computing device of an individual that has an account with the logistics management system 108 to deliver an item via an electronic locker arrangement. In some cases, the individual making the request can be a sender of an item, while in other situations, the individual making the request can be a recipient of an item. In additional implementations, the shipping identifier can be generated in response to a request received from a third party, such as an online retailer.

The shipping identifier can be an alphanumeric string, a bar code, a QR code, or another type of code that is unique to the delivery of a particular item. In this way, shipping identifier can be used to associate a sender and/or a recipient with deliver of one or more particular items to a designated electronic locker arrangement. In various implementations, the shipping identifier module 622 can operate in conjunction with the logistics management database 626 to generate a data storage element, such as one or more fields or tables, to store associations between the shipping identifier and at least one of a sender or recipient of an item. In certain implementations, the data storage element can store an association between the shipping identifier and a system identifier of the recipient and/or a system identifier of the sender. The data storage element can also store an association between the shipping identifier and one or more electronic storage arrangements that are assigned to store the item. Additionally, in situations where the shipping identifier is requested by a third party, the data storage element can store an association between the shipping identifier and an identifier of the third party. Further, the data storage element can store an association between one or more couriers assigned to deliver the item and the shipping identifier. In various implementations, the shipping identifier module 622 and/or the locker management module 616 can enable access to an electronic locker arrangement by receiving an access request from the electronic locker arrangement that includes the shipping identifier and by sending control signals to the electronic locker arrangement upon verifying that the electronic locker arrangement is assigned to store the item associated with the shipping identifier.

The electronic locker arrangement 110 can include one or more second computing devices 636. The one or more second computing devices 636 can include one or more processors, such as processor 638. The one or more processors 638 can include at least one hardware processor, such as a microprocessor. In some cases, the one or more processors 638 may include a central processing unit (CPU), a graphics processing unit (GPU), or both a CPU and GPU, or other processing units. Additionally, the one or more processors 638 can include a local memory that may store program modules, program data, and/or one or more operating systems.

In addition, the one or more second computing devices 636 can include one or more computer-readable storage media, such as computer-readable storage media 640. The computer-readable storage media 640 can include volatile and nonvolatile memory and/or removable and non-removable media implemented in any type of technology for storage of information, such as computer-readable instructions, data structures, program modules, or other data. Such computer-readable storage media 640 can include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the one or more second computing devices 636, the computer-readable storage media 640 can be a type of tangible computer-readable storage media and can be a non-transitory storage media.

The one or more second computing devices 636 can include one or network interfaces (not shown) to communicate with other computing devices via the one or more networks 608. The one or more networks 608 can include one or more of the Internet, a cable network, a satellite network, a wide area wireless communication network, a wired local area network, a wireless local area network, or a public switched telephone network (PSTN).

The computer-readable storage media 640 can be used to store any number of functional components that are executable by the one or more processors 638. In many implementations, these functional components comprise instructions or programs that are executable by the one or more processors 638 and that, when executed, implement operational logic for performing the operations attributed to the one or more second computing devices 636. Functional components of the one or more second computing devices 636 that can be executed on the one or more processors 638 for implementing the various functions and features related to coordinating and managing the delivery of items utilizing electronic locker arrangements, as described herein, include a locker interface module 642, a locker control module 644, and a system communication module 648.

Additionally, the one or more second computing devices 636 can include one or more input/output devices (not shown). The one or more input/output devices can include a display device, keyboard, a remote controller, a mouse, a printer, audio input/output devices, a speaker, a microphone, a camera, and so forth The one or more second computing devices 636 can also include, or be coupled to, a data store 648 that can include, but is not limited to, RAM, ROM, EEPROM, flash memory, one or more hard disks, solid state drives, optical memory (e.g. CD, DVD), or other non-transient memory technologies. The data store 648 can maintain information that is utilized by the one or more second computing devices 636 to perform operations related to coordinating and managing the pickup and drop off of items stored by the electronic locker arrangement 110. For example, the data store 648 can store sensor data 650 and locker security data 652. The sensor data 650 can include data indicating that doors of the lockers of the electronic locker arrangement 110 are opened or closed, such as data from magnetic sensors coupled to doors of the lockers of the electronic locker arrangement 110. The sensor data 650 can also include image data, video data, and/or audio data captured by input devices of the electronic locker arrangement 110. Additionally, the sensor data 650 can include data obtained by weight sensors disposed in the lockers of the electronic locker arrangement 110. The weight sensors can indicate a weight of an item placed in a locker of the electronic locker arrangement 110. The locker security data 652 can include data utilized to obtain access to the electronic locker arrangement 110. For example, the locker security data 652 can include bar codes, QR codes, identifiers of individuals, identifiers of items, or combinations thereof. In some cases, the bar codes, QR codes, and/or identifiers can be obtained from the logistics management system 108. In additional implementations, the bar codes, QR codes, and/or identifiers can be obtained via one or more input devices of the electronic locker arrangement 110.

The locker interface module 642 can include computer-readable instructions that when executed by the one or more processors 638 can provide one or more user interfaces displayed via one or more display devices of the electronic locker arrangement 110. The locker interface module 642 can generate user interfaces to capture information input by individuals utilizing the electronic locker arrangement 110. In some cases, the user interfaces generated by the locker interface module 642 can obtain information related to requests to store items in the electronic locker arrangement 110. Additionally, the user interfaces generated by the locker interface module 642 can obtain information related to requests to remove items from the electronic locker arrangement 110. The locker interface module 540 can also generate user interfaces that include information used to access items stored by the electronic locker arrangement 110, such as QR codes and/or bar codes.

The locker control module 644 can include computer-readable instructions that when executed by the one or more processors 638 can cause lockers of the electronic locker arrangement 110 to open or close. In some cases, the locker control module 644 can obtain signals from the logistics management system 108 to open or close lockers of the electronic locker arrangement 110. In other cases, the locker control module 644 can cause lockers of the electronic locker arrangement 110 to open or close based on the sensor data 650. For example, the locker control module 644 can determine that an item has been removed from a locker of the electronic locker arrangement 110 based on weight data associated with the locker and proceed to close the door of the locker. In another example, the locker control module 644 can analyze weight data associated with a locker and determine that an item has been placed in the locker.

In particular implementations, the locker interface module 642 and the locker control module 644 can work in conjunction with each other after an item has been dropped off or picked up. For example, after the locker control module 644 determines that an item has been dropped off in a locker of the electronic locker arrangement 110, the locker interface module 642 can generate one or more user interfaces to determine whether a sender or courier has additional items to drop off and to control access to the electronic locker arrangement 110 to drop off the additional items. Additionally, after the locker control module 644 determines that an item has been picked up from a locker of the electronic locker arrangement 110, the locker interface module 642 can generate one or more user interfaces to determine whether a courier or a recipient has additional items to pick up and to control access to the electronic locker arrangement 110 to pick up the additional items.

The system communication module 646 can include computer-readable instructions that when executed by the one or more processors 638 can manage communications to and from the logistics management system 108. For example, the system communications module 646 can provide information obtained via user interfaces displayed by the electronic locker arrangement 110 to the logistics management system 108. In another example, the system communications module 646 can provide sensor data 650 and/or locker security data 652 to the logistics management system 108.

The architecture 600 can also include a computing device 654 operated by a user 656. The computing device 654 can include a mobile phone, a smart phone, a tablet computing device, a laptop computing device, a portable gaming device, a desktop computing device, combinations thereof, and the like. The user 656 can include a sender of an item to be delivered via the logistics management system 108, a courier transporting items being delivered via the logistics management system 108, or a recipient that receives an item delivered via the logistics management system 108.

The computing device 654 can include one or more processors, such as processor 658 and memory 660. The one or more processors 658 can include at least one hardware processor, such as a microprocessor. In some cases, the one or more processors 658 may include a central processing unit (CPU), a graphics processing unit (GPU), or both a CPU and GPU, or other processing units. Additionally, the one or more processors 658 can include a local memory that may store program modules, program data, and/or one or more operating systems.

The memory 660 can include volatile and nonvolatile memory and/or removable and non-removable media implemented in any type of technology for storage of information, such as computer-readable instructions, data structures, program modules, or other data. The computing device 654 can also include one or network interfaces (not shown) to communicate with other computing devices via the one or more networks 608. Additionally, the computing device 654 can include one or more input/output devices (not shown).

The memory 660 can be used to store any number of functional components that are executable by the one or more processors 658. In many implementations, these functional components comprise instructions or programs that are executable by the one or more processors 658 and that, when executed, implement operational logic for performing the operations attributed to the computing device 654. Functional components of the computing device 654 that can be executed on the one or more processors 658 for implementing the various functions and features related to coordinating and managing the delivery of items utilizing electronic locker arrangements, as described herein, can include a logistics app 662.

The logistics app 662 can provide one or more user interfaces to provide information to the user 656 or to obtain information input by the user 656. The logistics app 662 can be utilized by senders to request the delivery of items to recipients. The logistics app 662 can also provide information to couriers regarding items that are available for delivery by the couriers. Couriers can also utilize the logistics app 662 to accept items for delivery. The logistics app 662 can notify recipients of items that have been sent by senders and track the progress of the delivery of items.

In some cases, the logistics app 662 can provide information to access lockers storing items being picked up or dropped off. For example, the logistics app 662 can scan QR codes that can be utilized to access items stored in lockers of electronic locker arrangements. In certain implementations, the logistics app 662 can extract information from the QR codes, such as a locker identifier, and also obtain information about the user 656, such as a user identifier, and provide this information to the logistics management system 108 to obtain access to an electronic locker arrangement. The logistics app 662 can also obtain and display bar codes to open lockers for dropping off items in lockers of electronic locker arrangements.

Figure 7:
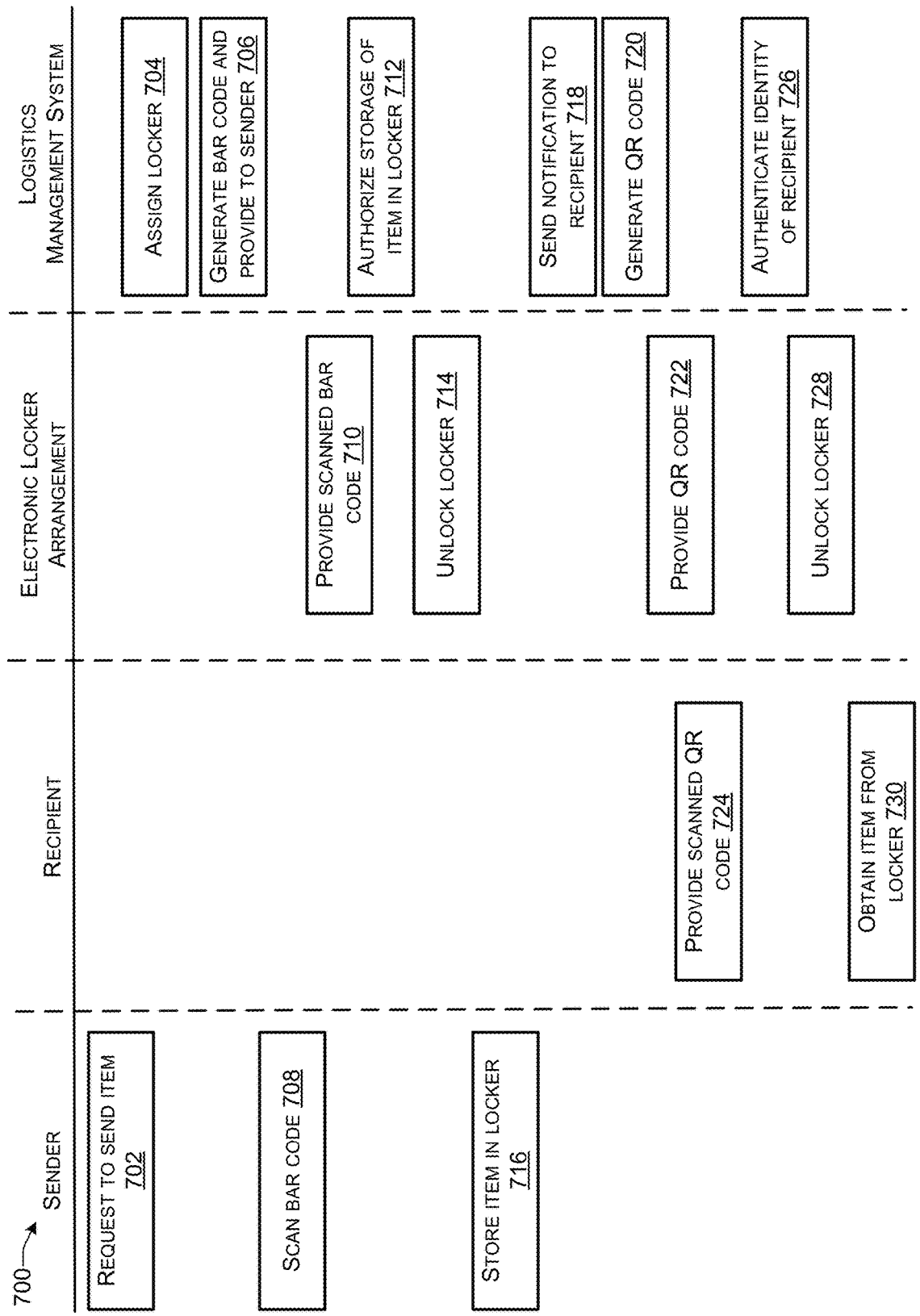
FIG. 7 is a diagram showing the timing of operations performed by various entities to enable an item to be delivered to a recipient from a sender via a single electronic locker arrangement according to some implementations.

FIG. 7 is a diagram showing the timing of operations of a process 700 performed by various entities to enable an item to be delivered to a recipient from a sender via a single electronic locker arrangement according to some implementations. The entities participating in the process 700 include a sender of an item, a recipient of the item, an electronic locker arrangement that stores the item, and a logistics management system that coordinates delivery of the item from the sender to the recipient. At 702, the process 700 includes a sender providing a request to send an item. The request can be provided via a website maintained by the logistics management system or via a logistics app executed by a computing device of the sender. The logistics app can be provided by the logistics management system. At 704, the logistics management system can assign a locker of the electronic locker arrangement to store the item. The locker can be assigned, in some cases, based on dimensions of the locker with respect to dimensions of the item. At 706, the process 700 includes the logistics management system generating a bar code and providing the bar code to the sender. The logistics management system can provide the bar code to the sender via a logistics app executed by a computing device of the sender.

At 708, the sender can scan the bar code at the electronic locker arrangement. For example, the sender can display the bar code using a logistics app executed by a computing device of the sender and operate a bar code scanner of the electronic locker arrangement to scan the bar code. The electronic locker arrangement can provide one or more user interfaces for the sender to control a bar code scanner of the electronic locker arrangement. At 710, the electronic locker arrangement can provide the scanned bar code to the logistics management system and, at 712, the logistics management system can authorize storage of the item in the locker. In some situations, the logistics management system can determine that the bar code scanned at the electronic locker arrangement corresponds to the bar code provided to the sender. In particular implementations, the logistics management system can send information to the electronic locker arrangement indicating that the sender can store the item in a locker of the electronic locker arrangement. The electronic locker arrangement can then, at 714, unlock the locker, and at 716, the sender can place the item in the locker. The logistics management system can determine that the item has been placed in the locker based on information obtained from the electronic locker arrangement.

At 718, the process 700 can include sending a notification to the recipient that the item is available to be picked up at the electronic storage arrangement. At 720, the logistics management system can generate a QR code. In some situations, the logistics management system can generate the QR code in response to a request from the recipient to access the locker storing the item. In other cases, the logistics management system can generate the QR code in response to determining that the item has been stored in the locker. At 722, the electronic locker arrangement can provide the QR code to the recipient. For example, the electronic locker arrangement can display the QR code. The recipient can scan the QR code and, at 724, provide the scanned QR code to the logistics management system. The recipient can scan the QR code via a logistics app executed by a computing device of the recipient. In particular implementations the logistics app can extract information from the QR code, such as an identifier of the locker storing the item, and send the information extracted from the QR code back to the logistics management system. The logistics app can also send additional information to the logistics management system, such as an identifier of the recipient or an identifier associated with the instance of the logistics app executed by the computing device of the recipient.

At 726, the logistics management system can authenticate the identity of the recipient. For example, the logistics management system can utilize the information obtained from the logistics app, such as the locker identifier extracted from the QR code and/or the identifier of the recipient, to authenticate the identity of the recipient. After determining that the recipient is authorized to access the electronic locker arrangement, the electronic locker arrangement can unlock the locker, at 728, and, at 730, the recipient can obtain the item from the locker of the electronic locker arrangement where the item was stored. In certain implementations, the electronic locker arrangement can unlock the locker in response to information received from the logistics management system. The information indicating that the electronic locker arrangement is to unlock the locker can include a control signal to unlock the locker or information indicating that the recipient is authorized to access the locker.

Figure 8:
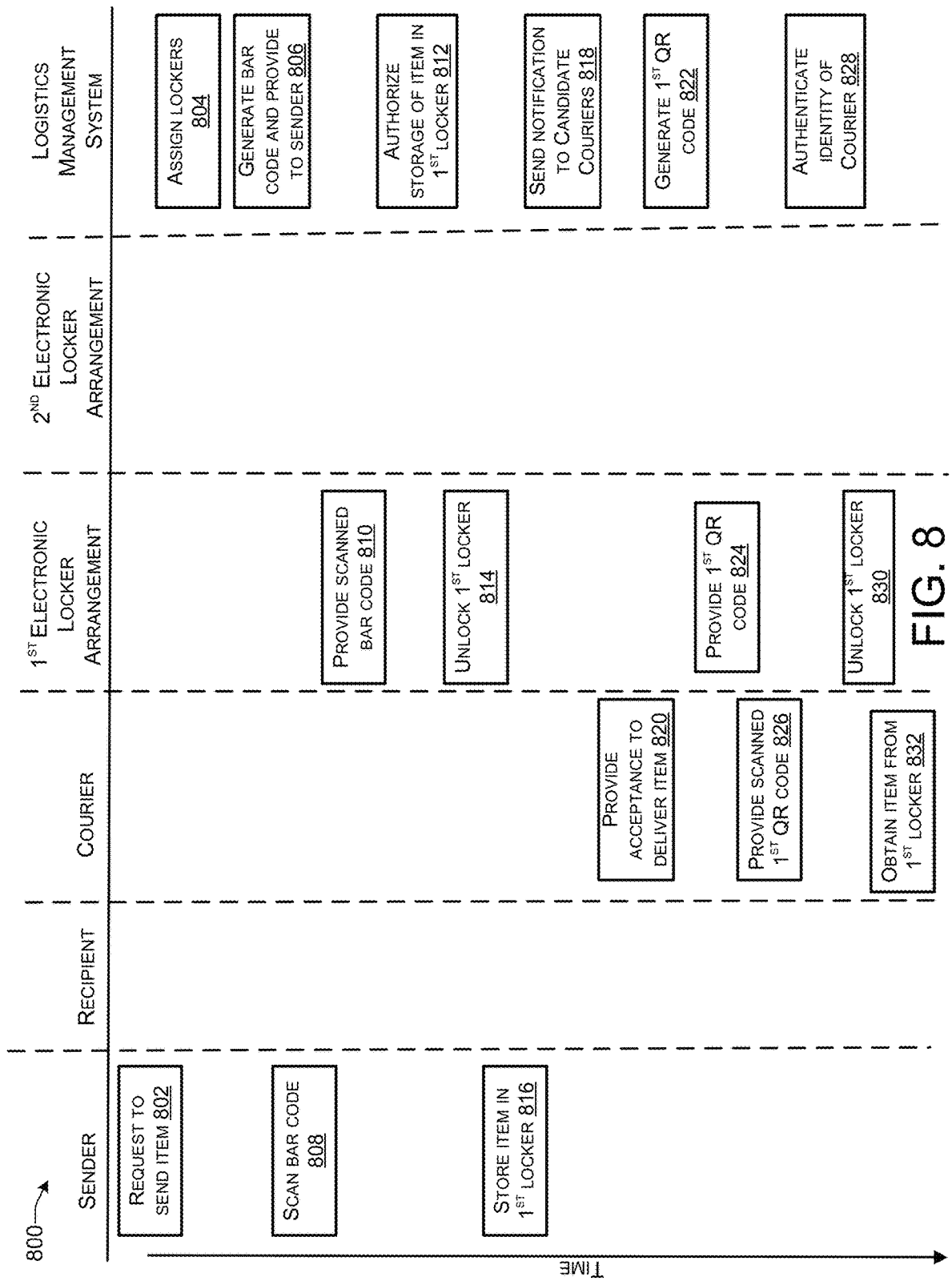
FIG. 8 is a first diagram showing the timing of operations performed by various entities to enable an item to be delivered to a recipient from a sender via a courier utilizing multiple electronic locker arrangements according to some implementations.

FIG. 8 is a first diagram of a process 800 showing the timing of operations performed by various entities to enable an item to be delivered to a recipient from a sender via a courier utilizing multiple electronic locker arrangements according to some implementations. The entities participating in the process 800 include a sender of an item, a recipient of the item, a first electronic locker arrangement and a second electronic storage arrangement that store the item, a courier that transports the item between the first electronic locker arrangement and the second electronic locker arrangement, and a logistics management system that coordinates delivery of the item from the sender to the recipient. At 802, the process 800 includes a sender requesting to send an item to the recipient. At 804, in response to the request to send the item, the logistics management system can assign lockers for the delivery of the item. The logistics management system can assign a first locker to store the item being dropped off by the sender and a second locker to store the item for pickup by the recipient. The first locker can be included in the first electronic locker arrangement and the second locker can be included in the second electronic locker arrangement. In some cases, the first locker and the second locker can be assigned in response to receiving the request to deliver the item and before the item is placed into the first locker or the second locker. In other situations, the second locker can be assigned after the item has been placed into the first locker or after the item has been removed from the first locker.

At 806, the logistics management system can generate a bar code associated with the item and provide the bar code to the sender. At 808, the sender can scan the bar code, such as via a bar code scanner of the first electronic locker arrangement. In particular implementations, the sender can display the bar code via a logistics app executed on a computing device of the sender and control the first electronic locker arrangement using input to one or more user interfaces to scan the displayed car code. At 810, the first electronic locker arrangement can provide the scanned bar code to the logistics management system. In response to receiving the scanned bar code, the logistics management system can, at 812, authorize storage of the item in the first locker of the first electronic storage arrangement. At 814, the first electronic storage arrangement can unlock the locker and, at 816, the sender can store the item in the locker.

At 818, the logistics management system can send notifications to candidate couriers that the item is available to be delivered. The candidate couriers can be determined by the logistics management system based on evaluating a group of couriers with respect to one or more criteria. At 820, the courier can provide an acceptance to deliver the item. At 822, the process 800 includes generating a first QR code. In some cases, the QR code can be generated in response to a request received via the electronic locker arrangement to access the locker storing the item to be delivered. At 824, the electronic locker arrangement can provide the first QR code to the sender, such as displaying the first QR code via a display device of the first electronic locker arrangement. The courier can scan the first QR code and then, at 826, provide the scanned first QR code to the logistics management system. In particular implementations, the scanned first QR code can be provided to the logistics management system via a logistics app executed by a computing device of the courier. In particular implementations the logistics app can extract information from the QR code, such as an identifier of the first locker, and send the information extracted from the first QR code back to the logistics management system. The logistics app can also send additional information to the logistics management system, such as an identifier of the courier or an identifier associated with the instance of the logistics app executed by the computing device of the courier.

At 828, the logistics management system can authenticate the identity of the courier. For example, the logistics management system can utilize the information obtained from the logistics app, such as the first locker identifier extracted from the QR code and/or the identifier of the courier, to authenticate the identity of the courier. After determining that the courier is authorized to access the electronic locker arrangement, the electronic locker arrangement can unlock the locker, at 830, and, at 832, the courier can obtain the item from the first locker of the first electronic locker arrangement where the item was stored. In certain implementations, the electronic locker arrangement can unlock the locker in response to information received from the logistics management system.

Figure 9:
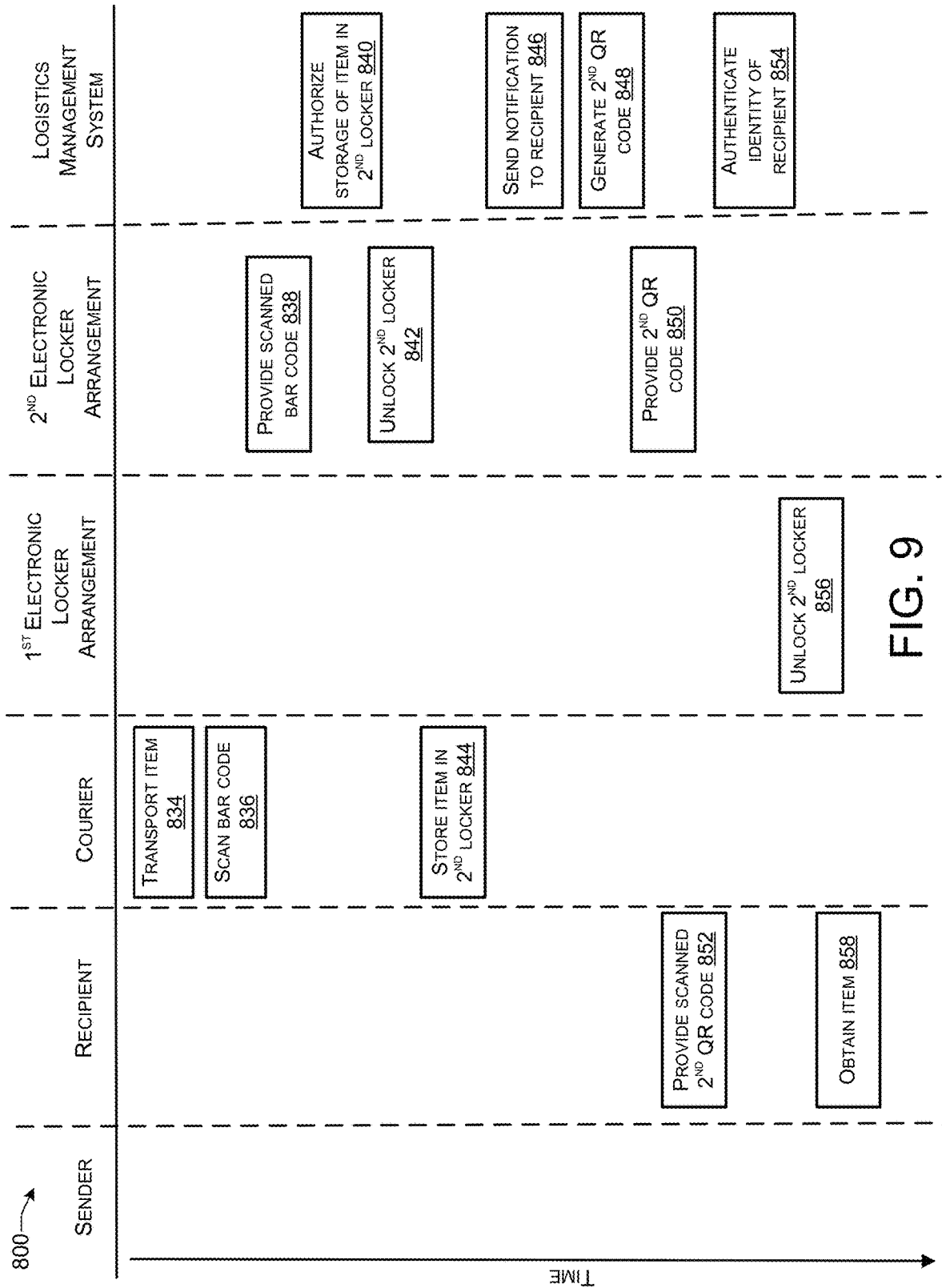
FIG. 9 is a second diagram that continues the operations performed in FIG. 8 showing the timing of operations performed by various entities to enable an item to be delivered to a recipient from a sender via a courier utilizing multiple electronic locker arrangements according to some implementations.

FIG. 9 is a second diagram that continues the operations of the process 800 performed in FIG. 8 showing the timing of operations performed by various entities to enable an item to be delivered to a recipient from a sender via a courier utilizing multiple electronic locker arrangements according to some implementations. At 834, the courier transports the item from the first electronic locker arrangement to the second electronic locker arrangement. At 836, the process 800 includes the courier scanning a bar code of the item at the second electronic locker arrangement. In some cases, the bar code can be the same bar code provided to the sender of the item. At 838, the second electronic locker arrangement provides the scanned bar code to the logistics management system, and after receiving the scanned bar code from the second electronic locker arrangement, the process 800 includes, at 840, authorizing storage of the item in the second locker of the second electronic storage arrangement.

At 842, the second electronic locker arrangement can unlock the second locker. In some cases, the second locker can be unlocked based at least partly on receiving information from the logistics management system. At 844, the courier can store the item in the second locker. Additionally, at 846, the logistics management system can send a notification to the recipient that the item has been stored in the second locker. In certain implementations, the logistics management system can send the notification at least partly based on receiving information from the second electronic locker arrangement that the item has been stored in the second locker. In particular implementations, the courier can receive the notification via a logistics app executed by the computing device of the courier.

At 848, the process 800 can include generating a second QR code. In some cases, the second QR code can be generated in response to a request received via the second electronic locker arrangement to access the second locker storing the item to be delivered. At 850, the electronic locker arrangement can provide the second QR code to the recipient, such as displaying the second QR code via a display device of the second electronic locker arrangement. The recipient can scan the second QR code and then, at 852, provide the scanned second QR code to the logistics management system. In particular implementations, the scanned second QR code can be provided to the logistics management system via a logistics app executed by a computing device of the recipient. In particular implementations the logistics app can extract information from the second QR code, such as an identifier of the second locker, and send the information back to the logistics management system. The logistics app can also send additional information to the logistics management system, such as an identifier of the recipient or an identifier associated with the instance of the logistics app executed by the computing device of the recipient.

At 854, the logistics management system can authenticate the identity of the recipient. For example, the logistics management system can utilize the information obtained from the logistics app, such as the second locker identifier extracted from the second QR code and/or the identifier of the recipient, to authenticate the identity of the recipient. After determining that the recipient is authorized to access the electronic locker arrangement, the electronic locker arrangement can unlock the locker, at 856, and, at 758, the recipient can obtain the item from the second locker of the second electronic locker arrangement where the item was stored. In certain implementations, the electronic locker arrangement can unlock the locker in response to information received from the logistics management system.

Figure 10:
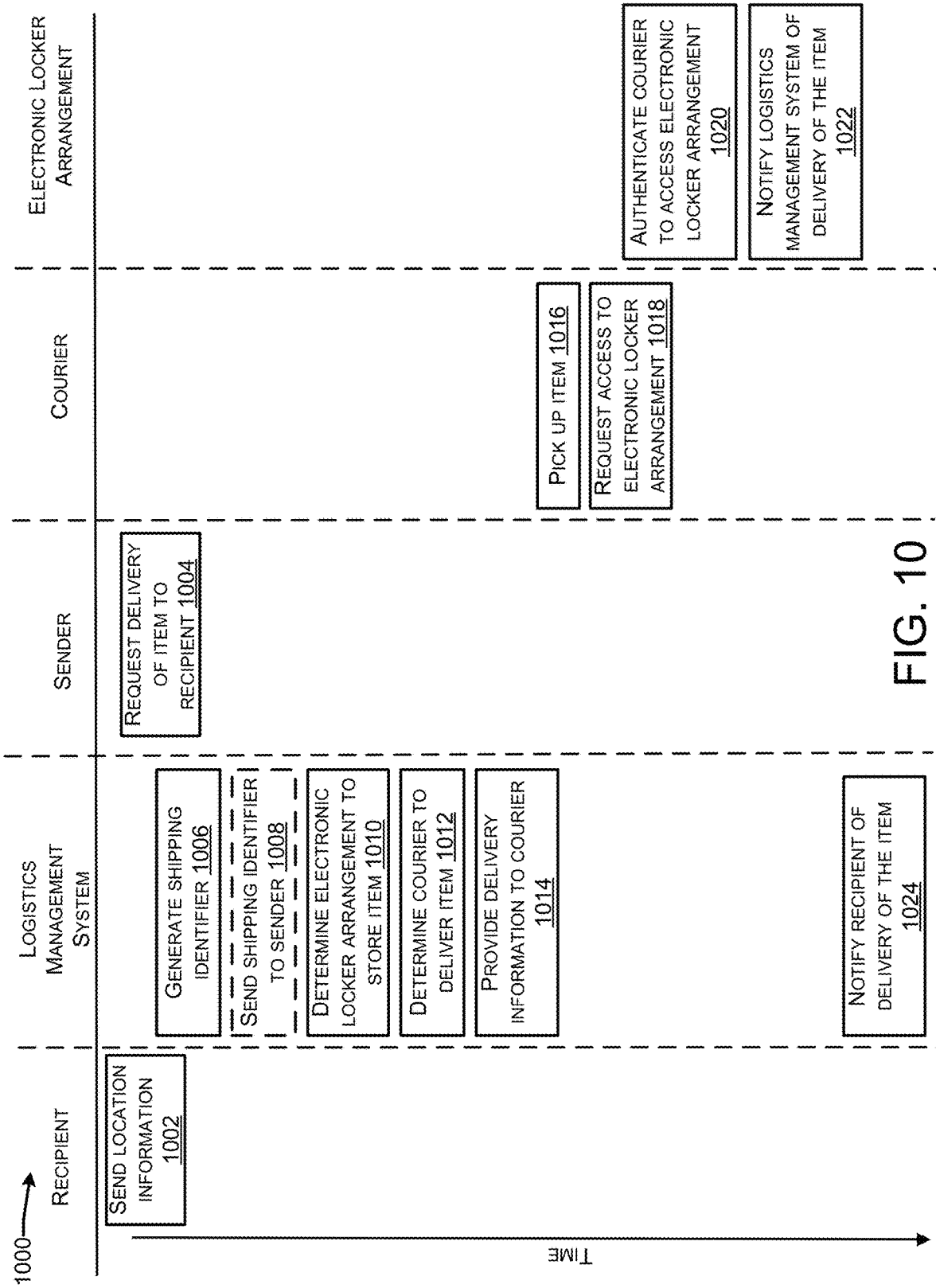
FIG. 10 is a diagram showing the timing of operations of a process performed by various entities to enable an item to be delivered to a recipient from a sender via an electronic locker arrangement using a location-based shipping identifier according to some implementations.

FIG. 10 is a diagram showing the timing of operations of a process 1000 performed by various entities to enable an item to be delivered to a recipient from a sender via an electronic locker arrangement using a location-based shipping identifier according to some implementations. The entities participating in the process 1000 include a sender of an item, a recipient of the item, an electronic locker arrangement that stores the item, a courier that delivers the item, and a logistics management system that coordinates delivery of the item from the sender to the recipient. The sender and/or the recipient can have an account with the logistics management system. Additionally, the sender and/or the recipient can individually have a system identifier that uniquely identifies the sender and/or recipient within the logistics management system. At 1002, the process 1000 includes a recipient of an item sending location information to the logistics management system. The location information can include at least one of GPS data, triangulation data used by mobile devices to determine location, or an indicator of location, such as zip code, city, state, country, latitude and longitude coordinates, and the like that can be entered via a user interface provided by the logistics management system.

At 1004, the process 1000 can include the sender requesting delivery of an item to the recipient. The sender can request delivery of the item to the recipient via a website or mobile device application of the logistics management system. In various implementations, the sender can request delivery of the item to the recipient via a website or mobile application of a retail establishment and the retail establishment can communicate with the logistics management system to coordinate delivery of the item to the recipient. In particular implementations, the request can include a system identifier of the sender and/or a system identifier of the recipient. The system identifier can include an alphanumeric identifier of the sender and/or an alphanumeric identifier of the recipient within the logistics management system. That is, the logistics management system identifies the sender and/or recipient and stores information regarding deliveries related to the sender or recipient with respect to the system identifier of the sender and/or the system identifier of the recipient. In some implementations, the sender of the item can also be the recipient of the item. In certain implementations, the sender can request to obtain the system identifier of the recipient from the logistics management system, the recipient, or both and include the system identifier of the recipient in the request.

At 1006, the process 1000 can include the logistics management system generating a shipping identifier for the recipient based on the location of the recipient. The shipping identifier can include an alphanumeric string of characters that uniquely identifies the delivery of the item to the recipient at a designated location. The shipping identifier can include an indicator of a name of the recipient and/or an indicator of the location of the recipient. For example, the shipping identifier can include at least one of a first name of the recipient, a last name of the recipient, a first letter of the first name of the recipient, a first letter of the last name of the recipient, or combinations thereof. In additional examples, the shipping identifier can include a zip code of the recipient. Optionally, the process 1000 can include, at 1008, the logistics management system sending the shipping identifier to the sender. The sender can use the shipping identifier to drop off the item at an electronic locker arrangement to be picked up by a courier. That is, the sender can access an electronic locker arrangement using the shipping identifier to place the item in a locker of an electronic locker arrangement.

At 1010, the process 1000 can include the logistics management system determining an electronic locker arrangement to store the item for pickup by the recipient. The logistics management system can determine an electronic locker arrangement that is within a threshold distance of the location of the recipient. Additionally, at 1012, the logistics management system can determine a courier to deliver the item to the electronic locker arrangement. The logistics management system can determine the courier based on the distance of the courier to a pickup location of the item, the location of the electronic locker arrangement, the current number of deliveries for the courier, a time period for delivery of the item, or combinations thereof.

At 1014, the logistics management system can provide delivery information to the courier. The delivery information can include a location of the electronic locker arrangement and/or a time period for delivery of the item. The delivery information can also include special instructions related to delivery of the item and/or locker access information. The locker access information can indicate one or more codes that can be used to access the electronic locker arrangement and store the item in the electronic locker arrangement to await pickup by the recipient. The one or more codes can include bar codes, QR codes, alphanumeric codes, and so forth. In particular implementations, the one or more codes can include or be generated based at least partly on the shipping identifier. The delivery information can also, in certain situations, be provided to the courier via a shipping label. The shipping label can be affixed to the item in various scenarios. The shipping label can include an identifier of the recipient, the shipping identifier, a location related to the delivery of the item, combinations thereof, and the like.

At 1016, the process 1000 can include the courier picking up the item to then deliver the item to the electronic locker arrangement. The courier can pick up the item from another electronic locker arrangement, in certain implementations. Additionally, the courier can pick up the item from a retail establishment. Further, the courier can pick up the item from another individual, such as another courier or from a location of the sender. At 1018, the process 1000 can include the courier requesting access to the electronic locker arrangement, and, at 1020, the process 1000 can include the electronic locker arrangement authenticating the courier to access the electronic locker arrangement. In particular implementations, the operations that take place with respect to 1020 and 1022 can include the operations described with respect to FIG. 4 in relation to authentication of the courier and access by the courier to a locker of the electronic locker arrangement. In additional implementations, the courier can utilize the shipping identifier to access the locker of the electronic locker arrangement to store the item.

At 1022, the electronic locker arrangement can notify the logistics management system of delivery of the item. The electronic locker arrangement can determine that the item has been placed inside a locker of the electronic locker arrangement based on sensor data obtained by the electronic locker arrangement. At 1024, the recipient can be notified of delivery of the item. For example, the logistics management system can send a message or an email to a computing device of the recipient indicating that the item has been delivered to the electronic locker arrangement. In some implementations, the recipient can then access the locker storing the item via the process described with respect to FIG. 4. In additional implementations, the sender can forward a delivery notification to the recipient. In particular, in situations where the recipient is not registered with the logistics management system, but the sender does have an account with the logistics management system, the sender can receive a delivery notification from the logistics management system and the sender can then forward the delivery information to the recipient.

In certain implementations, the electronic locker arrangement may not grant access to the courier. For example, the electronic locker arrangement may not have any vacant lockers to hold an item. In other cases, the electronic locker arrangement may not have any lockers available to hold an item having the characteristics of the item (e.g., size, handling instructions, weight, etc.). Additionally, the location of the recipient may have changed. In these situations, the logistics management system may determine an additional electronic locker arrangement to store the item for delivery. The logistics management system can then provide updated delivery information to the courier and, in some cases, updated pickup information to the recipient. In these situations, the shipping identifier may remain the same, while the destination location (e.g., zip code) may change.

Figure 11:
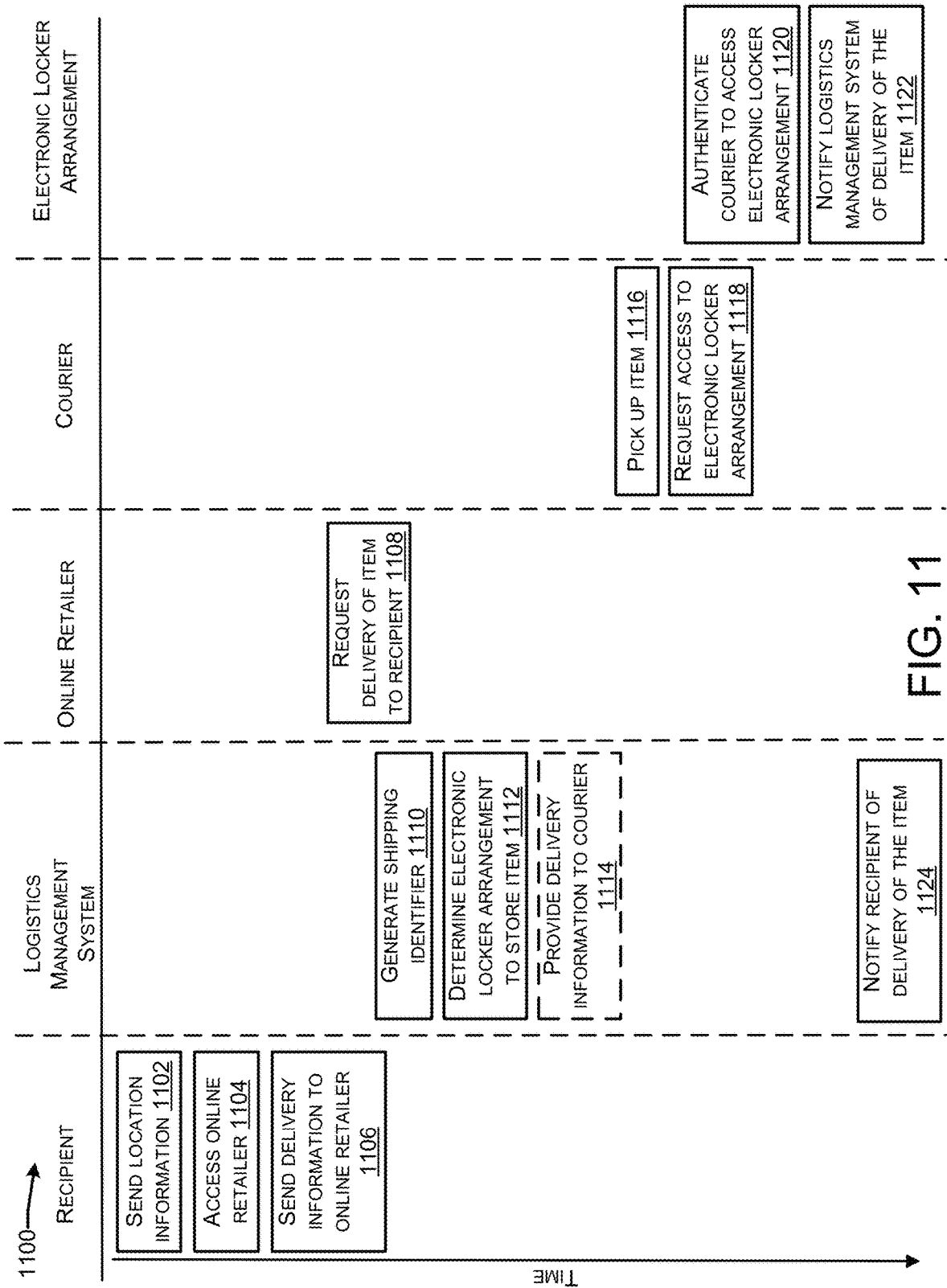
FIG. 11 is a diagram showing the timing of operations of a process performed by various entities to enable an item to be delivered to a recipient from an online retailer via an electronic locker arrangement using a location-based shipping identifier according to some implementations.

FIG. 11 is a diagram showing the timing of operations of a process 1100 performed by various entities to enable an item to be delivered to a recipient from an online retailer via an electronic locker arrangement using a location-based shipping identifier according to some implementations. The entities participating in the process 1100 include an online retailer that sells an item, a recipient of the item, an electronic locker arrangement that stores the item, a courier that delivers the item, and a logistics management system that coordinates delivery of the item from the sender to the recipient. At 1102, the process 1100 includes a recipient of an item sending location information to the logistics management system. The location information can include at least one of GPS data, triangulation data used by mobile devices to determine location, or an indicator of location, such as zip code, city, state, country, latitude and longitude coordinates, and the like that can be entered via a user interface provided by the logistics management system. In some implementations, the sender of the item can also be the recipient of the item.

At 1104, the recipient can access an online retailer. For example, the recipient can access a website or mobile device application of the online retailer and purchase an item for delivery via an electronic locker arrangement. At 1106, the recipient can enter delivery information via a user interface generated by the online retailer. In particular implementations, the delivery information can include a location of the recipient, an identifier of the recipient, and/or a request for delivery of the item via an electronic locker arrangement. In various implementations, the delivery information can include a system identifier of the recipient and/or a system identifier of the sender. The system identifier can indicate that the item is to be delivered via an electronic locker arrangement. That is, the online retailer can analyze the system identifier, determine that the system identifier is associated with the logistics management system, and include the system identifier in communications with the logistics management system.

In addition, at 1108, the online retailer can request that the logistics management system arrange for delivery of the item to the recipient via an electronic locker arrangement. In various implementations, the online retailer can utilize one or more calls of an API of the logistics management system to request delivery of the item to the recipient via an electronic locker arrangement. The request can, in certain implementations, include the system identifier of the recipient and/or the system identifier of the sender. In particular implementations, the sender can request to obtain the system identifier of the recipient from the logistics management system, the recipient, or both and include the system identifier of the recipient in the request by entering the system identifier of the recipient in a user interface element of a user interface generated by the online retailer. In additional implementations, the system identifier of the recipient can be obtained via one or more additional API calls using the name of the recipient or another identifier of the recipient.

At 1110, the process 1100 can include the logistics management system generating a shipping identifier for the recipient based on the location of the recipient. The shipping identifier can include an alphanumeric string of characters that uniquely identifies the recipient for the location. The shipping identifier can include an indicator of a name of the recipient and/or an indicator of the location of the recipient. For example, the shipping identifier can include at least one of a first name of the recipient, a last name of the recipient, a first letter of the first name of the recipient, a first letter of the last name of the recipient, or combinations thereof. In additional examples, the shipping identifier can include a zip code of the recipient. The shipping identifier can uniquely identify at least one of the sender or recipient for the request to have the item delivered to the recipient.

At 1112, the process 1100 can include the logistics management system determining an electronic locker arrangement to store the item for pickup by the recipient. The logistics management system can determine an electronic locker arrangement that is within a threshold distance of the location of the recipient. Optionally, at 1114, the logistics management system can provide delivery information to the courier. The delivery information can include a location of the electronic locker arrangement and/or a time period for delivery of the item. The delivery information can also include special instructions related to delivery of the item and/or locker access information. The locker access information can indicate one or more codes that can be used to access the electronic locker arrangement and store the item in the electronic locker arrangement to await pickup by the recipient. The one or more codes can include bar codes, QR codes, alphanumeric codes, and so forth. Also, the one or more codes can include and/or be generated based at least partly on the shipping identifier.

In particular implementations, the delivery information can be obtained by the courier via a shipping label associated with the item. The shipping label can be an electronic shipping label and/or affixed to the item. The shipping label can include the shipping identifier or other code utilized to access the electronic locker arrangement. The shipping label can also indicate a zip code to which the item is to be delivered. In various implementations, the courier can obtain a location of the electronic locker arrangement based on the zip code for the delivery of the item. For example, the courier can utilize a website or mobile device application to lookup the location of the electronic locker arrangement to deliver the item based on the destination zip code. In additional examples, the location of the electronic locker arrangement to which the courier is to deliver the item can be included in the shipping label. To illustrate, the online retailer or a delivery service provider that is coordinating delivery of the item on behalf of the online retailer can obtain a location of the electronic locker arrangement and provide the location to the courier electronically via a computing device and/or via a shipping label generated by the online retailer or the delivery service provider.

At 1116, the process 1100 can include the courier picking up the item to then deliver the item to the electronic locker arrangement. The courier can pick up the item from another electronic locker arrangement, in certain implementations. Additionally, the courier can pick up the item from a retail establishment. Further, the courier can pick up the item from another individual, such as another courier or from a location of the sender. At 1118, the process 1100 can include the courier requesting access to the electronic locker arrangement, and, at 1120, the process 1100 can include the electronic locker arrangement authenticating the courier to access the electronic locker arrangement. In particular implementations, the operations that take place with respect to 1118 and 1120 can include the operations described with respect to FIG. 4 in relation to authentication of the courier and access by the courier to a locker of the electronic locker arrangement. In some examples, the access to the electronic locker arrangement by the courier can involve the shipping identifier. For example, the courier can enter the shipping identifier via a keypad or touchscreen of the electronic locker arrangement. In additional implementations, the courier can scan the shipping identifier using a scanning device of the electronic locker arrangement.

At 1122, the electronic locker arrangement can notify the logistics management system of delivery of the item. The electronic locker arrangement can determine that the item has been placed inside a locker of the electronic locker arrangement based on sensor data obtained by the electronic locker arrangement. At 1124, the recipient can be notified of delivery of the item. For example, the logistics management system can send a message or an email to a computing device of the recipient indicating that the item has been delivered to the electronic locker arrangement. In some implementations, the recipient can then access the locker storing the item via the process described with respect to FIG. 4. In additional implementations, the sender can forward a delivery notification to the recipient. In particular, in situations where the recipient is not registered with the logistics management system, but the sender does have an account with the logistics management system, the sender can receive a delivery notification from the logistics management system and the sender can then forward the delivery information to the recipient.

Figure 12:
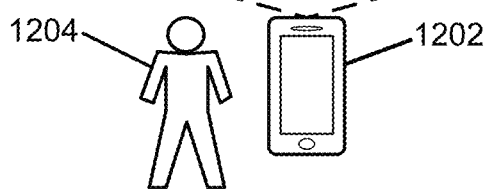
FIG. 12 shows a first user interface to capture information to deliver an item to a recipient according to some implementations.

FIG. 12 shows a first user interface 1200 to capture information to deliver an item to a recipient. The user interface 1200 can be rendered and displayed on a computing device 1202. The computing device 1202 can be operated by a user 1204. The computing device 1202 can include a mobile computing device, a smart phone, a tablet computing device, a laptop computing device, a desktop computing device, a gaming console, a portable gaming device, a multimedia device, combinations thereof, and the like. The user interface 1200 can be displayed in conjunction with a mobile device app executed by the computing device 1202 or a website accessed by the computing device 1202. In the illustrative example of FIG. 12, the user interface 1200 can be provided by an online retailer and the user interface 1200 can include user interface elements directed to displaying and capturing information related to the purchase of one or more items from the online retailer.

The user interface 1200 includes a first user interface element 1206 that indicates items that have been selected for purchase and an amount of currency to be paid for the items. In some cases, the first user interface element 1206 can be selectable to show additional information about the items to be purchased. The user interface 1200 also includes a second user interface element 1208 to capture an identifier of the individual, such as a name of the individual, to receive the one or more items. In some cases, the individual that is to receive the one or more items can be the user 1204. In other cases, the user 1204 can purchase the one or more items and have them sent to an additional individual. The user interface 1210 can also include a third user interface element 1200, a fourth user interface element 1212, a fifth user interface element 1214, a sixth user interface element 1216, and a seventh user interface element 1218 that can capture information indicating a location to deliver the one or more items. In particular implementations, the location can include a location of an electronic locker arrangement to which the one or more items are to be delivered. In the illustrative example of FIG. 12, the third user interface element 1210 and the fourth user interface element 1212 can capture information that indicates an address to deliver the one or more items. Additionally, the fifth user interface element 1214 can capture information related to a city that includes the location to deliver the one or more items, the sixth user interface element 1216 can capture information related to a state that includes the location to deliver the one or more items, and the seventh user interface element 1218 can capture information related to a zip code that includes the location to deliver the one or more items. The user 1204 can utilize one or more input devices of the computing device 1202 to enter information into the user interface elements 1208, 1210, 1212, 1214, 1216, 1218. Further, the user interface 1200 includes an eighth user interface element 1220 that is selectable to submit the information entered into one or more of the user interface elements 1208, 1210, 1212, 1214, 1216, 1218 to the online retailer.

Figure 13:
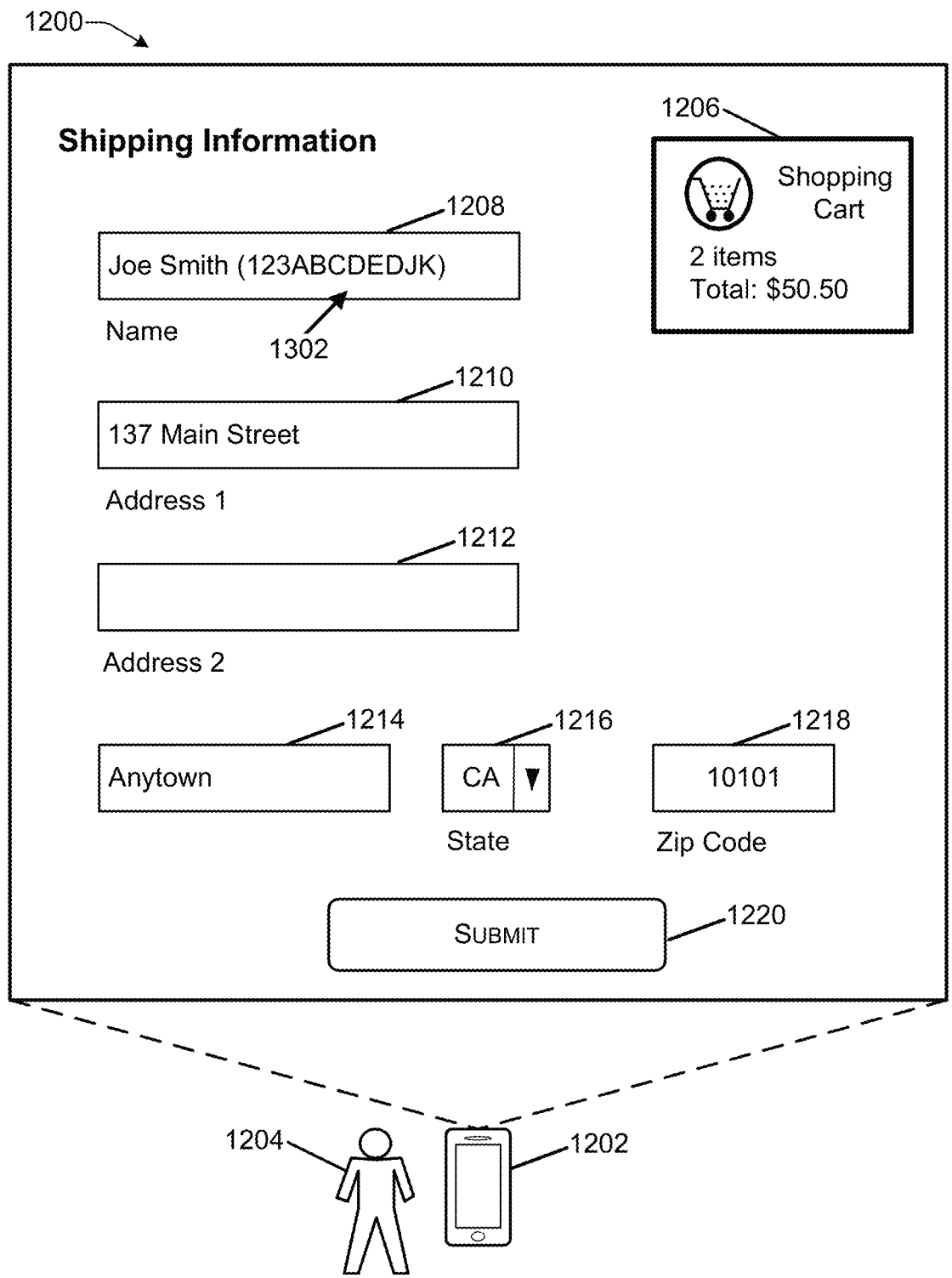
FIG. 13 shows an implementation of the first user interface with information entered into the user interface elements of the first user interface according to some implementations.

FIG. 13 shows an implementation of the first user interface 1200 with information entered into the user interface elements 1208, 1210, 1214, 1216, 1218. In particular, the second user interface element 1208 includes a system identifier 1302. The system identifier 1302 can be an identifier of the user 1204 for a logistics management system. In additional implementations, the system identifier 1302 can be an identifier of a recipient of an item being delivered to an electronic locker arrangement. The system identifier 1302 can indicate to the online retailer that an item is to be delivered via an electronic locker arrangement. Consequently, the online retailer can communicate with the logistics management system to arrange for the delivery of the item via an electronic locker arrangement. In various implementations, the logistics management system can generate a shipping identifier that can be used in conjunction with the delivery of the item via the electronic locker arrangement. In some implementations, the system identifier 1302 can be entered into the second user interface element 1208 by the user 1204 via one or more input devices of the computing device 1202. In other implementations, the second user interface element 1208 can be automatically populated with the system identifier 1302. For example, a mobile device app of the logistics management system can operate in conjunction with a mobile device app of the online retailer to populate the second user interface element 1208 with the system identifier 1302. In various implementations, a script provided by the logistics management system can be executed with respect to a browser application, a mobile device app of the logistics management system, a mobile device app of the online retailer, or a combination thereof, to populate the second user interface element 1208 with the system identifier 1302. In other implementations, the system identifier 1302 need not be input or populated if the shipping identifier is input to this user interface by user or system. Finally, courier will use the shipping identifier to access the locker and deliver the item.

Figure 14:
FIG. 14 shows a user interface that includes a shipping identifier for the delivery of an item via an electronic locker arrangement according to some implementations.
Figure 14:
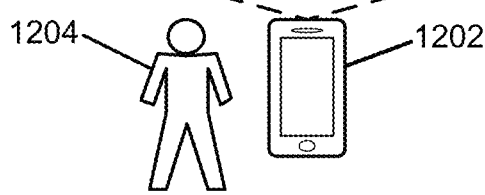

FIG. 14 shows a user interface 1400 that includes a shipping identifier for the delivery of an item via an electronic locker arrangement according to some implementations. The user interface 1400 can be displayed via the computing device 1202 that is operated by the user 1204. The user interface 1400 can be displayed by a mobile device app executed by the computing device 1402 or a web site accessed by the computing device 1202. The user interface 1400 can be provided after the purchase of an item that is requested via the user interface 1200 of FIG. 12 and FIG. 13. In particular implementations, the user interface 1400 can be a shipping label. The shipping label can be printed and affixed to an item and/or the shipping label can be an electronic shipping label that can be used to deliver the item.

The user interface 1400 can include sender information 1402. In the illustrative example of FIG. 14, the sender information 1402 can include the information of an online retailer providing the item to the recipient. In other examples, the sender information 1402 can include information of an individual sending the item to a recipient. The user interface 1400 can also include recipient information 1404. The recipient information can include an identifier of the recipient 1406. The identifier of the recipient 1406 can include a name of the recipient and, in certain implementations, a system identifier 1406 of the recipient or an individual sending the item to the recipient. The user interface 1400 can also include a shipping identifier 1408. The shipping identifier 1408 can include a first portion that includes a zip code "10101" related to delivery of the item, a second portion that indicates an identifier "0005" of an electronic locker arrangement to which the item is to be delivered, and a third portion indicating the name of the recipient "JS", which are the initials of the first name and last name of the recipient. The shipping identifier 1408 can also include a fourth portion that includes an alphanumeric code "7XU&HR" that can be specific to the delivery of a particular item. In additional implementations, the shipping identifier can be represented as a bar code 1410 and/or a QR code 1412. Also, in some implementations, the shipping identifier 1408 can be much simpler by just including the first, second, or third portions above, as long as it is easy for courier to identify which locker to deliver the item.

FIGS. 15-20 illustrate example processes of delivering items to recipients from senders via electronic locker arrangements. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 15:
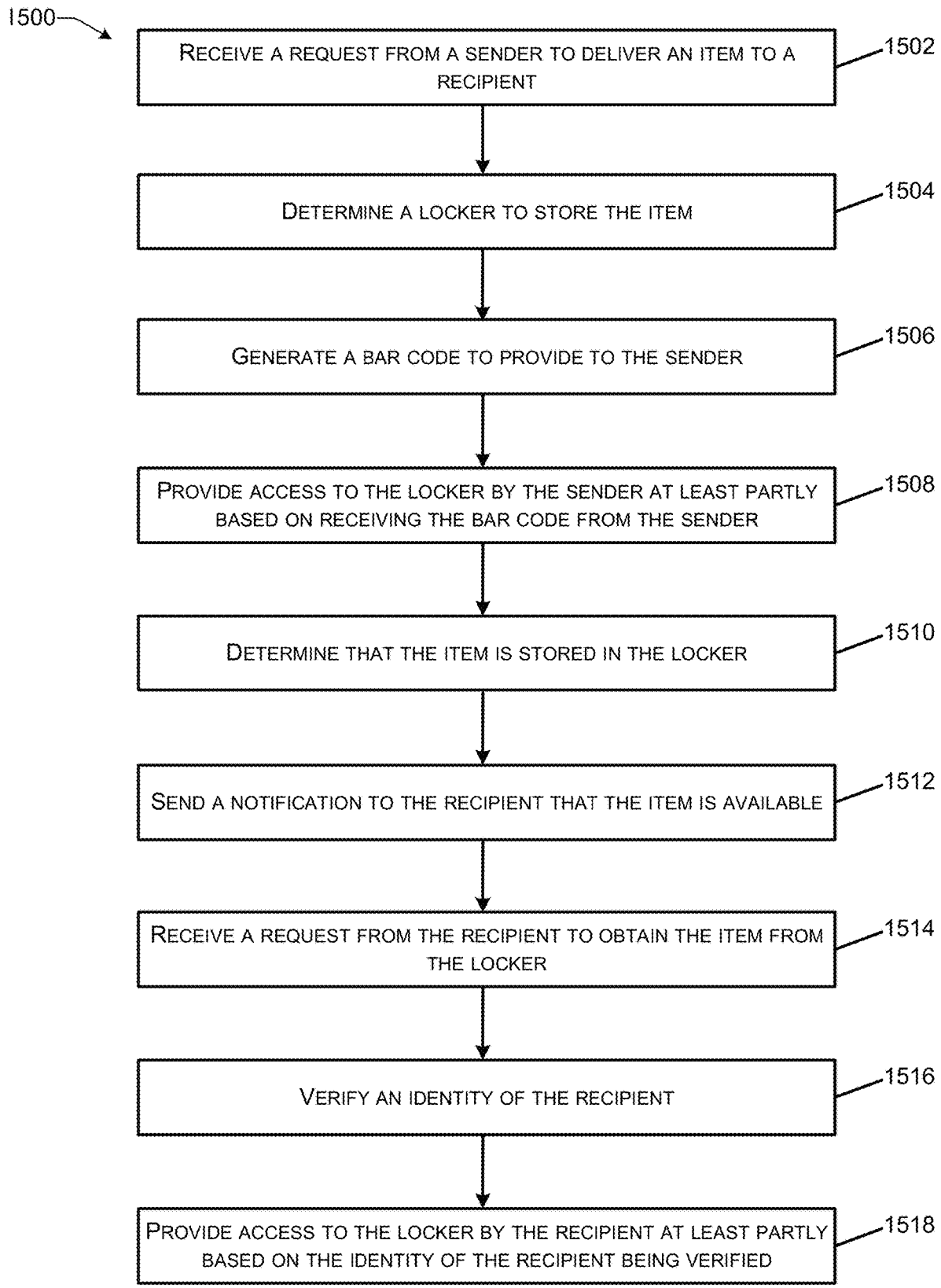
FIG. 15 is a flow diagram of a process to facilitate the delivery of an item from a sender to a recipient via a single electronic locker arrangement according to some implementations.

FIG. 15 is a flow diagram of a process 1500 to facilitate the delivery of an item from a sender to a recipient via a single electronic locker arrangement according to some implementations. At 1502, the process 1500 can include receiving a request from a sender to deliver an item to a recipient. The request can be received from a computing device of the sender. In some cases, the request can be received by a website of a logistics management system, while in other cases, the request can be received by a mobile app executed on the computing device of the recipient.

At 1504, the process 1500 can include determining a locker to store the item. The locker can be included in an electronic locker arrangement. In some cases, the electronic locker arrangement can be located in a same geographic region as the sender and the recipient. In particular implementations, the electronic locker arrangement, the sender, and the recipient can each be located in a same zip code. In other implementations, the electronic locker arrangement, the sender, and the recipient can be located in a same neighborhood or district. In still additional implementations, the electronic locker arrangement, the sender, and the recipient can be located in a same city, town, village, or other municipality. Determining the locker to store the item can include analyzing dimensions and/or other characteristics of the item in relation to dimensions and/or storage capacity of lockers of the electronic locker arrangement that can have different dimensions and/or storage capacities with respect to one another.

At 1506, the process 1500 can include generating a bar code to provide to the sender. The bar code can include an identifier of the sender and/or an identifier of the item. In particular implementations, the bar code can be provided to a computing device of the sender. In other situations, the bar code can be accessible to the sender via a website that can be accessed by a computing device of the sender. At 1508, access can be provided to the locker by the sender at least partly based on receiving the bar code or information encoded by the bar code from the sender. In some cases, the bar code or information encoded by the bar code received from the sender can be compared against the bar code initially provided to the sender. In response to determining that the bar code received from the sender corresponds to the bar code initially sent to the sender, the sender can be authorized to access the locker.

At 1510, the process 1500 can include determining that the item is stored in the locker. In particular implementations, sensor data associated with the locker can be utilized to determine that the item has been stored in the locker. At 1512, the process 1500 can include sending a notification to the recipient that the item is available for pickup at the electronic locker arrangement. In some cases, the notification can be provided to a computing device of the recipient. The notification can be provided to the recipient via an account of the recipient with a service provider implementing a logistics management system. Information associated with the account of the recipient with the service provider can be accessible to the recipient via a website of the service provider, a mobile app executed by a computing device of the recipient, or both.

At 1514, the process 1500 can include receiving a request from the recipient to obtain the item from the locker. In some cases, the request can be provided via one or more user interfaces displayed at the electronic locker arrangement, while in other cases, the request can be provided via a mobile app executed by a computing device of the recipient. Additionally, at 1516, the process 1500 can include verifying an identity of the recipient, and, at 1518, the process 1500 includes providing access to the locker by the recipient at least partly based on the identity of the recipient being verified. In particular implementations, the identity of the recipient can be verified utilizing a QR code provided to the recipient that uniquely identifies the recipient with respect to the item.

The operations of the process 1500 can be implemented by one or more computing devices. In some situations, the operations of the process 1500 can be implemented by an electronic locker arrangement. In other scenarios, the operations of the process 1500 can be implemented by a logistics management system. In still other implementations, the operations of the process 1500 can be implemented by both an electronic locker arrangement and a logistics management system.

Figure 16:
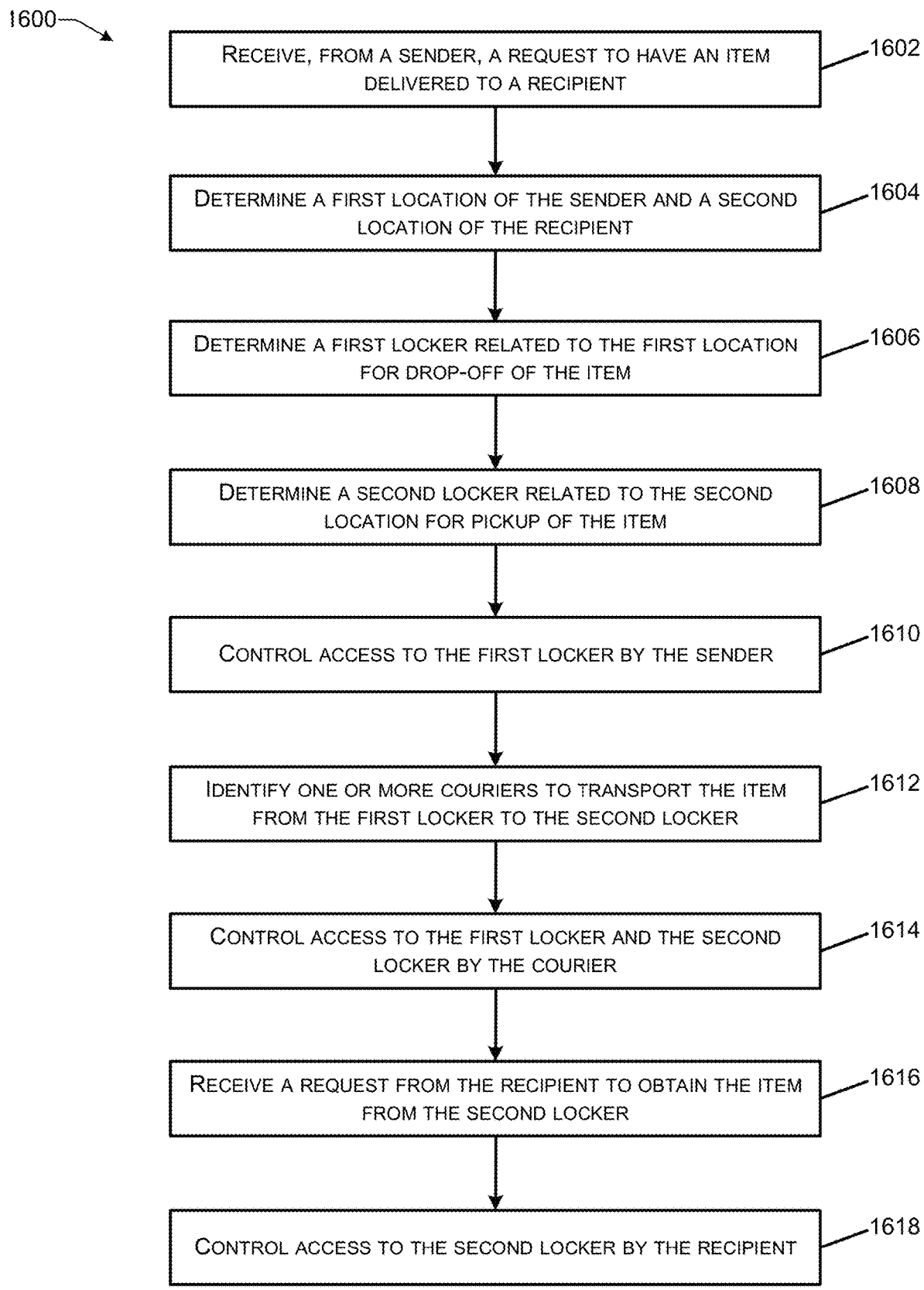
FIG. 16 is a flow diagram of a process to facilitate the delivery of an item from a sender to a recipient via multiple electronic locker arrangements according to some implementations.

FIG. 16 is a flow diagram of a process 1600 to facilitate the delivery of an item from a sender to a recipient via multiple electronic locker arrangements according to some implementations. At 1602, the process 1600 can include receiving, from a sender, a request to have an item delivered to a recipient. The request can be received from a computing device of the sender. In some cases, the request can be received by a website of a logistics management system, while in other cases, the request can be received by a mobile app executed on the computing device of the sender.

At 1604, the process 1600 can include determining a first location of the sender and a second location of the recipient. The first location and the second location can be determined based on information included in the request. In other situations, the first location and the second location can be determined based on GPS information received from computing devices of the sender and the recipient. In certain implementations, the first location can include a first geographic area and the second location can include a second geographic area. In particular implementations, the first location can include a first zip code and the second location can include a second zip code. In additional implementations, the first location can include a first neighborhood or first district and the second location can include a second neighborhood or second district. In further implementations, the first location can include a first municipal or political region (e.g., city, state, territory, village, town, county, etc.) and the second location can include a second municipal or political region. In other implementations, the first location can include a first geographic region specified by a logistics management system and the second location can include a second geographic region specified by the logistics management system. To illustrate, the logistics management system can divide a geographical area into a number of regions. In particular implementations, the regions can have shapes with dimensions expressed in feet, meters, kilometers, miles, or combinations thereof. The shapes of the regions can be regular shapes (e.g., square, rectangle, circle), in some scenarios, and irregular in other instances.

At 1606, the process 1600 can include determining a first locker related to the first location for drop-off of the item by the sender, and, at 1608, the process 1600 includes determining a second locker related to the second location for pickup of the item by the recipient. The first locker can be included in a first electronic locker arrangement located in the first location and the second locker can be included in a second electronic locker arrangement located in the second location. In some cases, the first electronic locker arrangement and the second electronic locker arrangement can be owned and/or operated by a service provider of the logistics management system. In other situations, at least one of the first electronic locker arrangement and the second electronic locker arrangement can be owned and/or operated by a service provider that is different from the service provider of the logistics management system. At 1610, the process 1600 can include controlling access to the first locker by the sender. In some cases, the sender can access the first locker in response to the sender providing an identifier to the logistics management system. The identifier can be provided via a logistics app executed on a computing device of the sender or via the first electronic locker arrangement. In certain implementations, the identifier can be encoded by a bar code of the item.

At 1612, the process 1600 can include identifying one or more couriers to transport the item from the first locker to the second locker. In various implementations, the one or more couriers can be identified based on one or more criteria. The one or more criteria can include location of the couriers with respect to the first location and the second location, ratings of the couriers, number of items assigned to be delivered by the couriers, and so forth. The courier can also be identified based at least partly on an availability indicated by the courier to deliver items to the first location and the second location. In certain situations, multiple couriers can be identified to deliver the item to the recipient. In particular implementations, the first location and the second location can be different cities, countries, or regions and one or more intermediate electronic locker arrangements can be determined to store the item. In these scenarios, a first courier can be identified for the first location and a second courier can be identified for the second location. Further, one or more additional couriers can be identified to transport the item between one or more intermediate electronic locker arrangements between the first location and the second location.

At 1614, the process 1600 can include controlling access to the first locker and the second locker by the courier. The access to the first locker and the second locker can be based at least partly on verifying the identity of the courier at the first location and the second location. In some cases, the identity of the courier can be determined based on identifiers provided to the courier, such as via a logistics app executed by a computing device of the courier or via an account of the courier with a logistics management system that is accessible via a website of the logistics management system. The identifiers can include or be encoded by bar codes, QR codes, alphanumeric strings, image data, biometric data, combinations thereof, and the like. The identifiers can also be unique to the courier with respect to the item.

At 1616, the process 1600 can include receiving a request from the recipient to obtain the item from the second locker. In particular implementations, the recipient can request to obtain the item from the second locker after receiving a notification that the item is available to be picked up at the second locker. At 1618, the process 1600 can include controlling access to the second locker by the recipient. The access to the second locker can be based at least partly on verifying the identity of the recipient at the second location. In some cases, the identity of the recipient can be determined based on identifiers provided to the recipient, such as via a logistics app executed by a computing device of the recipient or via an account of the recipient with a logistics management system that is accessible via a website of the logistics management system. The identifiers can include bar codes, QR codes, alphanumeric strings, image data, biometric data, combinations thereof, and the like. The identifiers can be unique to the recipient with respect to the item.

The operations of the process 1600 can be implemented by one or more computing devices. In some situations, the operations of the process 1600 can be implemented by one or more electronic locker arrangements. In other scenarios, the operations of the process 1600 can be implemented by a logistics management system. In still other implementations, the operations of the process 1600 can be implemented by one or more electronic locker arrangements and a logistics management system.

Figure 17:
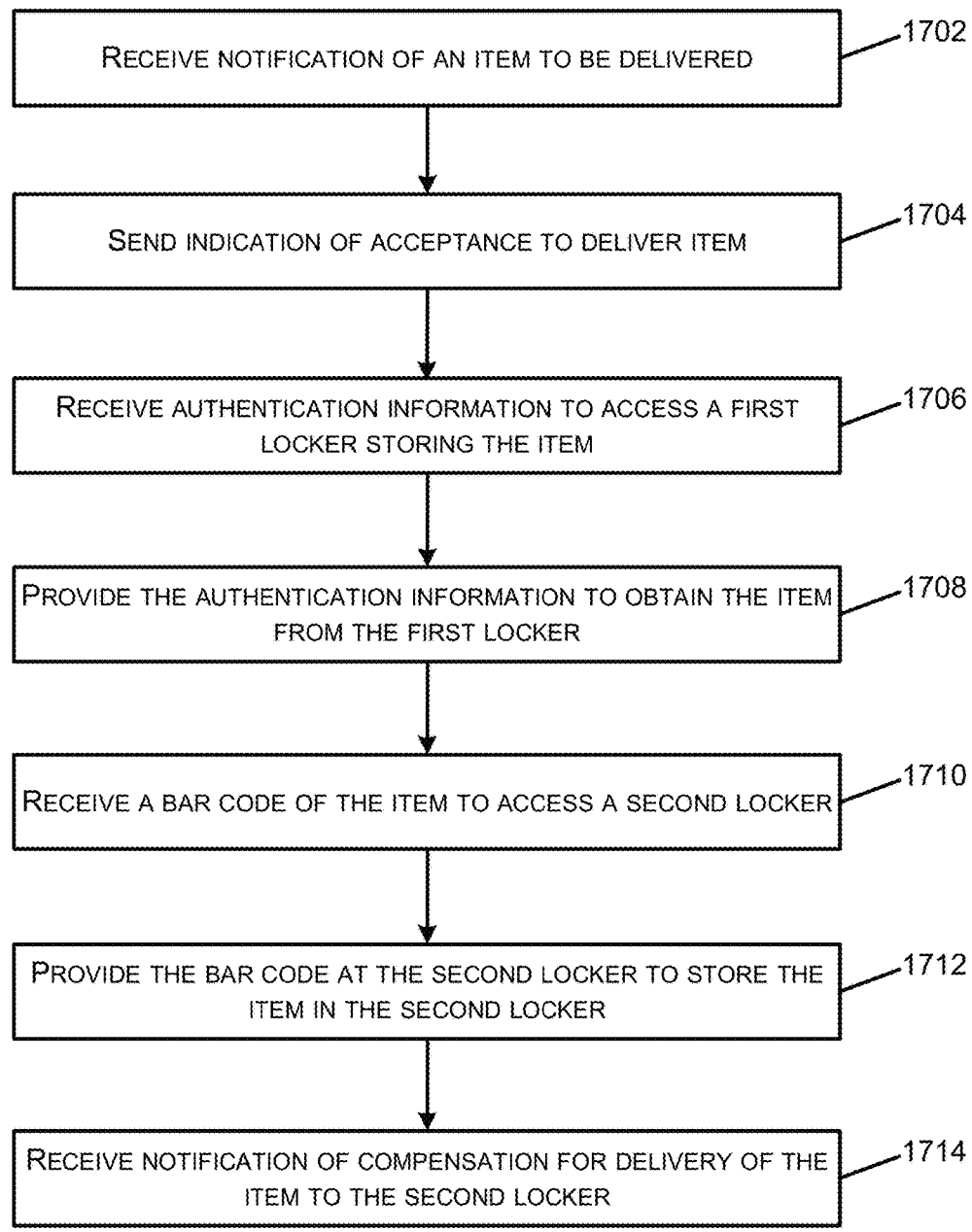
FIG. 17 is a flow diagram of a process to facilitate the delivery of an item from a recipient to a sender via a courier using an application executed by a computing device of the courier according to some implementations.

FIG. 17 is a flow diagram of a process 1700 to facilitate the delivery of an item from a recipient to a sender via a courier using an application executed by a computing device of the courier according to some implementations. At 1702, the process 1700 can include receiving notification of an item to be delivered. The notification can be provided by a logistics app executed by a computing device of the courier. In some implementations, the notification can include information about the item, such as a description of the item, dimensions of the item, a type of the item, and so forth. The notification can also include a first location for the courier to pick up the item and a second location for the courier to drop off the item. At 1704, the process 1700 can include sending an indication of acceptance to deliver the item. The acceptance to deliver the item can be sent via a logistics app executed by the computing device of the courier.

At 1706, the process 1700 can include receiving authentication information to access a first locker storing the item. In some cases, the authentication information can be encoded by a QR code. At 1708, the process 1700 can include providing the authentication information to obtain the item from the first locker. In some implementations, the authentication information can be extracted from the QR code by a logistics app executed by a computing device of the courier. In particular cases, the authentication information can include an identifier of the first locker or an identifier of the first electronic locker arrangement that includes the first locker. The logistics app can also provide additional information for the courier to obtain access to the item at the first locker, such as an identifier of the courier. The identifier of the courier can be associated with an account of the courier with a logistics management system.

At 1710, the process 1700 can include receiving a bar code to access the second locker, and, at 1712, the process 1700 can include providing the bar code at the second locker to store the item in the second locker. The bar code can encode an identifier of the item, in some situations. Additionally, the bar code can be displayed via the logistics app and scanned by an electronic locker arrangement that includes the second locker. At 1714, the process 1700 can include receiving notification of compensation for delivery of the item to the second locker. In particular implementations, the courier can receive payment for the delivery of the item and the computing device of the courier can receive the notification that an account of the courier has been credited the payment. In some cases, the payment to the courier can be based at least partly on a type of item delivered by a courier. Also, the payment to the courier can be based at least partly on a timing of the delivery of the item, such as within a specified period of time or by a specified deadline. Further, the payment to the courier can be based at least partly on a rating of the courier.

Figure 18:
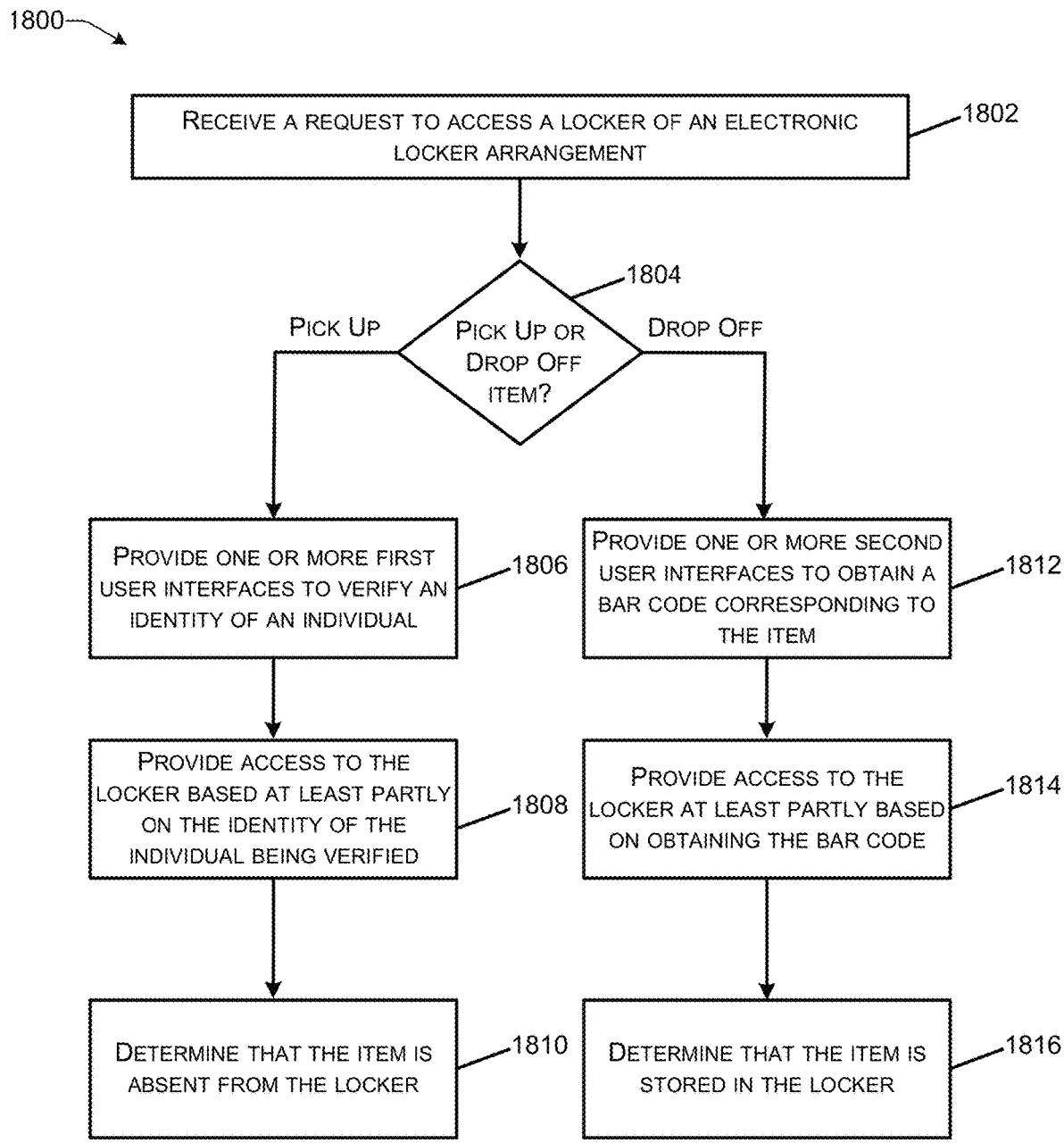
FIG. 18 is a flow diagram of a process to facilitate access to an electronic locker arrangement for the delivery of an item from a sender to a recipient.

FIG. 18 is a flow diagram of a process 1800 to facilitate access to an electronic locker arrangement for the delivery of an item from a sender to a recipient. At 1802, the process 1800 can include receiving a request to access a locker of an electronic locker arrangement. In some cases, the request can be provided via one or more user interfaces displayed by the electronic locker arrangement. In other situations, the request can be received via a logistics app executed by a computing device of an individual, such as a sender of an item, a recipient of an item, or a courier. At 1804, the process 1800 can include determining whether the item is to be picked up or dropped off. When the item is to be picked up, the process 1800 can move to 1806. When the item is to be dropped off, the process 1800 can move to 1812.

At 1806, the process 1800 can include providing one or more first user interfaces to verify an identity of the individual requesting to access the electronic locker arrangement. In some cases, the one or more first user interfaces can be used to display a QR code that can be scanned by a computing device of the individual. In some cases, the QR code can be obtained by the electronic locker arrangement from a logistics management system. At 1808, the process 1800 can include providing access to the locker based at least partly on the identity of the individual being verified. For example, the electronic locker arrangement can receive information from the logistics management system indicating that the identity of the individual has been verified. The electronic locker arrangement can unlock the locker to provide access to the locker by the individual. At 1810, the process 1800 can include determining that the item is absent from the locker. In some situations, the electronic locker arrangement can determine that the item is absent from the locker based at least partly on sensor data. The sensor data can indicate that the door of the locker has been closed. The sensor data can also include weight sensor data indicating that the item has been removed from the locker based at least partly on a change in the weight detected by the weight sensors. In addition, the sensor data can include image data and/or video data indicating that the item has been removed from the locker. In particular implementations, the electronic locker arrangement can provide one or more additional user interfaces to repeat the process for an additional item to be picked up at the electronic locker arrangement. For each item picked up at the electronic locker arrangement a different QR code can be provided that uniquely identifies the individual picking up the item with respect to the item. In this way, different QR codes can be provided for the same individual picking up different items.

At 1812, the process 1800 can include providing one or more user interfaces to obtain a bar code corresponding to the item. In particular implementations, the one or more second user interfaces can be used to scan a bar code from a computing device of the individual. At 1814, the process 1800 can include providing access to the locker at least partly based on obtaining the bar code. In certain implementations, access can be provided to the locker based at least partly on receiving information from a logistics management system indicating that the bar code corresponds to the bar code assigned to the item by the logistics management system. At 1816, the process 1800 can include determining that the item is stored in the locker. In some situations, the electronic locker arrangement can determine that the item is stored in the locker based at least partly on sensor data. The sensor data can indicate that the door of the locker has been closed. The sensor data can also include weight sensor data indicating that the item has been placed into the locker based at least partly on a change in the weight detected by the weight sensors. In addition, the sensor data can include image data and/or video data indicating that the item has been placed in the locker. In particular implementations, the electronic locker arrangement can provide one or more additional user interfaces to repeat the process for an additional item to be dropped off at the electronic locker arrangement. For each item dropped off at the electronic locker arrangement a different QR code can be provided that uniquely identifies the individual dropping off the item with respect to the item. In this way, different QR codes can be provided for the same individual dropping off different items.

Figure 19:
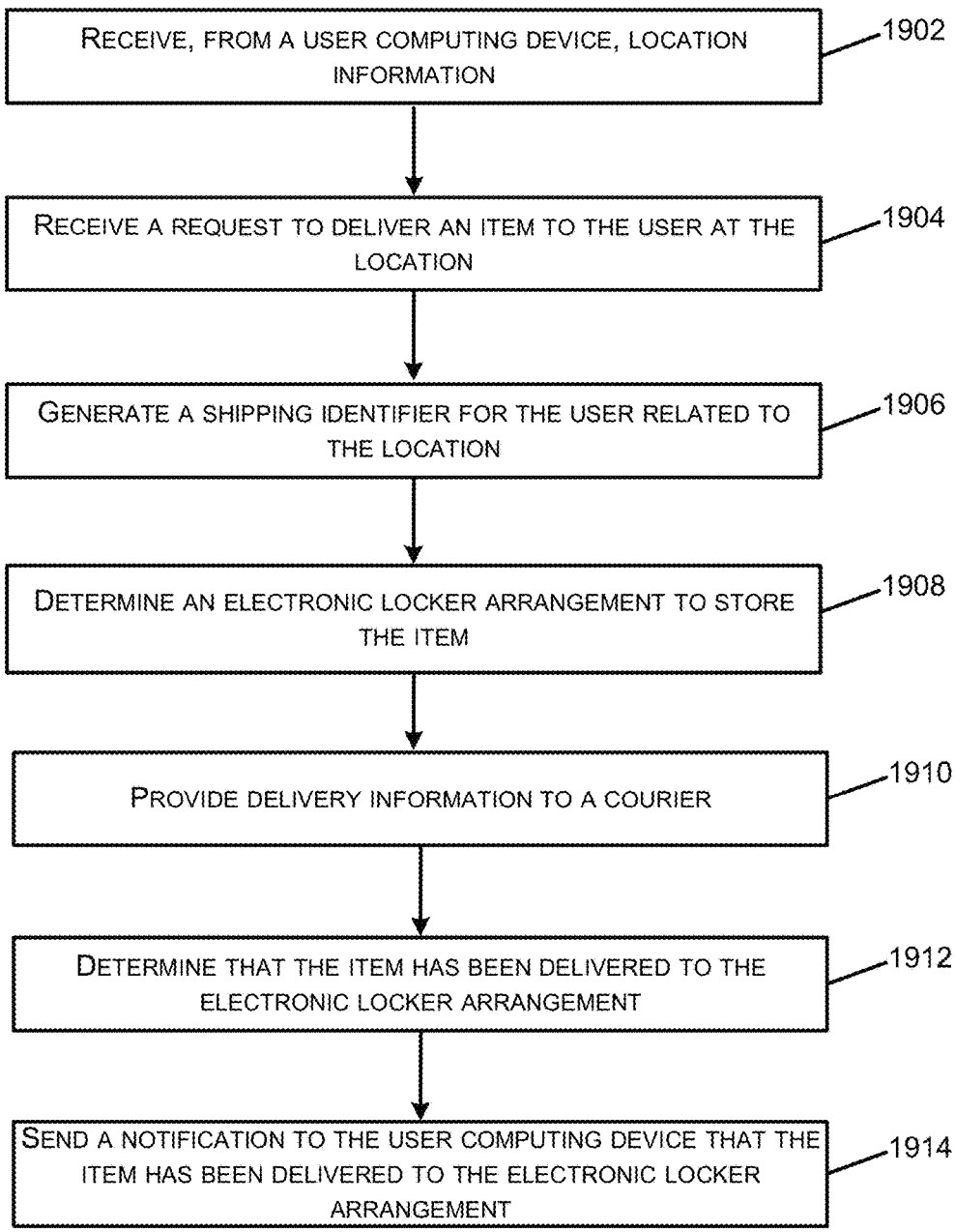
FIG. 19 is a flow diagram illustrating a process to deliver items to individuals using shipping identifiers specific to a request to deliver an item to a recipient via an electronic locker arrangement according to some implementations.

FIG. 19 is a flow diagram illustrating a process 1900 to deliver items to individuals using identifiers specific to a recipient and to the location of the recipient. At 1902, the process 1900 includes receiving, from a user computing device, location information. The location information can include GPS information corresponding to a location of the user computing device. In addition, the location information can include triangulation data corresponding to the location of the user computing device. In particular implementations, the location information can include a zip code of the user. The location information can be obtained by a logistics management system, in some examples, via one or more user interfaces generated by the user computing device.

At 1904, the process 1900 includes receiving a request to deliver an item to the user at the location. The request can be obtained by the logistics management service from a computing device of a sender of the item to the user. The logistics management service can generate one or more user interfaces to capture data related to the request. The request can include an identifier of the user, the shipping identifier of the user, a location of the user, or combinations thereof. In additional implementations, the request can be obtained by the logistics management service via an online retailer. In these situations, a sender can specify delivery of the item via an electronic locker arrangement and the online retailer can utilize calls of one or more APIs to send information to the logistics management system related to the delivery of the item. For example, the logistics management system can obtain a location of the user, a location of the sender, an identifier of the sender, at least one identifier of the user, a shipping identifier of the user, or combinations thereof, via the online retailer. Further, the request can be obtained from a third-party delivery service that delivers items to individuals. In these scenarios, the third-party delivery service can utilize one or more calls of an API of the logistics management system to send information to the third-party delivery service related to delivery of the item. To illustrate, the logistics management system can obtain a location of the user, a location of the sender, an identifier of the sender, at least one identifier of the user, or combinations thereof, via the third-party delivery service.

At 1906, the process 1900 includes generating a shipping identifier for the recipient related to the location. The shipping identifier can be a string of characters that uniquely identifies the user. In certain examples, the shipping identifier can be a code, such as a QR code. The shipping identifier can be generated based at least partly on an identifier of the user and/or the location of the user. The user can provide the shipping identifier in situations where the user is having an item delivered to themselves, such as via an order to an online retailer. In additional implementations, the user can provide the shipping identifier to others that can have items delivered to the user using the shipping identifier. The shipping identifier can be used, in some scenarios, to access an electronic locker arrangement assigned to store the item.

At 1908, the process 1900 can include determining an electronic locker arrangement to store the item for pickup by the user and determine a courier to deliver the item to the electronic locker arrangement. The logistics management system can determine the electronic locker arrangement to store the item based on a location of the electronic locker arrangement with respect to the location of the user. The logistics management system can also determine the electronic locker arrangement to store the item based on capacity of the electronic locker arrangement to store the item, a size of the item, and/or other characteristics of the item (e.g., requires refrigeration). In addition, the logistics management system can determine a courier to deliver the item to the electronic locker arrangement based on a location of the courier with respect to the location of the user and an availability of the courier to deliver the item to the electronic locker arrangement.

At 1910, the process 1900 can include providing delivery information to a courier delivering the item to the electronic locker arrangement. The delivery information can include the location of the electronic locker arrangement, information to access a locker of the electronic locker arrangement, information related to characteristics of the item, and/or a time or period of time to drop off the item at the electronic locker arrangement. The courier can be a courier of the logistics management system or a courier of a third-party delivery service. At least a portion of the delivery information can be provided via a shipping label that includes a shipping identifier and other information that can be used to access the electronic locker arrangement. Additionally, the delivery information can be provided via a computing device of a courier. The third-party delivery service can also obtain the delivery information via one or more API calls and provide the delivery information to a courier of the third-party delivery service.

At 1912, the process 1900 can include determining that the item has been delivered to the electronic locker arrangement. In certain implementations, the courier can send an indication to the electronic locker arrangement indicating that the item has been dropped off at the electronic locker arrangement. In additional implementations, the electronic locker arrangement can send an indication to the logistics management system that the item has been stored in the electronic locker arrangement. The indication sent by the electronic locker arrangement can be based on sensor data of the electronic locker arrangement. At 1914, the process 1900 can include sending a notification to the user computing device that the item has been delivered to the electronic locker arrangement. The notification can include a message, an email, an automated phone call, or combinations thereof.

In various implementations, the third-party delivery service, the logistics management system, and an online retailer can exchange information for an item to be delivered to the recipient that was ordered via the online retailer and delivered by the third-party delivery service. In these situations, the online retailer can conduct a transaction to purchase an item and the purchaser can request that the item is delivered to the recipient via an electronic locker arrangement. The purchaser can arrange for shipping of the item to an electronic locker arrangement via either the logistics management system or via the third-party delivery service using a shipping identifier of the recipient that is obtained by the online retailer.

Figure 20:
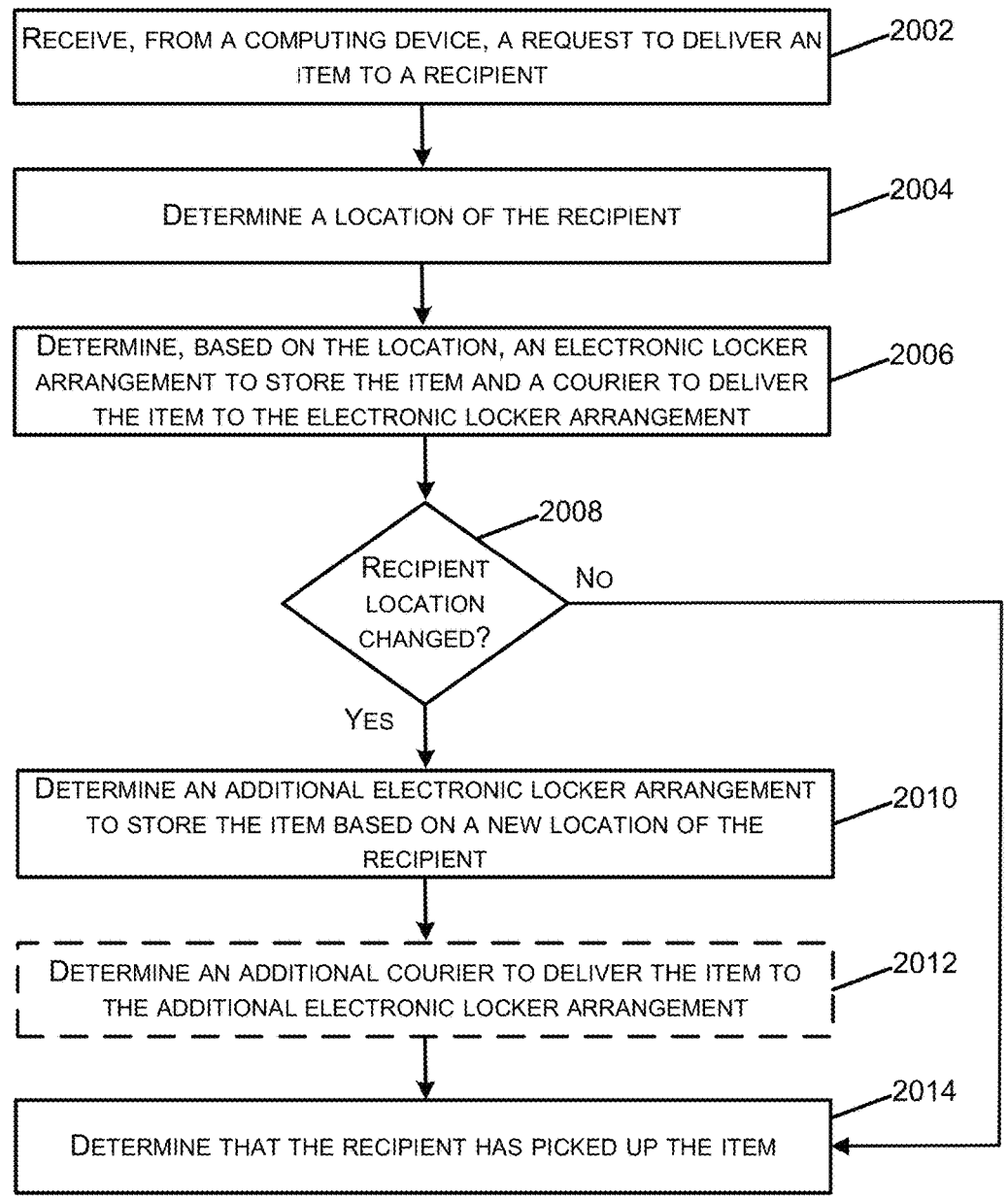
FIG. 20 is a flow diagram illustrating a process to deliver items to individuals via electronic locker arrangements when the locations of the individuals changes.

FIG. 20 is a flow diagram illustrating a process 2000 to deliver items to individuals via electronic locker arrangements when the locations of the individuals changes. At 2002, the process 2000 can include receiving, from a computing device, a request to deliver an item to a recipient. In addition, at 2004, the process 2000 can include determining a location of the recipient. For example, the location of the recipient can be indicated by GPS and/or triangulation data obtained from a computing device of the recipient. In other examples, the location of the recipient can be determined based on input captured by one or more user interfaces corresponding to the location of the recipient, such as a zip code of the recipient. At 2006, the process 2000 can include determining, based on the location of the recipient, an electronic locker arrangement to store the item and a courier to deliver the item to the electronic locker arrangement.

At 2008, the process 2000 can include determining whether the location of the recipient has changed. To illustrate, a recipient can move from one location to another after the request has been made to deliver the item to the recipient. In various implementations, the change in location of the recipient can be based at least partly on GPS data or other location data sent from a computing device of the recipient to logistics management system. In additional implementations, the change in location of the recipient can be obtained via input from a computing device of the recipient indicating the change in location of the recipient. For example, a mobile device application or website of the logistics management system can generate a user interface that can capture updated location information for the recipient.

In situations where the recipient has changed location, the process 2000 can proceed to 2010, where an additional electronic locker arrangement is determined to store the items at the new location of the recipient. Optionally, at 2012, the process 2000 can include determining an additional courier to deliver the item to the additional electronic locker arrangement. In particular, an additional courier may be identified to deliver the item when the item has not yet been picked up by the originally assigned courier or if the originally assigned courier is unable to deliver to the additional electronic locker arrangement at the new location of the recipient. In certain implementations, couriers can be assigned to certain locations or zones and a new courier can be determined to deliver the item when the new location of the recipient is outside of the zone and/or locations associated with the originally assigned courier. In some implementations, the logistics management system can notify the original courier to redirect delivery of the item to the additional electronic locker arrangement rather than switching couriers.

At 2014, the process 2000 can include determining that the recipient has picked up the item. For example, the recipient can send information via a computing device to a logistics management system indicating that the item has been picked up. In additional implementations, the electronic locker arrangement or the additional electronic locker arrangement can send information to the logistics management system indicating that the item has been picked up.

Figure 21:
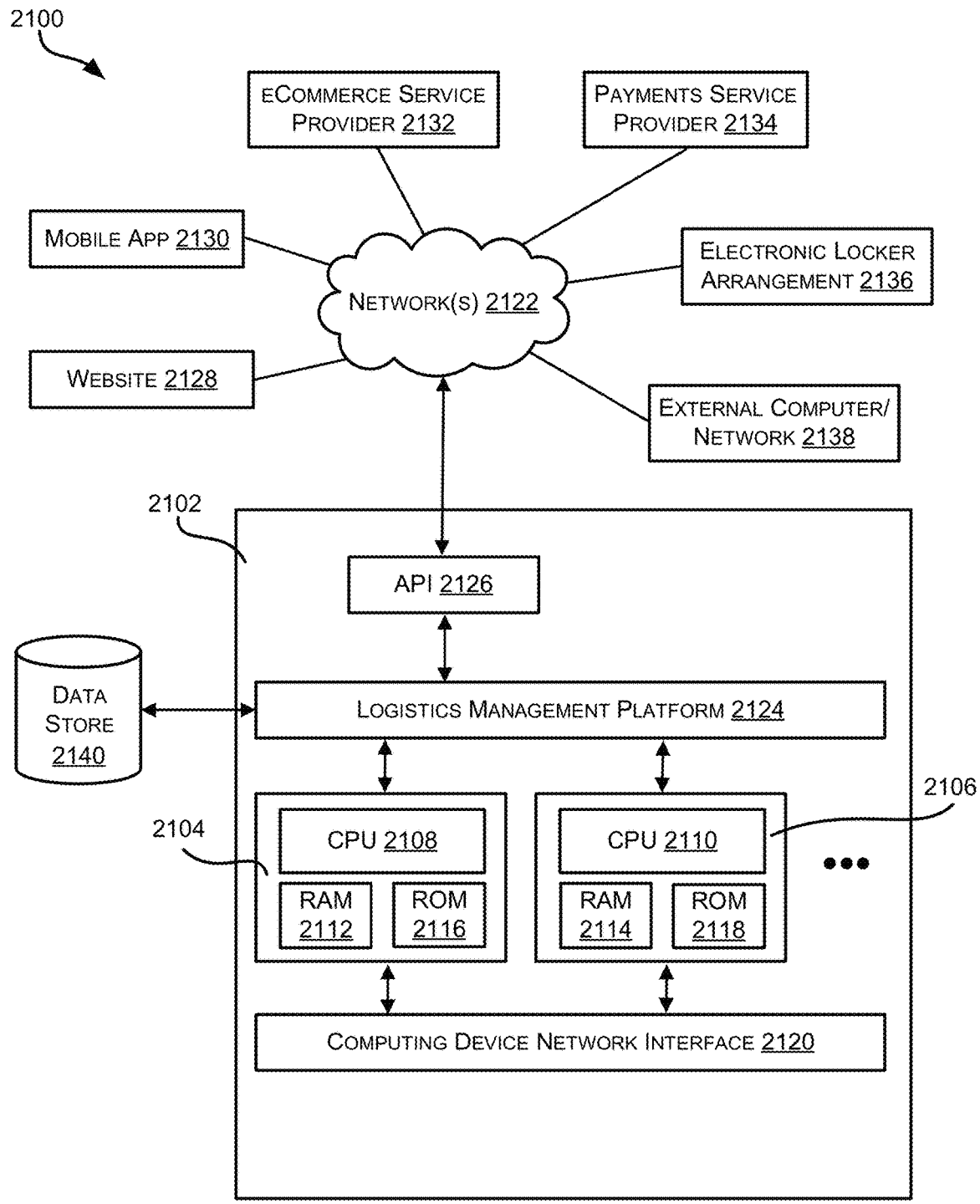
FIG. 21 is a diagram showing an illustrative computer architecture for implementing aspects of the various technologies presented herein.

FIG. 21 is a diagram showing an illustrative computer architecture for implementing aspects of the various technologies presented herein. The architecture 2100 can include a computing system that includes hardware devices that implement software components. In the illustrative example of FIG. 21, the computing system 2102 can include a number of computing devices, such as a first computing device 2104 and a second computing device 2106.

The computing devices 2104, 2106 can include a baseboard, or "motherboard," which is a printed circuit board to which a multitude of components or devices can be connected by way of a system bus or other electrical communication paths. In one illustrative configuration, the computing device 2104, 2106 each include one or more central processing units ("CPUs") 2108, 2110. The CPUs 2108, 2110 can be standard programmable processors that perform arithmetic and logical operations necessary for the operation of the architecture 12100.

The CPUs 2108, 2110 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The computing devices 2104, 2106 also include RAM 2112, 2114, used as the main memory in the computing devices 2104, 2106. The computing devices 2104, 2106 can further include a computer-readable storage medium such as read-only memory ("ROM") 2116, 2118 or non-volatile RAM ("NVRAM") for storing basic routines that help to startup the computing devices 2104, 2106 and to transfer information between the various components and devices. The ROM 2116, 2118 or NVRAM can also store other software components necessary for the operation of the computing devices 2104, 2106 in accordance with the configurations described herein. The computing device network interface 2120 can provide an interface between computing devices of the computing system 2102, such as the first computing device 2104 and the second computing device 2106.

The computing system 2102 can operate in a networked environment using logical connections to remote computing devices and computer systems through one or more networks, such as the network(s) 2122. The computing system 2102 can utilize hardware components, such as one or more network interfaces, to communicate via the network(s) 2122. The computing system 2102 can also utilize software components, such as a logistics management platform 2124 and an API 2126 to communicate with, control, or otherwise interact with various computing devices via the network(s) 2122. The logistics management platform 2124 can implement the operations described herein corresponding to the logistics management system 108. In some implementations, the logistics management platform 2124 can include modules 610, 612, 614, 616, 618, 620, 622 of FIG. 6 and perform the operations described in relation to the processes 800, 900, 1000, 1100, 1500, 1600, 1700 1800, 1900, 2000 of FIGS. 6-11 and 15-20. Additionally, the logistics management platform 2124 can perform operations described with respect to at least portions of the architectures 100, 200, 300, 400, 500 of FIGS. 1-5 and other implementations described herein. The API 2126 can include various calls and additional information to enable communications between the computing system 2102 and additional computing devices via the network(s) 2122. In particular implementations, the API 2126 can include a representational state transfer (RESTful) API.

The logistics management platform 2124 can exchange information with one or more websites 2128 via the API 2126 in addition to one or more mobile apps 2130. Additionally, the logistics management platform 2124 can exchange information with an ecommerce service provider 2132 as well as a payments service provider 2134 via the API 2126. Further, the logistics management platform can exchange information with electronic locker arrangements 2136 and other external computers/networks 2138 utilizing the API 2126. In some cases, the items being delivered via the logistics management platform 2124 can be obtained via the ecommerce service provider 2132 and/or websites 2128 related to merchants offering items for purchase online. Further, couriers can obtain payments for their services in delivering items via the payments service provider 2134.

The computing system 2102 can be connected to a mass storage device 2140 that provides non-volatile storage for the computing system 2102. The mass storage device 2140 can consist of one or more physical storage units. A storage controller of the computing system 2102 (not shown) can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing system 2102 can store data on the mass storage device 2140 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 2140 is characterized as primary or secondary storage, and the like.

For example, the computing system 2102 can store information to the mass storage device 2140 by issuing instructions through a storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing system 2102 can further read information from the mass storage device 2140 by detecting the physical states or characteristics of one or more particular locations within the physical storage units.

In addition to the mass storage device 2140 described above, the computing system 2102 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing system 2102.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 2140 or other computer-readable storage media is encoded with computer-executable instructions which, when loaded into the computing devices 2104, 2106 of the computing system 2102, transform the computer from a general-purpose computing system into a special-purpose computer capable of implementing the configurations described herein. These computer-executable instructions transform the computing devices 2104, 2106 by specifying how the CPUs 2108, 2110 transition between states, as described above. According to one configuration, the computing system 2102 has access to computer-readable storage media storing computer-executable instructions which, when executed by the computing system 2102, perform the various processes described above with regard to FIGS. 1-20. The computing system 2102 can also include computer-readable storage media for performing any of the other computer-implemented operations described herein.

The computing devices 2104, 2106 can include one or more input/output controllers for receiving and processing input from a number of input devices, such as a keyboard, a mouse, a touchpad, a touch screen, an electronic stylus, or other type of input device. Similarly, an input/output controller can provide output to a display, such as a computer monitor, a flat-panel display, a digital projector, a printer, or other type of output device. It will be appreciated that the computing system 2102 might not include all of the components shown in FIG. 21, can include other components that are not explicitly shown in FIG. 21, or can utilize an architecture completely different than that shown in FIG. 21.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method of conducting secure delivery transactions of an item with an electronic locker arrangement and authorizing access to the electronic locker arrangement by a recipient, comprising:
  receiving, by electronic communication through a network, from a first computing device to a logistics management system, recipient-specific information indicating a location of the recipient;
  receiving, by electronic communication through the network, from a second computing device to the logistics management system, a request to deliver the item to the recipient at the location;
  determining, by a processor of the logistics management system, and based at least partly on the location of the recipient, an electronic locker arrangement to store the item;
  generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;
  providing the shipping identifier for opening, by an electronic locker arrangement processor, a locker of the electronic locker arrangement for storing the item by a courier;
  determining, by the processor of the logistics management system, that the item has been stored by the electronic locker arrangement;
  sending, by electronic communication through the network, a notification, from the logistics management system to the first computing device, indicating that the item has been stored by the electronic locker arrangement; and
  controlling access to the electronic locker arrangement for securely delivering the item to the recipient by:
    receiving, by electronic communication through the network, from the first computing device of the recipient to the logistics management system, a request to access the item stored by the electronic locker arrangement,
    generating, by the processor of the logistics management system, a code uniquely identifying the recipient with respect to the item,
    sending, by electronic communication through the network, from the logistics management system to the first computing device of the recipient, the code for extracting information from the code, by a computing device processor of the first computing device of the recipient,
    receiving, by electronic communication through the network, from the first computing device of the recipient to the logistics management system, the extracted information, along with an identifier of the recipient,
    authorizing, by the processor of the logistics management system, access to the electronic locker arrangement by the recipient based on the identifier and the extracted information, and
    sending, by electronic communication through the network, from the logistics management system to the electronic locker arrangement, a control signal for opening the locker storing the item for the recipient;
  wherein the location of the recipient changes to a different location and the method further comprises determining, by the processor of the logistics management system, another electronic locker arrangement to store the item for the recipient based at least partly on the different location and the system identifier;
  sending, by electronic communication through the network, from the logistics management system to a third computing device of the courier or other courier, an additional request to deliver the item to the recipient at the different location; and
  electronically communicating through the network, from the logistics management system, additional delivery information to the courier or other courier, the additional delivery information including the shipping identifier and indicating the additional electronic locker arrangement;
  determining, by the processor of the logistics management system, that the item has been delivered to the additional electronic locker arrangement; and
  electronically communicating through the network, from the logistics management system, an additional notification to the first computing device, the additional notification indicating that the item has been delivered to the additional electronic locker arrangement.

2. A method of conducting secure delivery transactions of an item with an electronic locker arrangement and authorizing access to the electronic locker arrangement by a recipient, comprising:
  receiving, by electronic communication through a network, from a first computing device to a logistics management system, recipient-specific information indicating a location of the recipient;
  receiving, by electronic communication through the network, from a second computing device to the logistics management system, a request to deliver the item to the recipient at the location;
  determining, by a processor of the logistics management system, and based at least partly on the location of the recipient, an electronic locker arrangement to store the item;
  generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;
  providing the shipping identifier for opening, by an electronic locker arrangement processor, a locker of the electronic locker arrangement for storing the item by a courier;

determining, by the processor of the logistics management system, that the item has been stored by the electronic locker arrangement;

sending, by electronic communication through the network, a notification, from the logistics management system to the first computing device, indicating that the item has been stored by the electronic locker arrangement; and controlling access to the electronic locker arrangement for securely delivering the item to the recipient by:

receiving, by electronic communication through the network, from the first computing device of the recipient to the logistics management system, a request to access the item stored by the electronic locker arrangement, generating, by the processor of the logistics management system, a code uniquely identifying the recipient with respect to the item, sending, by electronic communication through the network, from the logistics management system to the first computing device of the recipient, the code for extracting information from the code, by a computing device processor of the first computing device of the recipient, receiving, by electronic communication through the network, from the first computing device of the recipient to the logistics management system, the extracted information, along with an identifier of the recipient, authorizing, by the processor of the logistics management system, access to the electronic locker arrangement by the recipient based on the identifier and the extracted information, and sending, by electronic communication through the network, from the logistics management system to the electronic locker arrangement, a control signal for opening the locker storing the item for the recipient;

electronically communicating through the network, the shipping identifier, from the logistics management system to the electronic locker arrangement and electronically communicating through the network, a control signal causing a door of the locker of the electronic locker arrangement to open based at least partly on the shipping identifier being provided to the electronic locker arrangement.

3. A method of conducting secure delivery transactions of an item with an electronic locker arrangement and authorizing access to the electronic locker arrangement by a recipient, comprising:

receiving, by electronic communication through a network, from a first computing device to a logistics management system, recipient-specific information indicating a location of the recipient;

receiving, by electronic communication through the network, from a second computing device to the logistics management system, a request to deliver the item to the recipient at the location;

determining, by a processor of the logistics management system, and based at least partly on the location of the recipient, an electronic locker arrangement to store the item;

generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;

providing the shipping identifier for opening, by an electronic locker arrangement processor, a locker of the electronic locker arrangement for storing the item by a courier;

determining, by the processor of the logistics management system, that the item has been stored by the electronic locker arrangement;

sending, by electronic communication through the network, a notification, from the logistics management system to the first computing device, indicating that the item has been stored by the electronic locker arrangement; and controlling access to the electronic locker arrangement for securely delivering the item to the recipient by:

receiving, by electronic communication through the network, from the first computing device of the recipient to the logistics management system, a request to access the item stored by the electronic locker arrangement, generating, by the processor of the logistics management system, a code uniquely identifying the recipient with respect to the item, sending, by electronic communication through the network, from the logistics management system to the first computing device of the recipient, the code for extracting information from the code, by a computing device processor of the first computing device of the recipient, receiving, by electronic communication through the network, from the first computing device of the recipient to the logistics management system, the extracted information, along with an identifier of the recipient, authorizing, by the processor of the logistics management system, access to the electronic locker arrangement by the recipient based on the identifier and the extracted information, and sending, by electronic communication through the network, from the logistics management system to the electronic locker arrangement, a control signal for opening the locker storing the item for the recipient;

wherein the second computing device is associated with an online retailer, and the method further comprises:

electronically communicating through the network, from the online retailer to the logistics management system, at least one application programming interface (API) call to obtain the shipping identifier, the at least one API call including the system identifier of the recipient and destination location information associated with the electronic locker; and electronically communicating through the network, the shipping identifier, from the logistics management system to the online retailer.

4. A delivery system with electronic locker arrangements, comprising:

one or more processors; and at least one non-transitory computer-readable storage medium having instructions stored thereupon which, when executed by the one or more processors, cause the delivery system to perform operations comprising:

receiving first location information, electronically communicated through a network, indicating a first location of a recipient, receiving a first request, electronically communicated through the network, to deliver a first item to the recipient at the first location, determining, based at least partly on the first location of the recipient, a first electronic locker arrangement to store the first item, generating a shipping identifier for the item, the shipping identifier including a random or pseudo-random string of characters or a first QR code that includes a first indicator corresponding to an identifier of the recipient and a second indicator corresponding to the first location, the shipping identifier identifying the item uniquely associated with the recipient and with delivery of the item to the recipient, receiving second location information, electronically communicated through the network, indicating a second location of the recipient that is different from the first location, receiving a second request, electronically communicated through the network, to deliver a second item to the recipient at the second location, determining, based at least partly on the second location of the recipient, a second electronic locker arrangement to store the second item, receiving a third request, electronically communicated through the network, to access the second item stored by the second electronic locker arrangement, generating a code uniquely identifying the recipient with respect to the second item, electronically communicating through the network to the recipient, the code for extracting information from the code, receiving, by electronic communication through the network, the extracted information from the recipient, along with the identifier of the recipient, authorizing access to the second electronic locker arrangement by the recipient based on the identifier and the extracted information, and electronically communicating through the network, a control signal for opening a locker of the second electronic locker arrangement for the recipient to pick up the second item.

5. The delivery system of claim 4, wherein the at least one non-transitory computer-readable storage medium has additional instructions stored thereupon which, when executed by the one or more processors, cause the delivery system to perform additional operations comprising:

generating a data storage element for the first request to deliver the first item to the recipient; and generating a first association between a courier and the first shipping identifier in the data storage element and a second association between a sender and the first shipping identifier in the data storage element.

6. A delivery system with electronic locker arrangements, comprising:

one or more processors; and at least one non-transitory computer-readable storage medium having instructions stored thereupon which, when executed by the one or more processors, cause the delivery system to perform operations comprising:

receiving first location information, electronically communicated through a network, indicating a first location of a recipient, receiving a first request, electronically communicated through the network, to deliver a first item to the recipient at the first location, determining, based at least partly on the first location of the recipient, a first electronic locker arrangement to store the first item, generating a shipping identifier for the item, the shipping identifier including a random or pseudo-random string of characters or a first QR code that includes a first indicator corresponding to an identifier of the recipient and a second indicator corresponding to the first location, the shipping identifier identifying the item uniquely associated with the recipient and with delivery of the item to the recipient, receiving second location information, electronically communicated through the network, indicating a second location of the recipient that is different from the first location, receiving a second request, electronically communicated through the network, to deliver a second item to the recipient at the second location, determining, based at least partly on the second location of the recipient, a second electronic locker arrangement to store the second item, receiving a third request, electronically communicated through the network, to access the second item stored by the second electronic locker arrangement, generating a code uniquely identifying the recipient with respect to the second item, electronically communicating through the network to the recipient, the code for extracting information from the code, receiving, by electronic communication through the network, the extracted information from the recipient, along with the identifier of the recipient, authorizing access to the second electronic locker arrangement by the recipient based on the identifier and the extracted information, and electronically communicating through the network, a control signal for opening a locker of the second electronic locker arrangement for the recipient to pick up the second item;

wherein:

the first request is electronically communicated through the network via one or more application programming interface (API) calls from an online retailer, and the at least one non-transitory computer-readable storage medium has additional instructions stored thereupon which, when executed by the one or more processors, cause the delivery system to perform additional operations comprising electronically communicating the first shipping identifier to an online retailer computing device, the first shipping identifier for inclusion in a shipping label for delivery of the first item.

7. A method of conducting secure delivery transactions of an item with an electronic locker arrangement and authorizing access to the electronic locker arrangement by a recipient, comprising:

receiving, by electronic communication through a network, from a first computing device to a logistics management system, recipient-specific information indicating a location of the recipient;

receiving, by electronic communication through the network, from a second computing device to the logistics management system, a request to deliver the item to the recipient at the location;

determining, by a processor of the logistics management system, and based at least partly on the location of the recipient, an electronic locker arrangement to store the item;

generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;

providing the shipping identifier for opening, by an electronic locker arrangement processor, a locker of the electronic locker arrangement for storing the item by a courier;

determining, by the processor of the logistics management system, that the item has been stored by the electronic locker arrangement;

sending, by electronic communication through the network, a notification, from the logistics management system to the first computing device, indicating that the item has been stored by the electronic locker arrangement; and controlling access to the electronic locker arrangement for securely delivering the item to the recipient by:
 receiving, by electronic communication through the network, from the first computing device of the recipient to the logistics management system, a request to access the item stored by the electronic locker arrangement,
 generating, by the processor of the logistics management system, a code uniquely identifying the recipient with respect to the item,
 sending, by electronic communication through the network, from the logistics management system to the first computing device of the recipient, the code for extracting information from the code, by a computing device processor of the first computing device of the recipient,
 receiving, by electronic communication through the network, from the first computing device of the recipient to the logistics management system, the extracted information, along with an identifier of the recipient,
 authorizing, by the processor of the logistics management system, access to the electronic locker arrangement by the recipient based on the identifier and the extracted information, and
 sending, by electronic communication through the network, from the logistics management system to the electronic locker arrangement, a control signal for opening the locker storing the item for the recipient;

wherein the code uniquely identifying the recipient with respect to the item further comprises a different QR code, and wherein the method further comprises using information from the different QR code to authorize the recipient's identity; and verifying whether the information from the different QR code is stored in association with the recipient, the item, and the electronic locker arrangement.

8. A method of conducting secure delivery transactions of an item with an electronic locker arrangement and authorizing access to the electronic locker arrangement by a recipient, comprising:

receiving, by electronic communication through a network, from a first computing device to a logistics management system, recipient-specific information indicating a location of the recipient;

receiving, by electronic communication through the network, from a second computing device to the logistics management system, a request to deliver the item to the recipient at the location;

determining, by a processor of the logistics management system, and based at least partly on the location of the recipient, an electronic locker arrangement to store the item;

generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;

providing the shipping identifier for opening, by an electronic locker arrangement processor, a locker of the electronic locker arrangement for storing the item by a courier;

determining, by the processor of the logistics management system, that the item has been stored by the electronic locker arrangement;

sending, by electronic communication through the network, a notification, from the logistics management system to the first computing device, indicating that the item has been stored by the electronic locker arrangement; and controlling access to the electronic locker arrangement for securely delivering the item to the recipient by:
 receiving, by electronic communication through the network, from the first computing device of the recipient to the logistics management system, a request to access the item stored by the electronic locker arrangement,
 generating, by the processor of the logistics management system, a code uniquely identifying the recipient with respect to the item,
 sending, by electronic communication through the network, from the logistics management system to the first computing device of the recipient, the code for extracting information from the code, by a computing device processor of the first computing device of the recipient,
 receiving, by electronic communication through the network, from the first computing device of the recipient to the logistics management system, the extracted information, along with an identifier of the recipient,
 authorizing, by the processor of the logistics management system, access to the electronic locker arrangement by the recipient based on the identifier and the extracted information, and
 sending, by electronic communication through the network, from the logistics management system to the electronic locker arrangement, a control signal for opening the locker storing the item for the recipient; and enabling access to the electronic locker arrangement by electronically communicating through the network:
from the electronic locker arrangement to the logistics management system, an access request that includes the shipping identifier, and
from the logistics management system to the electronic locker arrangement, control signals upon verifying that the electronic locker arrangement is assigned to store the item associated with the shipping identifier.

9. A method of conducting secure delivery transactions of an item with an electronic locker arrangement and authorizing access to the electronic locker arrangement by a recipient, comprising:
- receiving, by electronic communication through a network, from a first computing device to a logistics management system, recipient-specific information indicating a location of the recipient;
- receiving, by electronic communication through the network, from a second computing device to the logistics management system, a request to deliver the item to the recipient at the location;
- determining, by a processor of the logistics management system, and based at least partly on the location of the recipient, an electronic locker arrangement to store the item;
- generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;
- providing the shipping identifier for opening, by an electronic locker arrangement processor, a locker of the electronic locker arrangement for storing the item by a courier;
- determining, by the processor of the logistics management system, that the item has been stored by the electronic locker arrangement;
- sending, by electronic communication through the network, a notification, from the logistics management system to the first computing device, indicating that the item has been stored by the electronic locker arrangement; and
- controlling access to the electronic locker arrangement for securely delivering the item to the recipient by:
  - receiving, by electronic communication through the network, from the first computing device of the recipient to the logistics management system, a request to access the item stored by the electronic locker arrangement,
  - generating, by the processor of the logistics management system, a code uniquely identifying the recipient with respect to the item,
  - sending, by electronic communication through the network, from the logistics management system to the first computing device of the recipient, the code for extracting information from the code, by a computing device processor of the first computing device of the recipient,
  - receiving, by electronic communication through the network, from the first computing device of the recipient to the logistics management system, the extracted information, along with an identifier of the recipient,
  - authorizing, by the processor of the logistics management system, access to the electronic locker arrangement by the recipient based on the identifier and the extracted information, and
  - sending, by electronic communication through the network, from the logistics management system to the electronic locker arrangement, a control signal for opening the locker storing the item for the recipient; and using the shipping identifier to complete delivery of the item to the electronic locker arrangement by the courier without integration to a courier delivery system.

10. A method of conducting secure delivery transactions of an item with an electronic locker arrangement and authorizing access to the electronic locker arrangement by a recipient, comprising:
- receiving, by electronic communication through a network, from a first computing device to a logistics management system, recipient-specific information indicating a location of the recipient;
- receiving, by electronic communication through the network, from a second computing device to the logistics management system, a request to deliver the item to the recipient at the location;
- determining, by a processor of the logistics management system, and based at least partly on the location of the recipient, an electronic locker arrangement to store the item;
- generating, by the processor of the logistics management system, based at least partly on the request, a system identifier, and the location of the recipient, a random or pseudo-random string of characters or a QR code as a shipping identifier identifying the item uniquely associated with the recipient and with delivery of the item to the recipient;
- providing the shipping identifier for opening, by an electronic locker arrangement processor, a locker of the electronic locker arrangement for storing the item by a courier;
- determining, by the processor of the logistics management system, that the item has been stored by the electronic locker arrangement;
- sending, by electronic communication through the network, a notification, from the logistics management system to the first computing device, indicating that the item has been stored by the electronic locker arrangement; and
- controlling access to the electronic locker arrangement for securely delivering the item to the recipient by:
  - receiving, by electronic communication through the network, from the first computing device of the recipient to the logistics management system, a request to access the item stored by the electronic locker arrangement,
  - generating, by the processor of the logistics management system, a code uniquely identifying the recipient with respect to the item,
  - sending, by electronic communication through the network, from the logistics management system to the first computing device of the recipient, the code for extracting information from the code, by a computing device processor of the first computing device of the recipient,
  - receiving, by electronic communication through the network, from the first computing device of the recipient to the logistics management system, the extracted information, along with an identifier of the recipient,
  - authorizing, by the processor of the logistics management system, access to the electronic locker arrangement by the recipient based on the identifier and the extracted information, and
  - sending, by electronic communication through the network, from the logistics management system to the electronic locker arrangement, a control signal for opening the locker storing the item for the recipient; and operating the logistics management system without infrastructure related to a courier delivery system.

* * * * *